United States Patent
Gray et al.

(10) Patent No.: US 12,479,847 B2
(45) Date of Patent: Nov. 25, 2025

(54) PYRROLOPYRIMIDINE INHIBITORS OF WILD-TYPE AND MUTANT FORMS OF LRRK2

(71) Applicants: DANA-FARBER CANCER INSTITUTE, INC., Boston, MA (US); VORONOI INC., Incheon (KR)

(72) Inventors: Nathanael S. Gray, Boston, MA (US); John Hatcher, Boston, MA (US); Jieun Choi, Seoul (KR); Sun-Hwa Lee, Daegu (KR); Hwangeun Choi, Seoul (KR); Eunhwa Ko, Incheon (KR); Yeonsil Kim, Incheon (KR); Daekwon Kim, Daegu (KR); Namdoo Kim, Incheon (KR); Jungbeom Son, Incheon (KR)

(73) Assignees: DANA-FARBER CANCER INSTITUTE, INC., Boston, MA (US); VORONOI INC., Incheon (KR)

( * ) Notice: Subject to any disclaimer, the term of this patent is extended or adjusted under 35 U.S.C. 154(b) by 913 days.

(21) Appl. No.: 17/610,066

(22) PCT Filed: May 15, 2020

(86) PCT No.: PCT/US2020/033056
§ 371 (c)(1),
(2) Date: Nov. 9, 2021

(87) PCT Pub. No.: WO2020/232332
PCT Pub. Date: Nov. 19, 2020

(65) Prior Publication Data
US 2022/0204515 A1    Jun. 30, 2022

Related U.S. Application Data

(60) Provisional application No. 62/848,920, filed on May 16, 2019.

(51) Int. Cl.
*C07D 487/04* (2006.01)
*A61P 25/28* (2006.01)

(52) U.S. Cl.
CPC ............ *C07D 487/04* (2013.01); *A61P 25/28* (2018.01)

(58) Field of Classification Search
CPC ................ C07D 487/04; A61P 25/28

USPC ........................................................... 514/234
See application file for complete search history.

(56) References Cited

U.S. PATENT DOCUMENTS

| | | | |
|---|---|---|---|
| 10,913,744 B2 * | 2/2021 | Gray | A61P 25/28 |
| 11,208,412 B2 * | 12/2021 | Choi | A23L 33/10 |
| 2012/0122840 A1 * | 5/2012 | Kumar | C07D 519/00 |
| | | | 514/232.5 |
| 2017/0002000 A1 | 1/2017 | Galatsis et al. | |
| 2018/0244676 A1 | 8/2018 | Gray et al. | |
| 2020/0239474 A1 * | 7/2020 | Choi | A61P 35/00 |
| 2023/0066011 A1 * | 3/2023 | Jung | C07F 9/6561 |

FOREIGN PATENT DOCUMENTS

| | | | |
|---|---|---|---|
| EP | 3587422 A2 | 1/2020 | |
| EP | 3915991 A1 | 12/2021 | |
| KR | 20160106623 A | 9/2016 | |
| WO | 2012045195 A1 | 4/2012 | |
| WO | 2015113451 A1 | 8/2015 | |
| WO | WO-2016130920 A2 * | 8/2016 | A61P 25/28 |
| WO | WO-2018155916 A2 * | 8/2018 | A23L 33/10 |
| WO | WO-2020149723 A1 * | 7/2020 | A61K 31/519 |

OTHER PUBLICATIONS

Hatcher et al., "Discovery of a Pyrrolopyrimidine (JH-II-127), a Highly Potent, Selective, and Brain Penetrant LRRK2 Inhibitor", ACS Medicinal Chemistry Letters 2015, vol. 6,584-589.

Ding et al., "Discovery of 4-ethoxy-7H-pyrrolo[2,3-d]pyrimidin-2-amines as potent, selective and orally bioavailable LRRK2 inhibitors," Bioorganic & Medicinal Chemistry Letters, 2018, vol. 28, pp. 1615-1620.

Williamson et al., "Design of Leucine-Rich Repeat Kinase 2 (LRRK2) Inhibitors Using a Crystallographic Surrogate Derived from Checkpoint Kinase 1 (CHK1)", J. Med. Chem., 2017, vol. 60, pp. 8945-8962.

* cited by examiner

*Primary Examiner* — Amy L Clark
*Assistant Examiner* — Liyuan Mou
(74) *Attorney, Agent, or Firm* — ArentFox Schiff LLP; Daniel W. Clarke; Shawn P. Foley

(57) ABSTRACT

Disclosed are compounds that possess inhibitory activity against LRRK2. Also disclosed are pharmaceutical compositions containing the compounds and methods of using the compounds to treat neurodegenerative diseases and disorders such as Parkinson's disease and brain cancer (e.g., gliomas and glioblastomas).

11 Claims, 1 Drawing Sheet

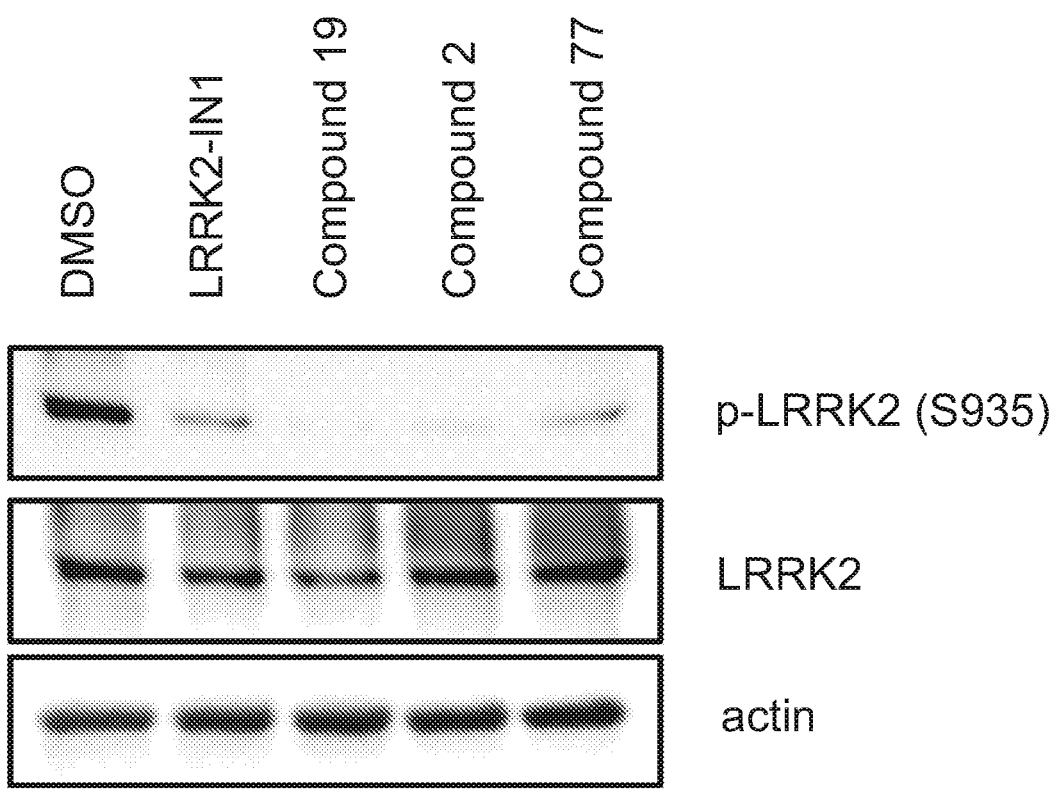

PYRROLOPYRIMIDINE INHIBITORS OF WILD-TYPE AND MUTANT FORMS OF LRRK2

RELATED APPLICATIONS

This application is a national stage application, filed under 35 U.S.C. § 371, of International Application No. PCT/US2020/033056, filed on May 15, 2020, which claims the benefit of priority under 35 U.S.C. § 119 (e) to U.S. Provisional Application No. 62/848,920, filed on May 16, 2019, each of which is incorporated herein by reference in its entirety.

BACKGROUND OF THE INVENTION

Parkinson's disease (PD) is a movement disorder resulting from progressive loss of dopamine producing neurons. It is the second most common neurodegenerative disease in the world, and affects over 1 million Americans. More than 60,000 patients are newly diagnosed each year (Gandhi et al., J. Neurosci. Res. 87:1283-1295 (2009); Daniels et al., Neurosignals 19:1-15 (2011)). Symptoms associated with Parkinson's disease include motor impairment, tremor, bradykinesia, instability, and other movement related disorders. There are also non-motor symptoms such as cognitive dysfunction, autonomic dysfunction, and sleep disruption. These symptoms greatly reduce the quality of life of those suffering from Parkinson's disease.

Recent genetic studies have revealed an underlying genetic cause in at least 10% of all PD cases, which provides new opportunities for the discovery of molecularly targeted therapeutics that may ameliorate neurodegeneration (Daniels et al., Neurosignals 19:1-15 (2011)). Insofar as the genes associated with PD are concerned, leucine-rich repeat kinase 2 (LRRK2) having a missense mutation, G2019S, is frequently found in both familial and sporadic PD cases. (Healy et al., Lancet Neurol. 7:583-590 (2008); Dachsel et al., Neurol. 67:542-547 (2010); Lee et al., Trends Pharmacol. Sci. 33(7):365-373 (2012); Liu et al., Hum. Mol. Genet. 20:3933-3942 (2011)). The G2019S mutation increases kinase activity, which may result in activation of the neuronal death signal pathway (Greggio et al., ASN Neuro 1(1):e00002 (2009), Kumar, et al., Expert Rev. Mol. Med. 13:e20 (2011)). Transgenic G2019S LRRRK2 mice aged to 12-16 months displayed progressive degeneration of the substantia nigra pars compacta (SNpc) dopaminergic neurons and Parkinson's phenotypes of motor dysfunction (Chen et al., Cell Death Differ. 19(10):1623-33 (2012)).

Currently, there are few known compounds that inhibit LRRK2 kinase function or have specificity for this target; therefore, compounds having LRRK2 inhibiting properties are urgently needed.

SUMMARY OF THE INVENTION

A first aspect of the present invention is directed to a compound represented by a structure of formula (I):

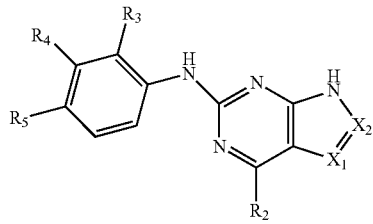

or a pharmaceutically acceptable salt or stereoisomer thereof, wherein $X_1$ is N or $CR_1$, wherein $R_1$ is H, halogen, CN, or $CF_3$;

$X_2$ is CH or N provided that only one of $X_1$ and $X_2$ is N;

$R_2$ is

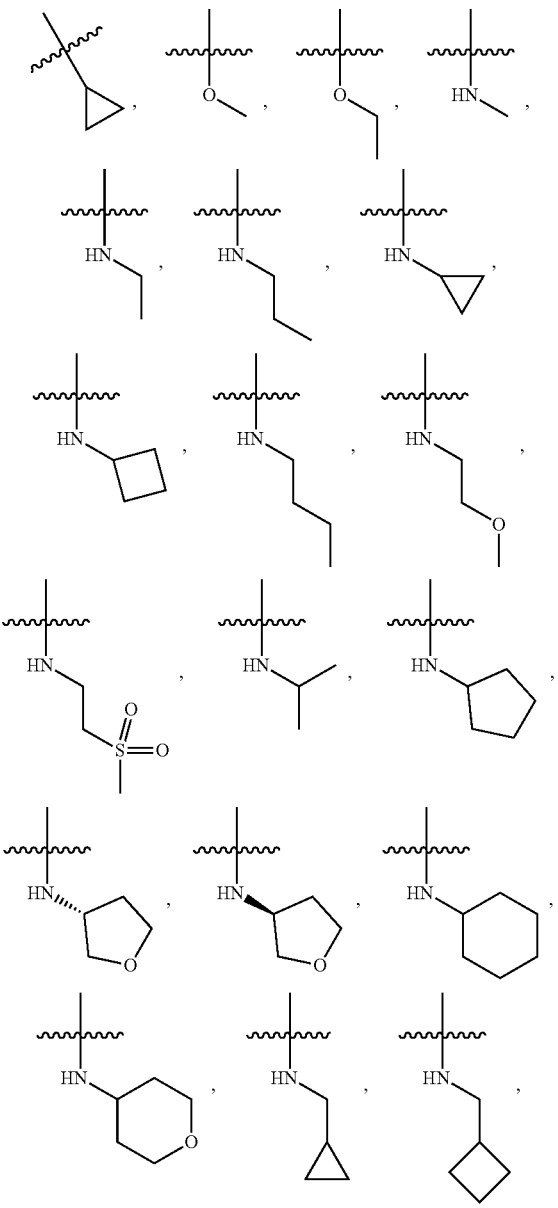

-continued

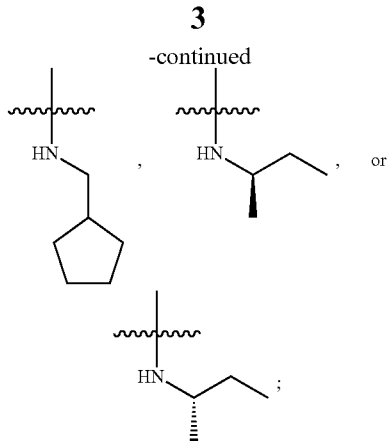

$R_3$ is methoxy;
$R_4$ is H;
or $R_3$ and $R_4$, together the atoms to which they are attached, form a 1,4-dioxenyl group, a 1,3-dioxenyl group, or a 2,3-dihydrofuranyl group;
$R_5$ is $C(O)R_6$, $S(O)_2R_6$ or

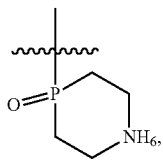

wherein
$R_6$ is methyl

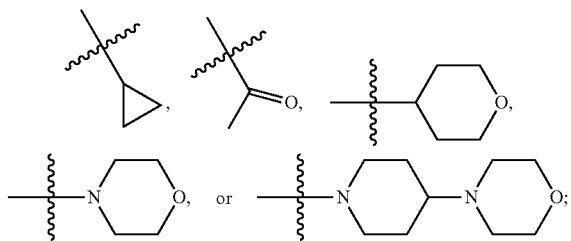

or a pharmaceutically acceptable salt or stereoisomer thereof.

In some embodiments, the compounds of the present invention have a structure represented by formula (Ia):

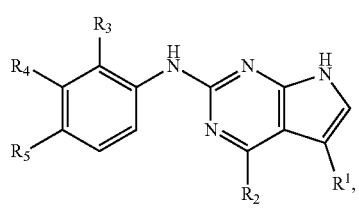

(Ia)

wherein $X_1$ is $CR_1$, $R_1$ is H or Cl, and $X_2$ is CH, or a pharmaceutically acceptable salt or stereoisomer thereof.

A second aspect of the present invention is directed to a pharmaceutical composition containing a therapeutically effective amount of a compound of formula I, or a pharmaceutically acceptable salt or stereoisomer thereof, and pharmaceutically acceptable carrier.

A further aspect of the invention is directed to a method of treating a disease or disorder mediated by dysregulated or aberrant leucine-rich repeat kinase 2 (LRRK2) activity, that includes administering a therapeutically effective amount of a compound of formula (I) or a pharmaceutically acceptable salt or stereoisomer thereof, to a subject in need thereof. In some embodiments, the disease is a neurodegenerative disease. In some embodiments, the disease is brain cancer (e.g., gliomas and glioblastomas).

Further aspects of the present invention are directed to methods of making the compounds.

Compounds of the present invention inhibit the activity of both wild-type and mutant forms of LRRK2. Compounds of the present invention may thus provide a therapeutic entree for neurodegenerative diseases such as Parkinson's disease by inhibiting LRRK2.

Compounds of formula (I) and pharmaceutically acceptable salts and stereoisomers may inhibit a plurality of aberrant kinases that in addition to LRRK2, include at least one of adaptor-associated protein kinase 1 (AAK1), anaplastic lymphoma kinase (ALK), ALK(C1156Y), ALK (L1196M), AMPK-related protein kinase 5 (ARK5), apoptosis signal-regulating kinase 1 (ASK1), calcium/calmodulin-dependent protein kinase kinase 2 (CAMKK2), cyclin-dependent kinase 7 (CDK7), checkpoint kinase 2 (CHEK2), CLK1, CLK2, CLK4, casein kinase I isoform alpha (CSNK1A1), casein kinase I isoform delta (CSNK1D), casein kinase I isoform epsilon (CSNK1E), casein kinase I isoform gamma 1 (CSNK1G1), CSNK1G2, CSNK1G3, casein kinase II isoform alpha (CSNK2A1), death-associated protein kinase 1 (DAPK1), DAPK2, death-associated protein kinase-related 1 (DRAK1), DRAK2, dual specificity tyrosine-phosphorylation-regulated kinase 1A (DYRK1A), DYRK1B, DYRK2, focal adhesion kinase (FAK), proto-oncogene tyrosine-protein kinase FER (FER), FLT3 (D835V), FLT3(D835Y), FLT3(ITD), FMS like tyrosine kinase 3 (FLT)(ITD,D835V), FLT3(ITD,F691L), cyclin G-associated kinase (GAK), general control nonderepressible 2 (GCN2)(Kin.Dom.2,S808G), serine/threonine-protein kinase haspin (HASPIN), homeodomain-interacting protein kinase 1 (HIPK1), hormonally up-regulated neu tumor-associated kinase (HUNK), insulin receptor (INSR), Janus kinase 1 (JAK1)(JH2domain-pseudokinase), JAK3 (JH1domain-catalytic), c-Jun N-terminal kinase 1 (JNK1), JNK2, JNK3, LRRK2(G2019S), leukocyte receptor tyrosine kinase (LTK), mitogen-activated protein kinase kinase kinase 2 (MAP3K2), mitogen-activated protein kinase kinase kinase kinase 2 (MAP4K2), mitogen-activated protein kinase-activated protein kinase 2 (MAPKAPK2), mitogen-activated protein kinase kinase 3 (MEK3), MEK4, MEK6, Misshapen-like kinase 1 (MINK), mitogen-activated protein kinase-interacting serine/threonine kinase-2 (MKNK2), muscle-specific kinase (MUSK), myosin light chain kinase (MYLK), NF-kappa-B-inducing kinase (NIK), oxidative stress-responsive-1 (OSR1), phosphorylase b kinase gamma catalytic chain, skeletal muscle isoform I (PHKG1), PHKG2, phosphatidylinositol 4-Phosphate-5 kinase 7A (PIP5KTA), PIP5K2C, polo-like kinase 4 (PLK4), serine/threonine-protein kinase D1 (PRKD1), PRKD2, PRKD3, protein tyrosine kinase 2 beta (PYK2), RET proto-oncogene (RET)(V804M), RIO kinase 3 (RIOK3), dual serine/threonine and tyrosine protein kinase (RIPK5), proto-oncogene tyrosine-protein kinase ROS 1 (ROS1)(c-ros oncogene 1), ribosomal s6 kinase A4 (RPS6KA4)(Kin.Dom.2-C-terminal), RPS6KA5(Kin- .Dom.2-C-terminal), ribosomal S6 Kinase 2 (RSK2) (Kin-.Dom.2-C-terminal), RSK3(Kin.Dom.2-C-terminal), serum and glucocorticoid-regulated kinase (SGK), SGK3, SNF1/AMP kinase-related kinase SNARK, serine/threonine-protein kinase 33 (STK33), STK39, transforming growth factor beta-activated kinase 1 (TAK1), TANK binding kinase 1 (TBK1), testis-specific serine/threonine-protein kinase 1B (TSSK1B), monopolar spindle 1 (Mpsl) kinase (TTK), mitogen-activated protein kinase kinase kinase 19 (YSK4, also known as MAP3K19), and zeta chain of T cell receptor associated protein kinase 70 (ZAP70). Thus, yet further aspects of the present invention entail use of inventive compounds to treat diseases and disorders that are mediated by aberrant activity of any of these kinases.

In some embodiments, compounds of the present invention also target ALK and mutant ALK, and may be used in the treatment of anaplastic lymphoma kinase ALK-mediated disorders (e.g., ALK-dependent non-small cell lung cancer (NSCLC) and ALK-dependent neuroblastoma).

BRIEF DESCRIPTION OF THE DRAWINGS

FIG. 1 is an immunoblot that shows the inhibition of the phosphorylation of Ser935 in wild-type LRKK2 with inventive compounds 2, 19, and 77 and known LRRK2 inhibitor LRRK2-IN-1.

DETAILED DESCRIPTION OF THE INVENTION

Unless defined otherwise, all technical and scientific terms used herein have the same meaning as is commonly understood by one of skill in the art to which the subject matter herein belongs. As used in the specification and the appended claims, unless specified to the contrary, the following terms have the meaning indicated in order to facilitate the understanding of the present invention.

As used in the description and the appended claims, the singular forms "a", "an", and "the" include plural referents unless the context clearly dictates otherwise. Thus, for example, reference to "a composition" includes mixtures of two or more such compositions, reference to "an inhibitor" includes mixtures of two or more such inhibitors, and the like.

Unless stated otherwise, the term "about" means within 10% (e.g., within 5%, 2% or 1%) of the particular value modified by the term "about."

The transitional term "comprising," which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

With respect to compounds of the present invention, and to the extent the following terms are used herein to further describe them, the following definitions apply.

As used herein, the term "halogen" (or "halo" or "halide") refers to fluorine, chlorine, bromine, or iodine.

Broadly, the compounds of the invention are represented by a structure of formula I:

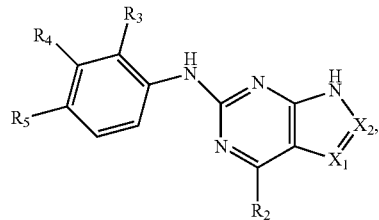

(I)

wherein $X_1$ is N or $CR_1$, wherein $R_1$ is H, halogen, CN, or $CF_3$;

$X_2$ is CH or N, provided that only one of $X_1$ and $X_2$ is N;

$R_2$ is

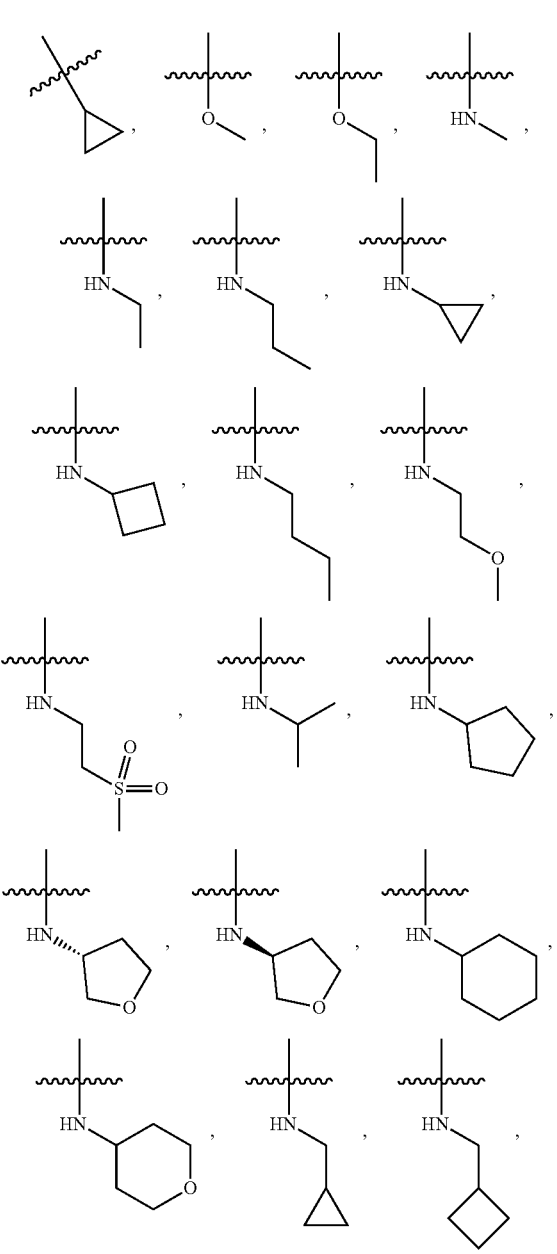

-continued

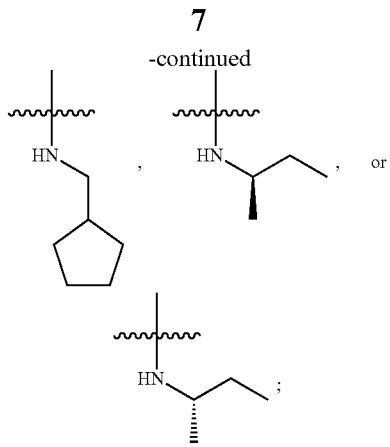

R₃ is methoxy;
R₄ is H;
or R₃ and R₄, together the atom to which they are attached, form a 1,4-dioxenyl group, a 1,3-dioxenyl group, or a 2,3-dihydrofuranyl group; and
R₅ is C(O)R₆, S(O)₂R₆ or

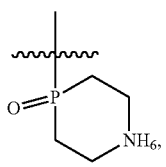

wherein
R₆ is methyl

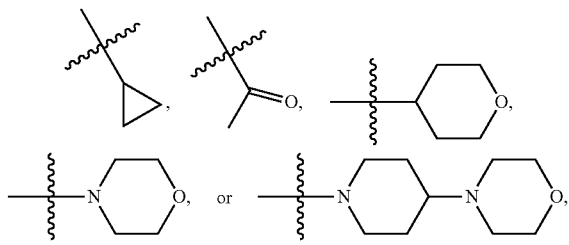

or a pharmaceutically acceptable salt or stereoisomer thereof.

In some embodiments, the compounds of the present invention have a structure represented by formula (Ia):

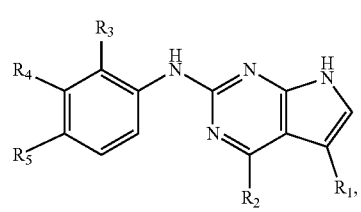

wherein, X₁ is CR₁, R₁ is H or Cl, and X₂ is CH;
or a pharmaceutically acceptable salt or stereoisomer thereof.

In some embodiments, wherein X₁ is CR₁, R₁ is Cl, X₂ is CH, R₂ is as described above, and R₃ and R₄, together the atoms to which they are attached, form a 1,4-dioxenyl group; and R₅ is C(O)R₆ or S(O)₂R₆, wherein R₆ is methyl,

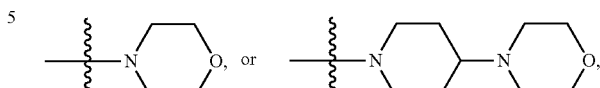

the compounds of the present invention have a structure represented by formula (Ia-1):

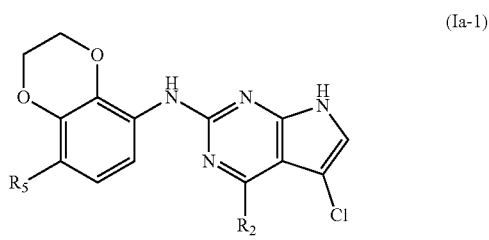

or a pharmaceutically acceptable salt or stereoisomer thereof.

In some embodiments, the compounds of the present invention have a structure represented by formula (Ia-1) or (Ia-2):

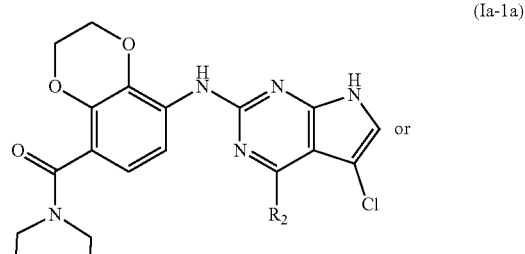

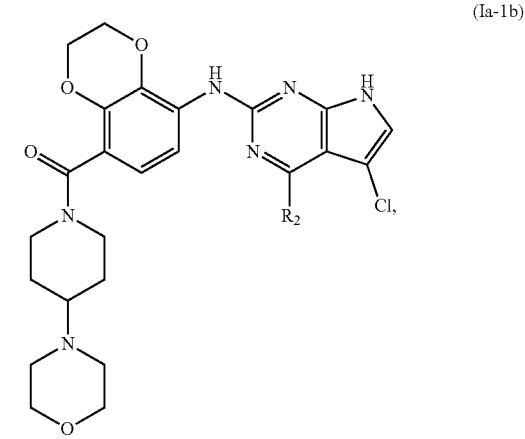

or a pharmaceutically acceptable salt or stereoisomer thereof.

In some embodiments, the compounds of the present invention are represented by any of the following structures:

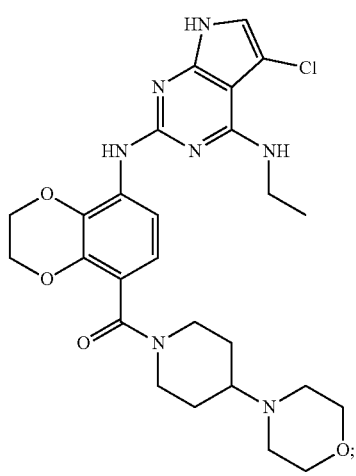
(1)
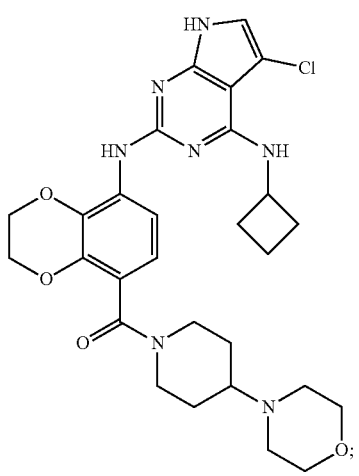
(4)
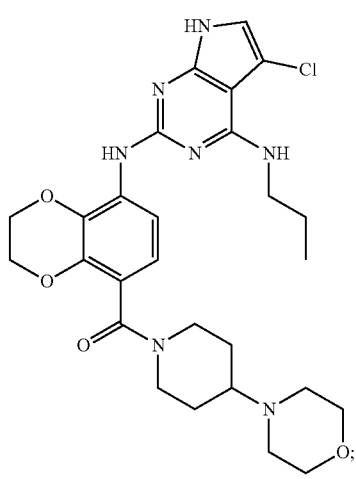
(2)
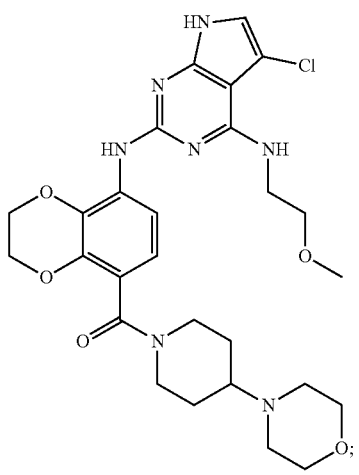
(5)
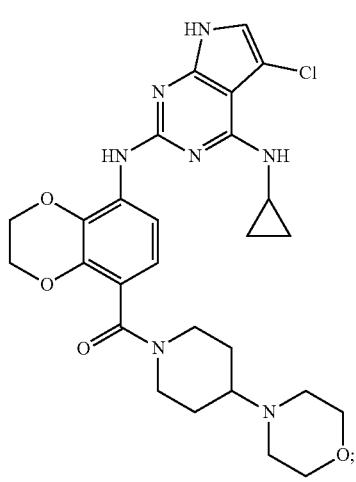
(3)
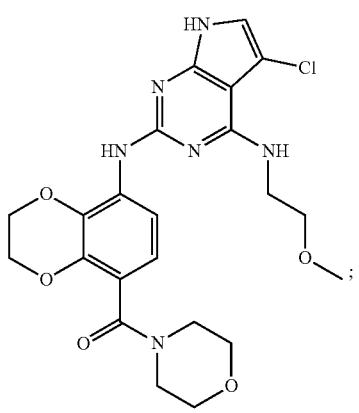
(9)

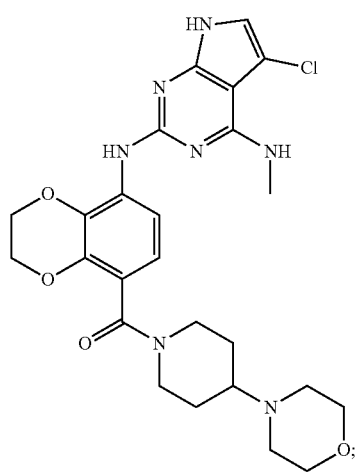
(10)
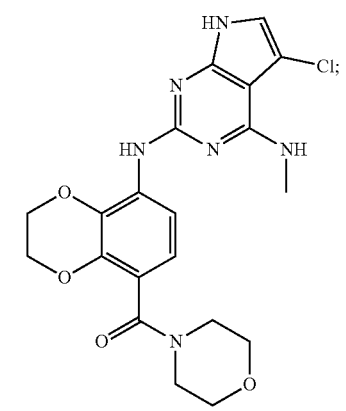
(14)
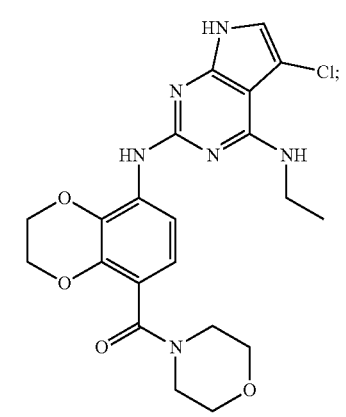
(17)
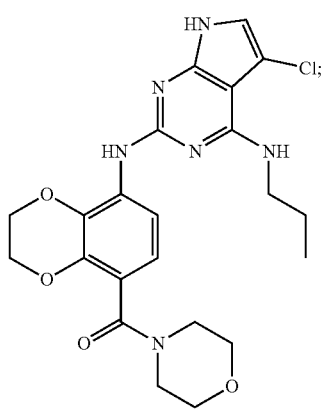
(20)
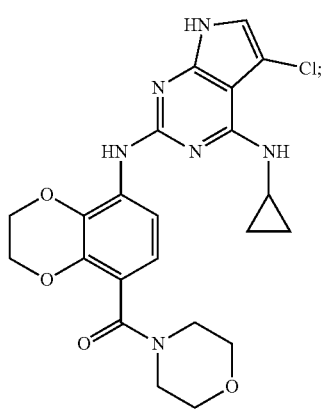
(27)
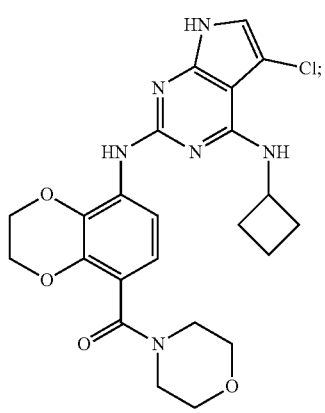
(30)
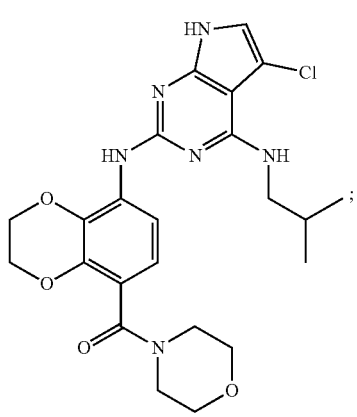
(33)

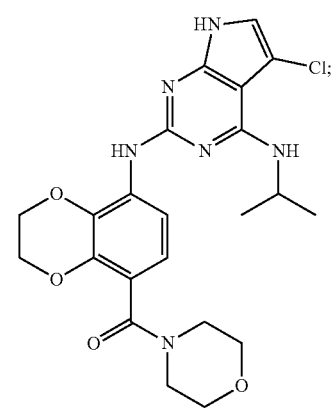
(35)
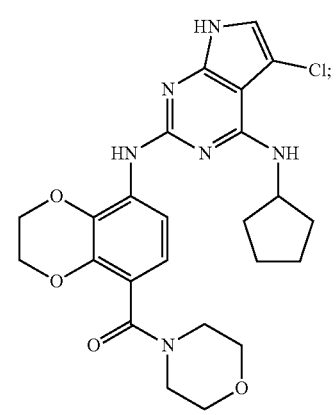
(36)
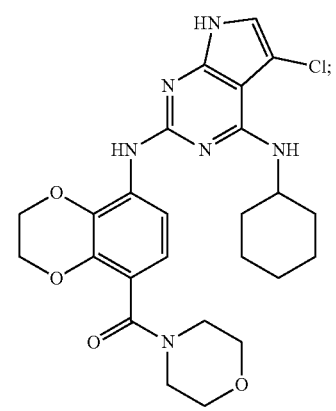
(37)
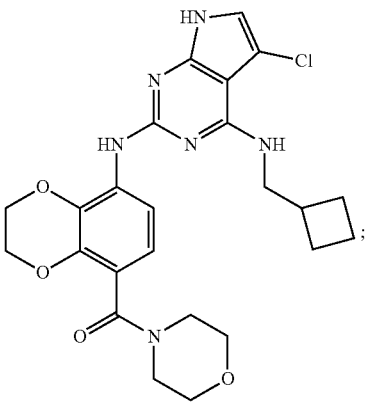
(44)
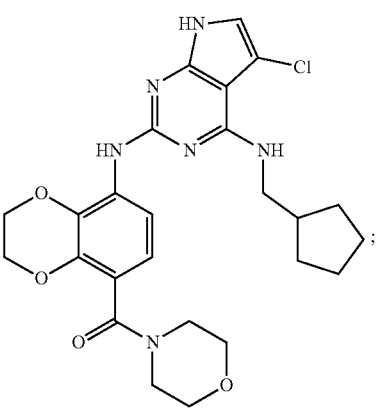
(46)
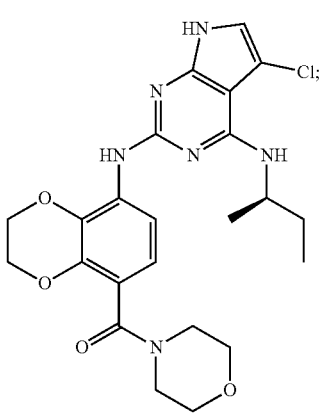
(50)
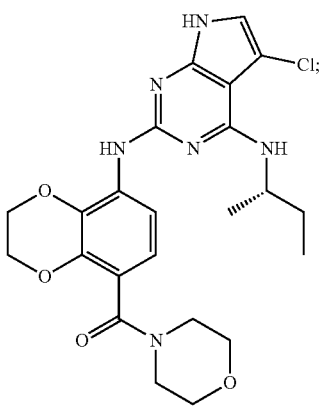
(54)
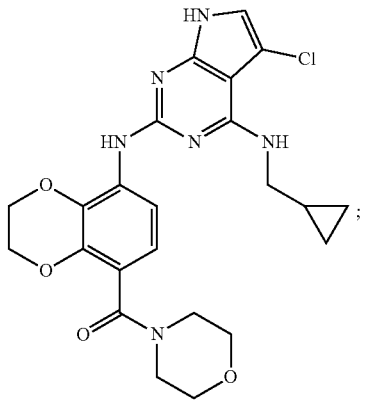
(65)

-continued
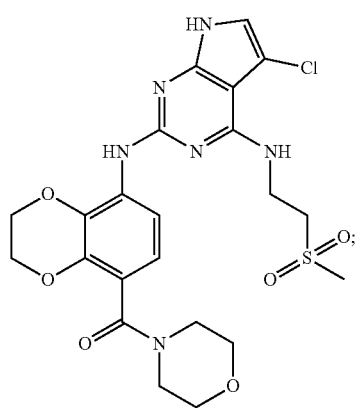
(70)
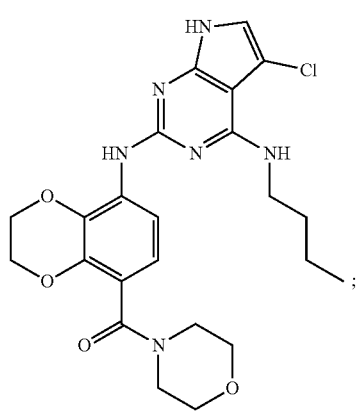
(74)
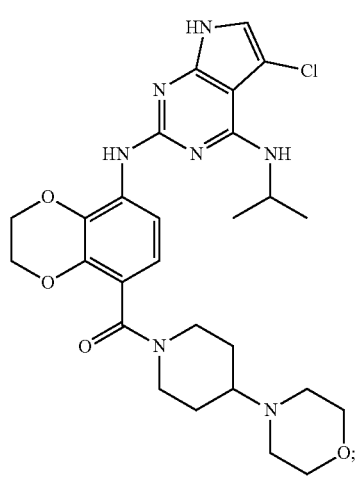
(88)
-continued
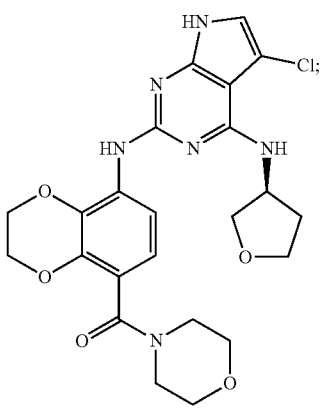
(95)
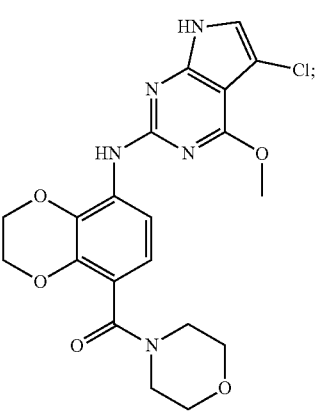
(106)
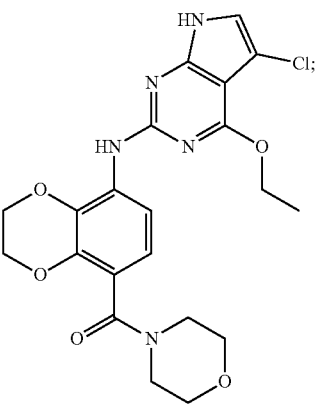
(107)
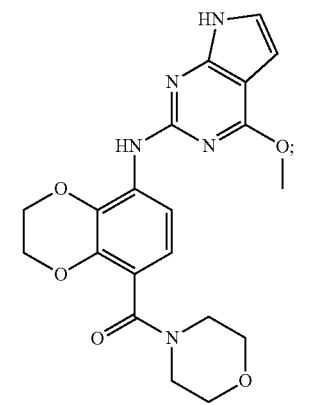
(108)

(109)
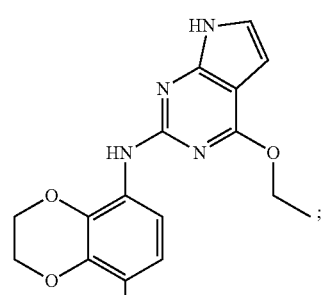
(110)
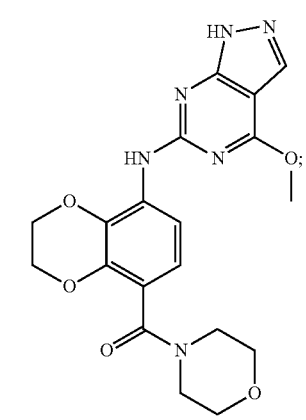
(111)
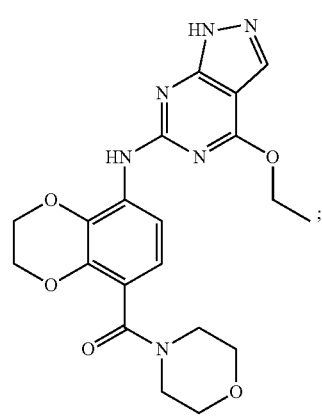
(112)
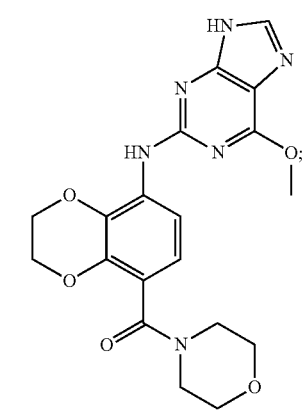
(113)
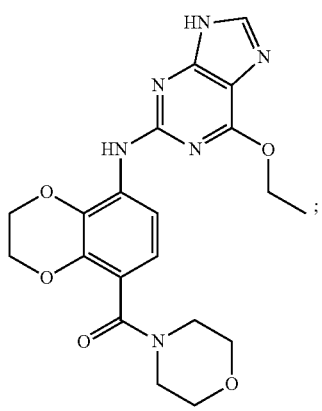
(114)
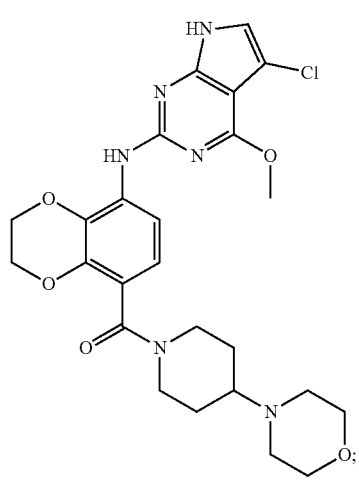
(115)
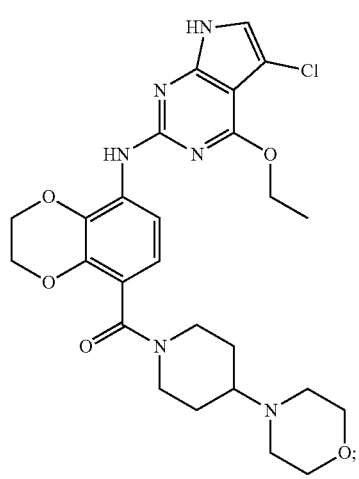

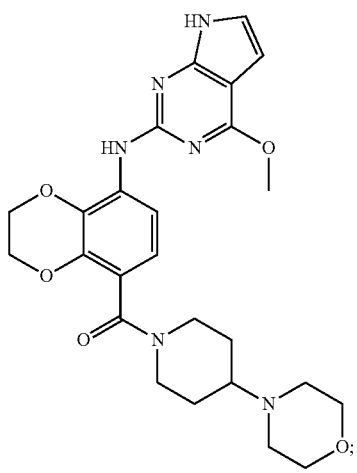
(116)
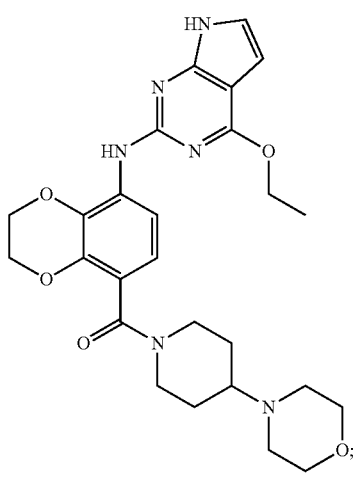
(117)
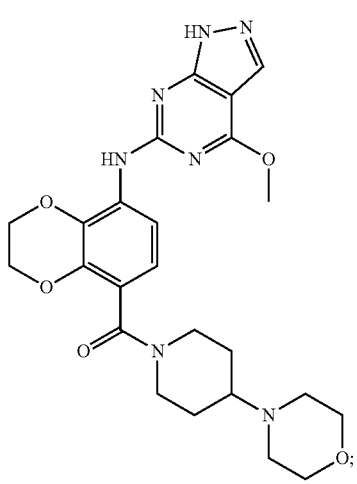
(118)
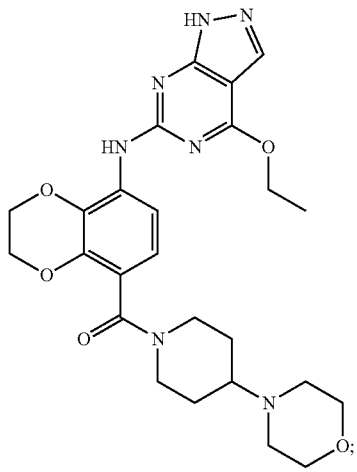
(119)
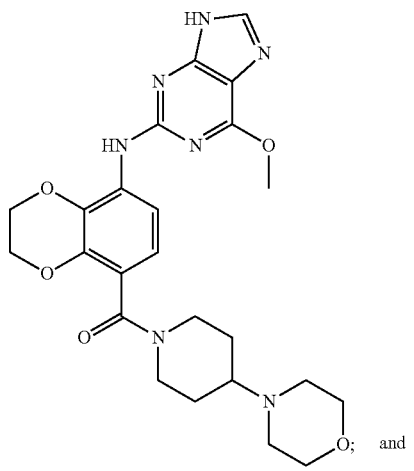
(120) and
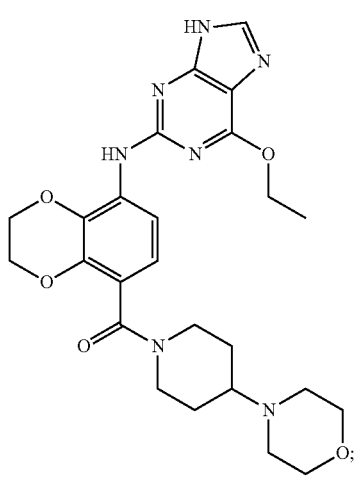
(121)
or a pharmaceutically acceptable salt or stereoisomer thereof.
In some embodiments, the compounds of the present invention have a structure represented by formula (Ia-2):

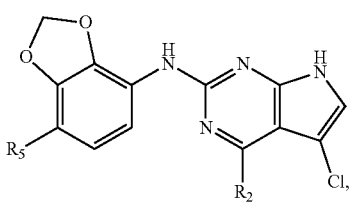
(Ia-2)
wherein $X_1$ is $CR_1$, $R_1$ is Cl, $X_2$ is CH, and $R_3$ and $R_4$, together the atoms to which they are attached, form a 1,3-dioxenyl group.
In some embodiments, the compounds of the present invention are represented by any of the following structures:
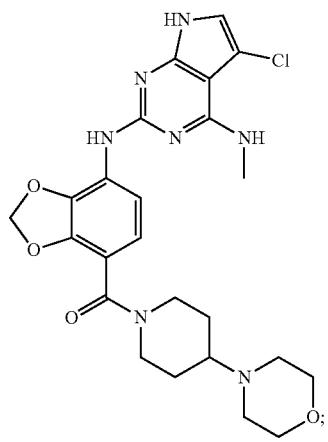
(75)
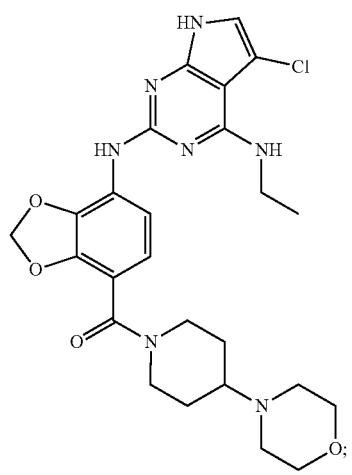
(122)
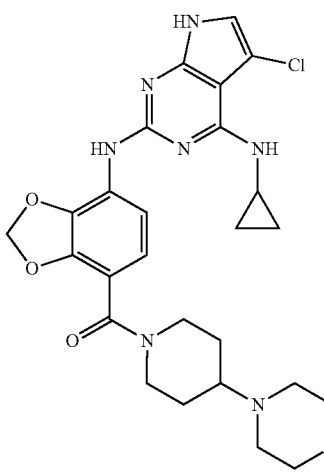
(123)
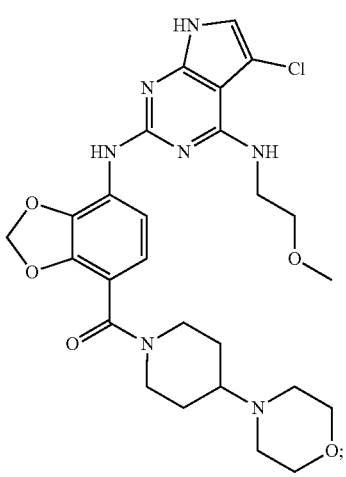
(124)
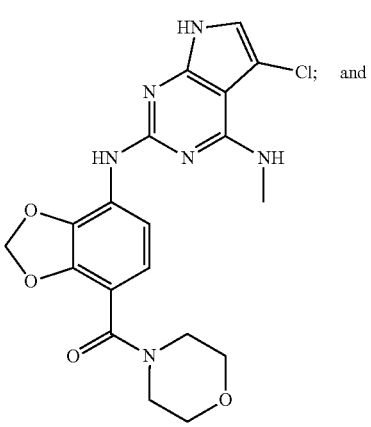
(125)

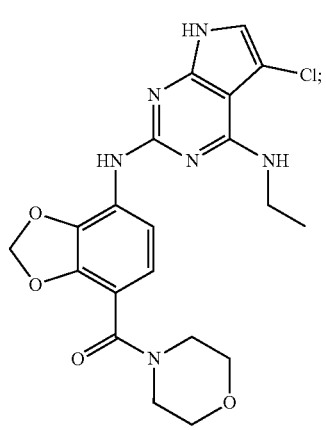
(126)

or a pharmaceutically acceptable salt or stereoisomer thereof.

In some embodiments, the compounds of the present invention have a structure represented by formula (Ia-3):

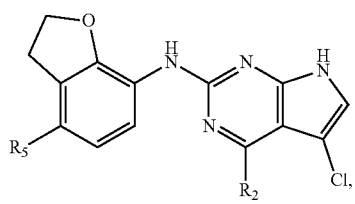
(Ia-3)

wherein $X_1$ is $CR_1$, $R_1$ is Cl, $X_2$ is CH, and $R_3$ and $R_4$, together the atoms to which they are attached, form a 2,3-dihydrofuranyl group.

In some embodiments, the compounds of the present invention are represented by any of the following structures:

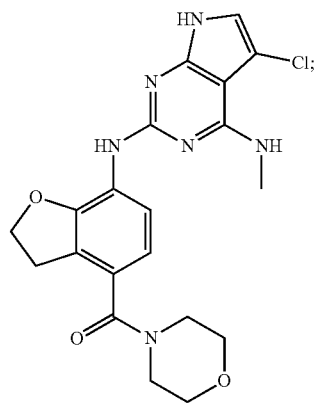
(76)

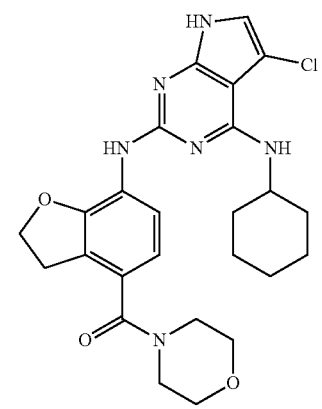
(80)

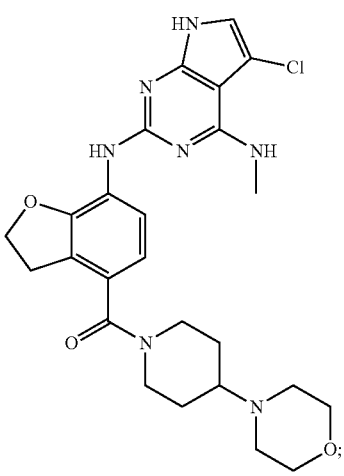
(83)

(86)

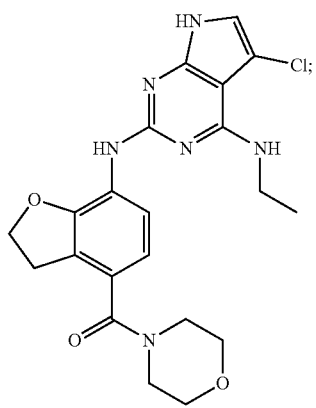

(101)

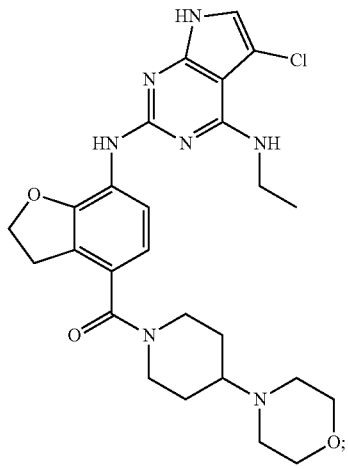

(105)

or a pharmaceutically acceptable salt or stereoisomer thereof.

In some embodiments, wherein $X_1$ is $CR_1$, $R_1$ is Cl, $X_2$ is CH, $R_3$ is methoxy and $R_4$ is H, the compounds of the present invention have a structure represented by formula (Ia-4):

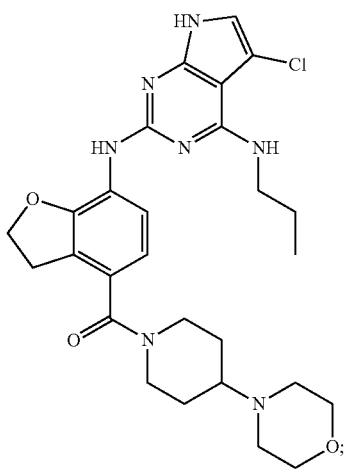

(102)

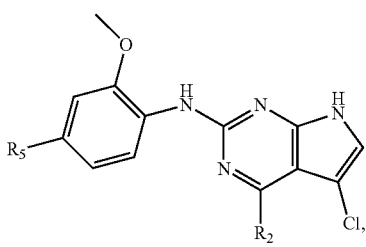

(Ia-4)

or a pharmaceutically acceptable salt or stereoisomer thereof.

In some embodiments, wherein $X_1$ and $X_2$ is CH, $R_3$ is methoxy and $R_4$ is H, the compounds of the present invention have a structure represented by formula (Ia-5):

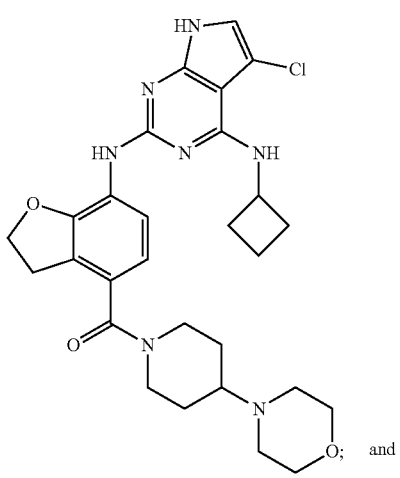

(103)

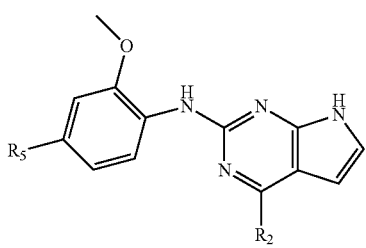

(Ia-5)

; and or a pharmaceutically acceptable salt or stereoisomer thereof.

In some embodiments, wherein $X_1$ is CH, and $X_2$ is N, the compounds of the present invention have a structure represented by formula (Ib):

(Ib)

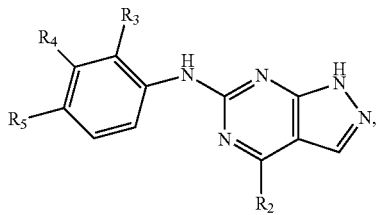

or a pharmaceutically acceptable salt or stereoisomer thereof.

In some embodiments, wherein $X_1$ is N, and $X_2$ is CH, the compounds of the present invention have a structure represented by formula (Ic):

(Ic)

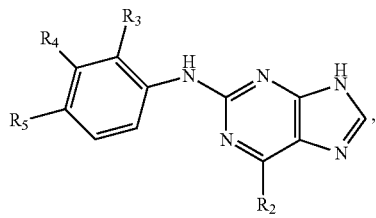

or a pharmaceutically acceptable salt or stereoisomer thereof.

In some embodiments, the compounds of the present invention are represented by any of the following structures:

(6)

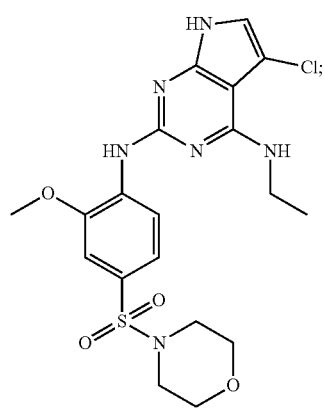

(7)

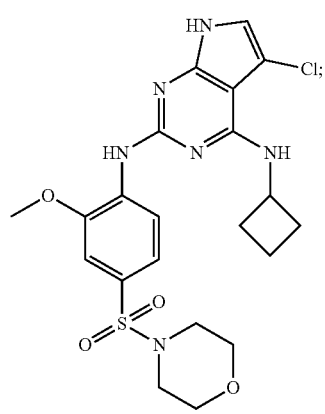

(8)

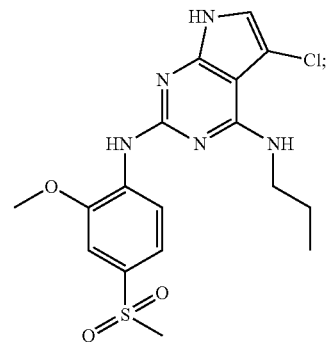

(11)

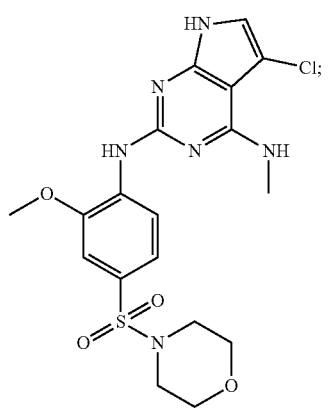

(12)

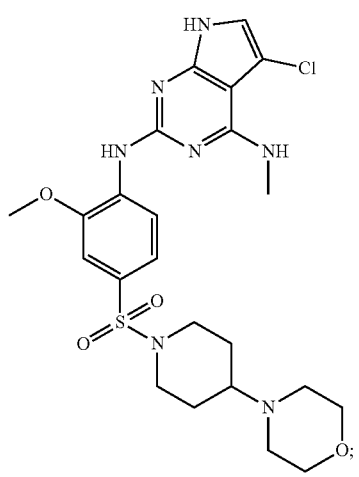

(13)

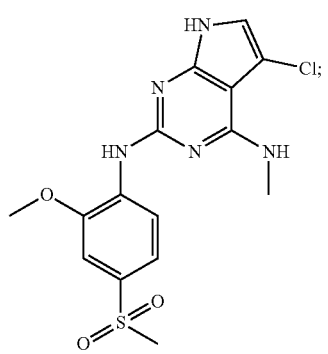

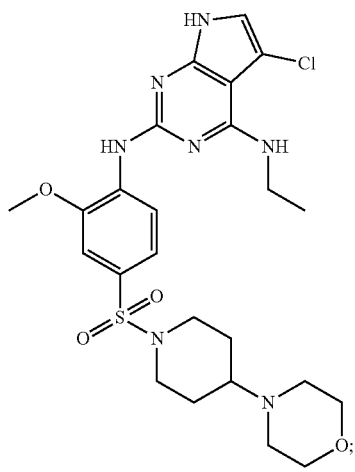
(15)
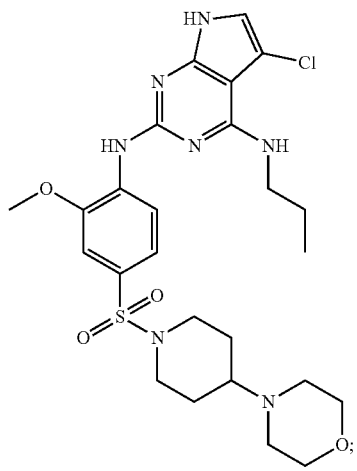
(19)
(16)
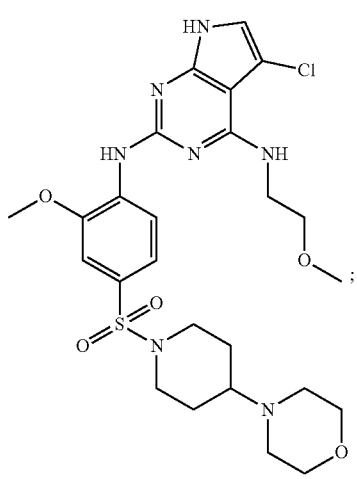
(21)
(18)
(22)

-continued
(23)
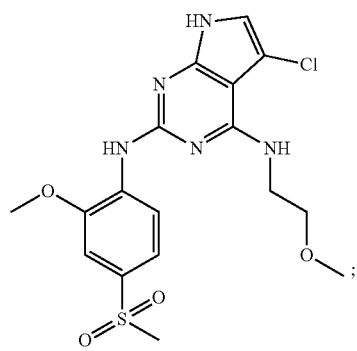
(24)
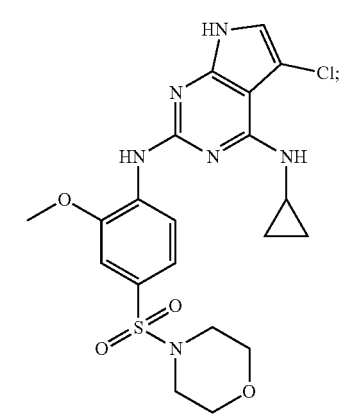
(25)
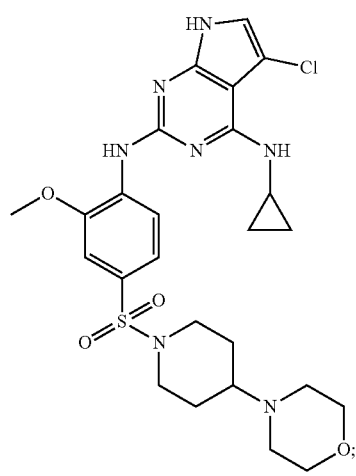
(26)
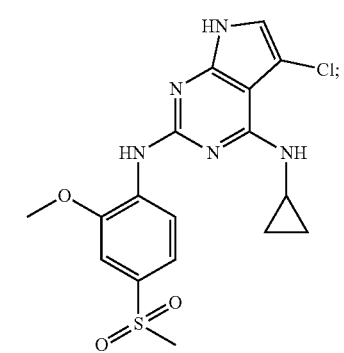
-continued
(28)
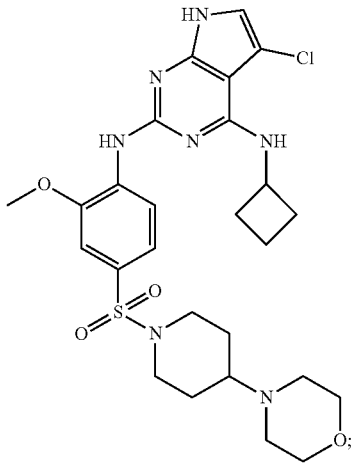
(29)
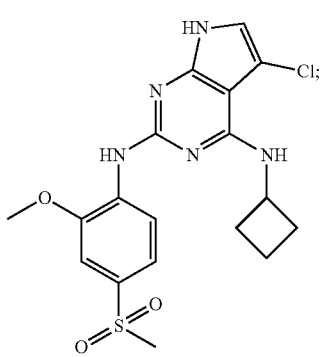
(31)
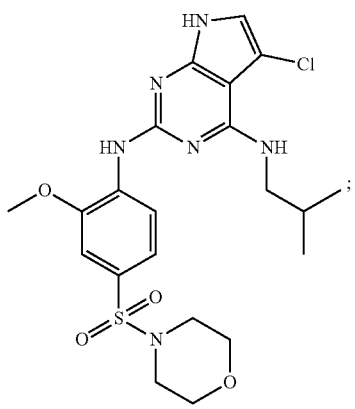
(32)
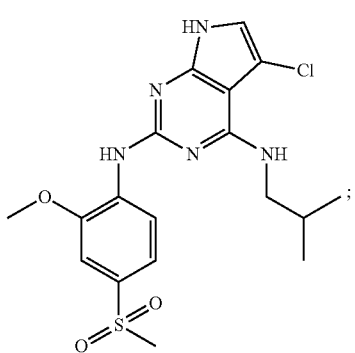

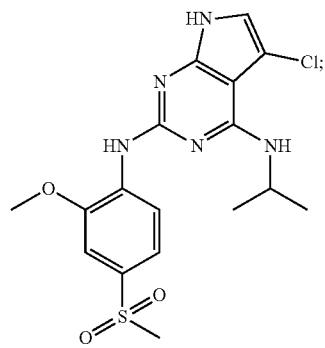
(34)
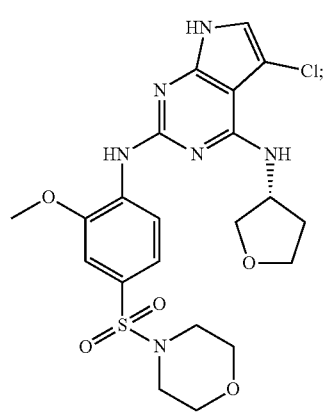
(38)
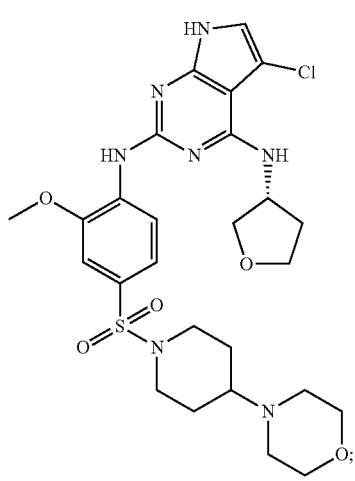
(39)
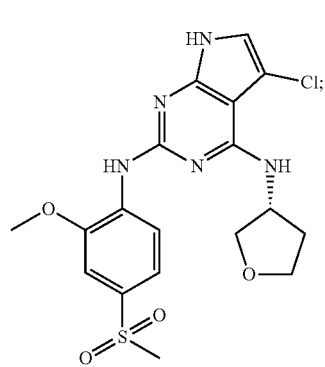
(40)
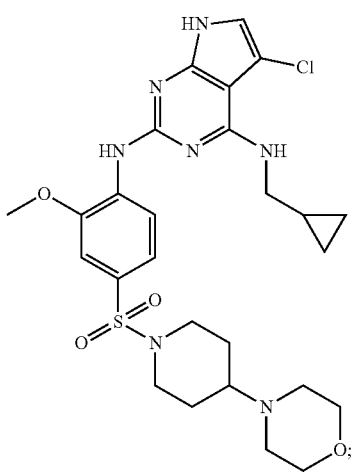
(41)
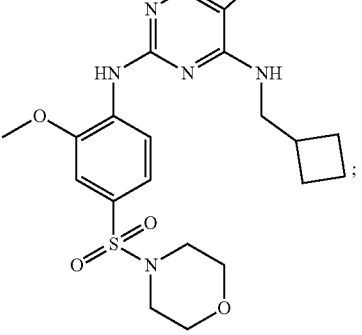
(42)
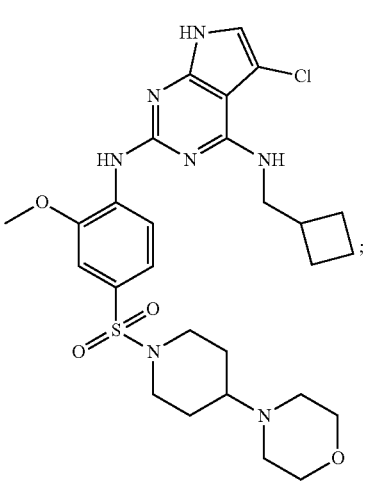
(43)

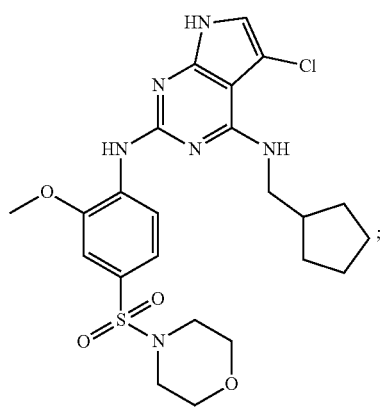
(45)
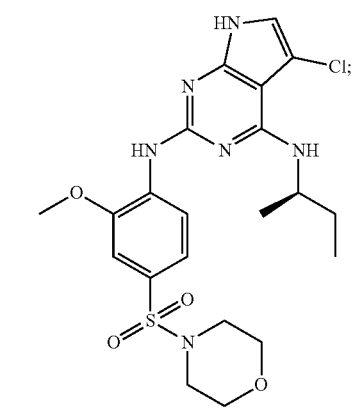
(47)
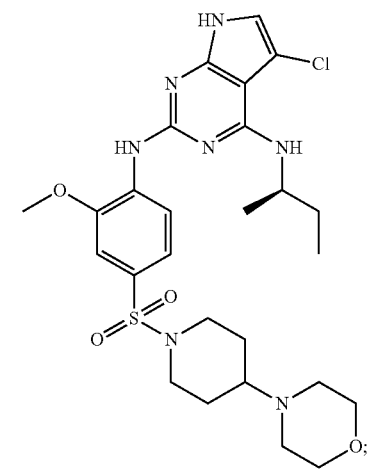
(48)
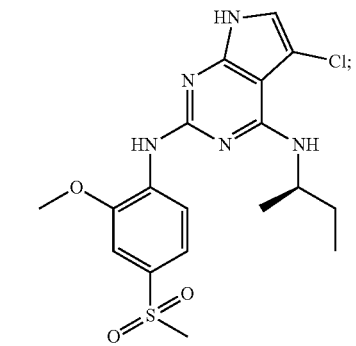
(49)
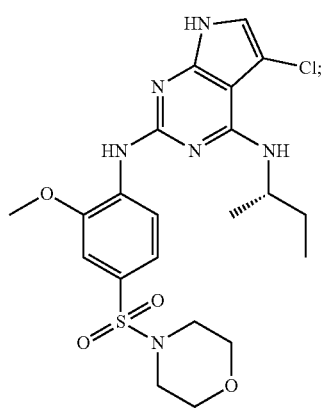
(51)
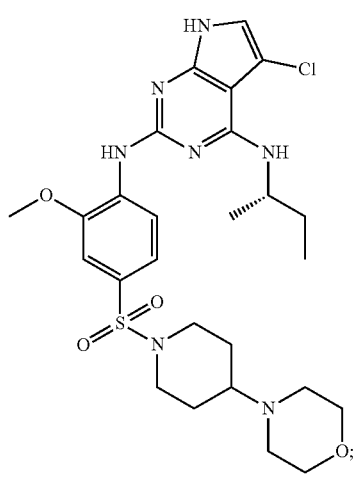
(52)
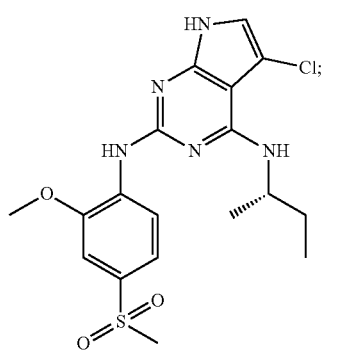
(53)
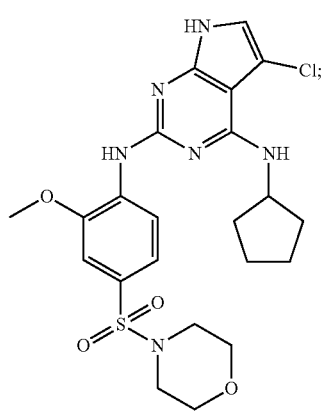
(55)

(56) 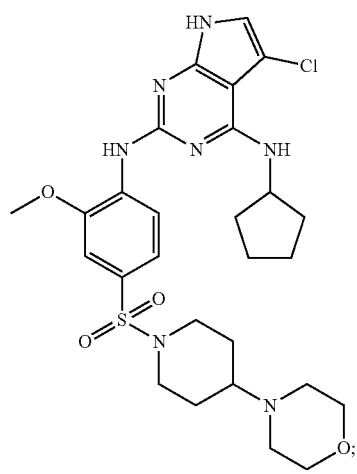
(57) 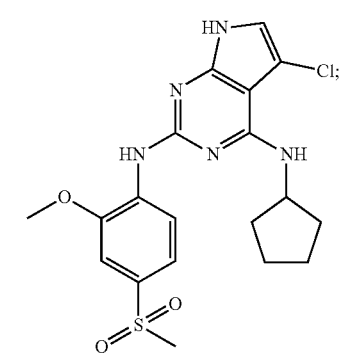
(58) 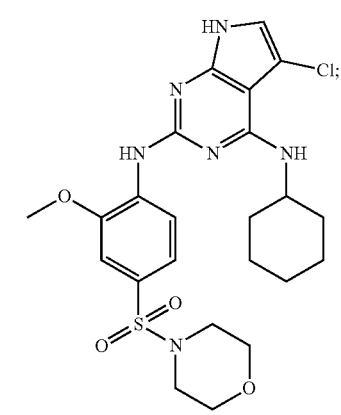
(59) 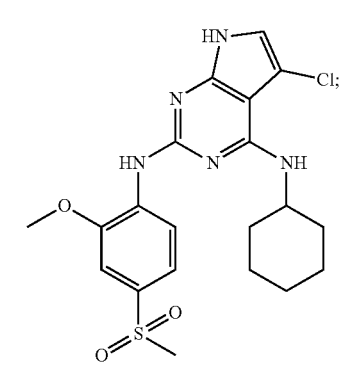
(60) 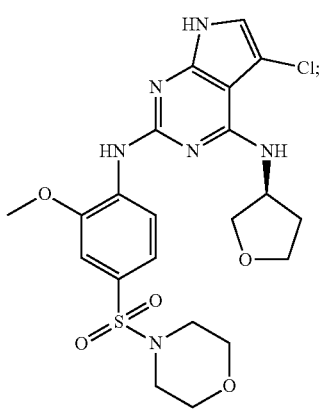
(61) 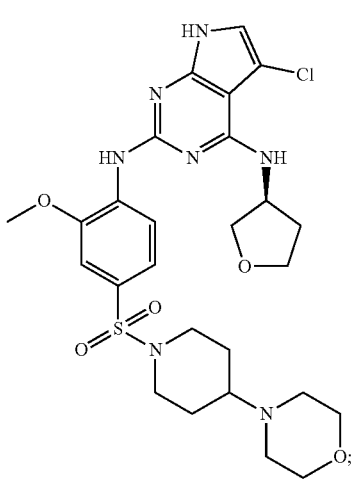
(62) 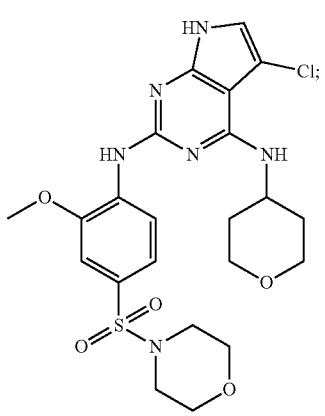
(63) 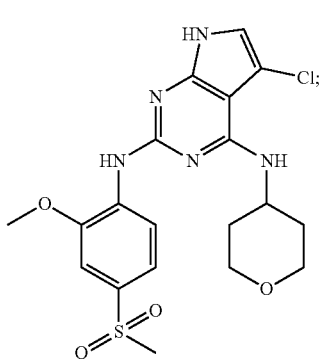

(64) 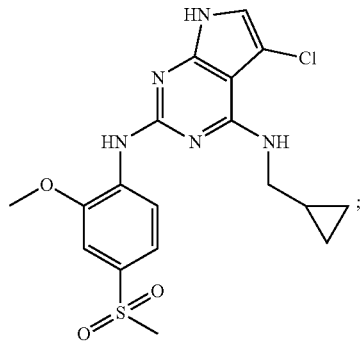
(66) 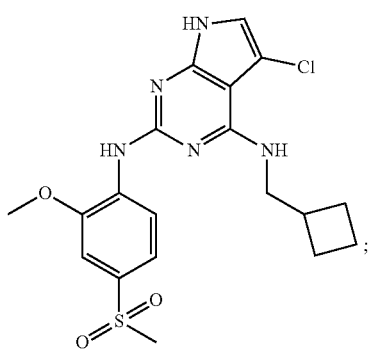
(67) 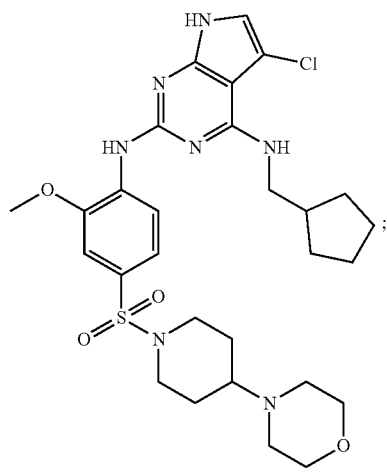
(68) 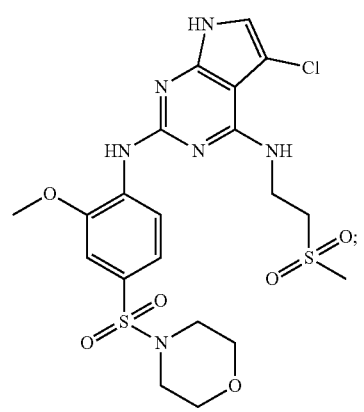
(69) 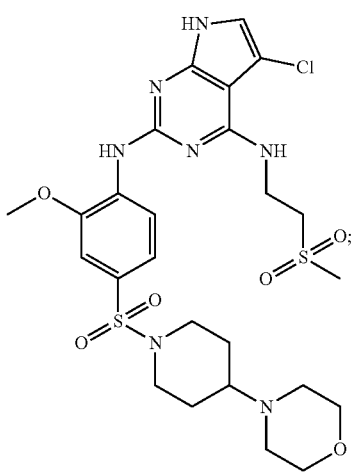
(71) 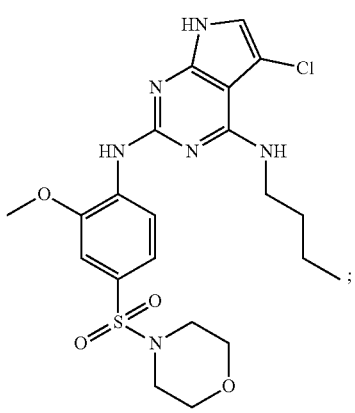
(72) 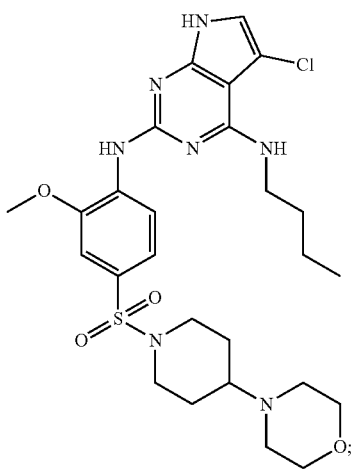

(73)
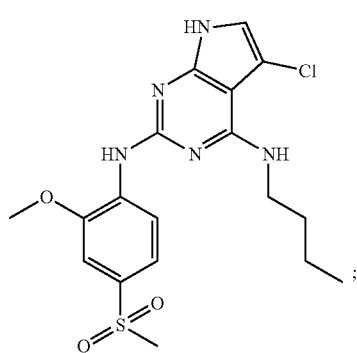
(77)
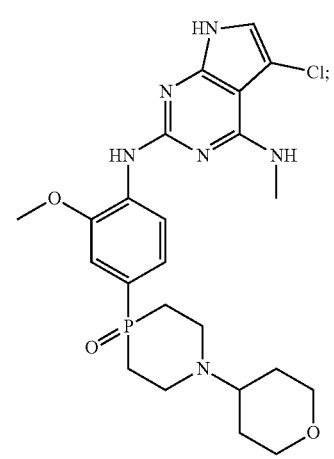
(78)
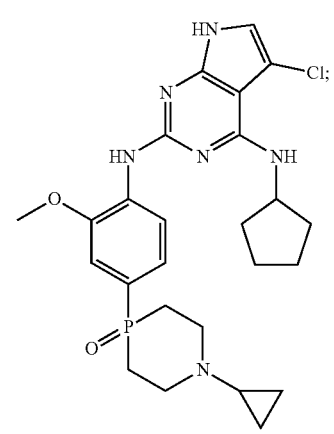
(79)
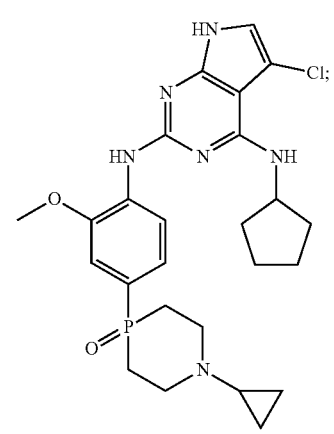
(81)
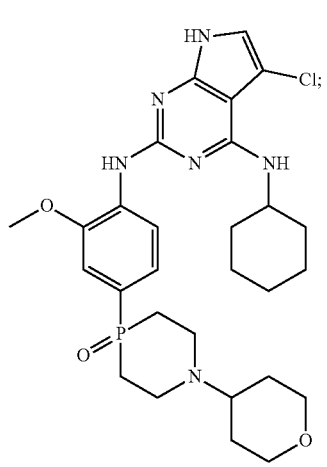
(82)
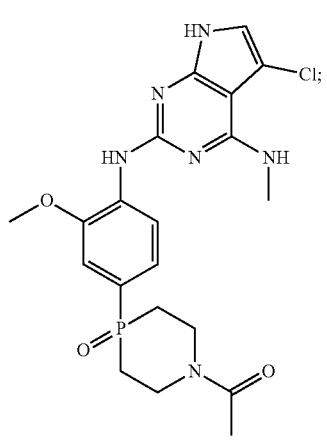
(84)
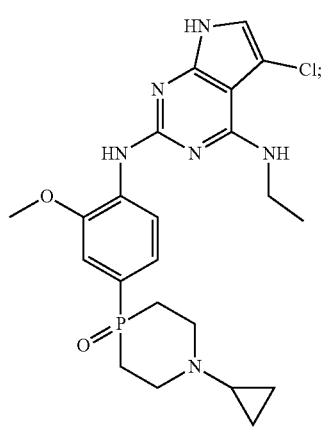

(85) 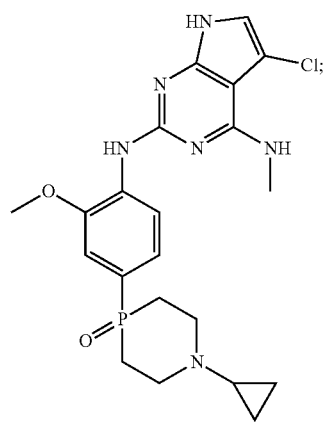
(87) 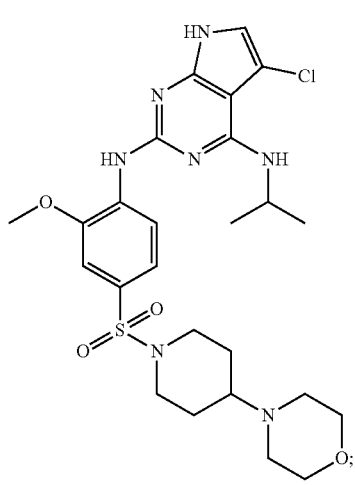
(89) 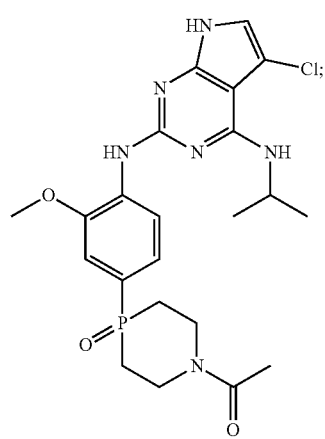
(90) 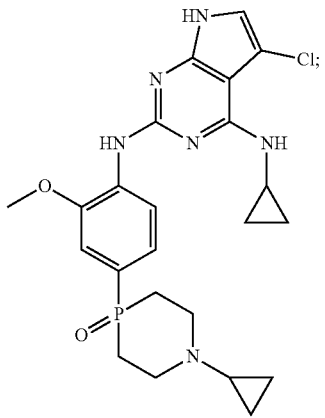
(91) 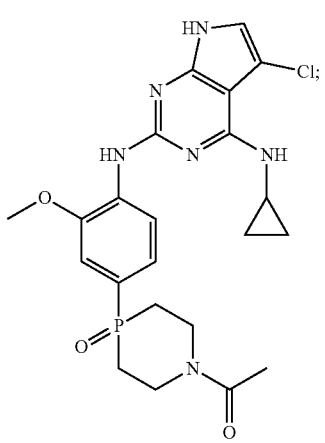
(92) 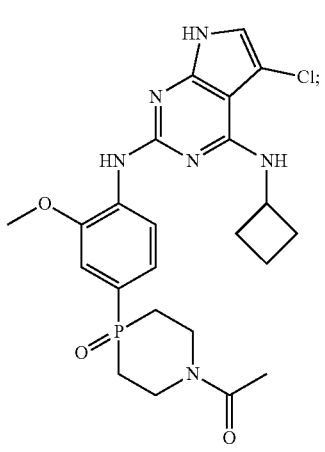

-continued
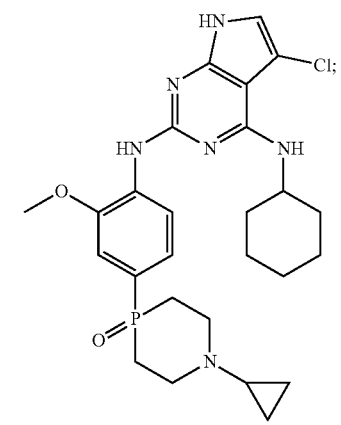
(93)
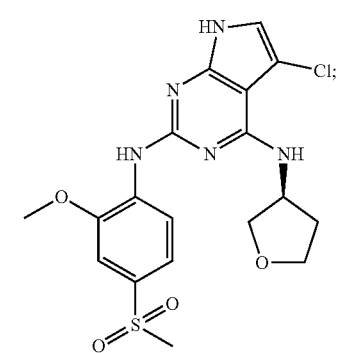
(94)
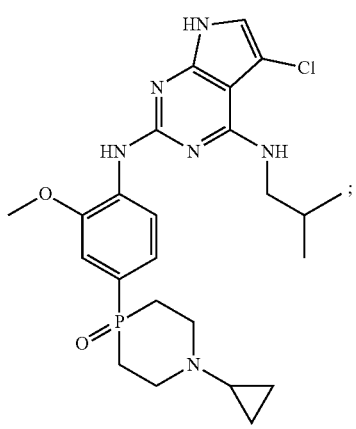
(96)
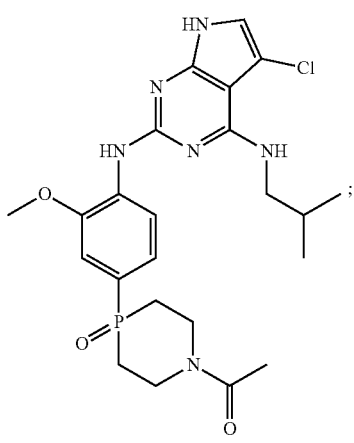
(97)
-continued
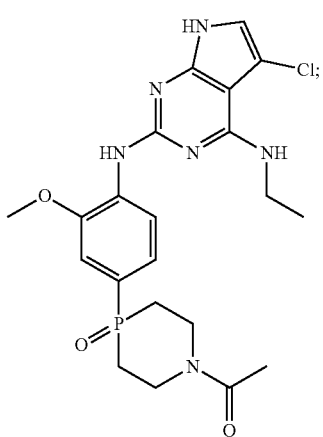
(98)
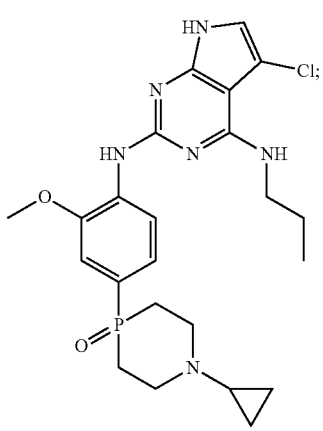
(99)
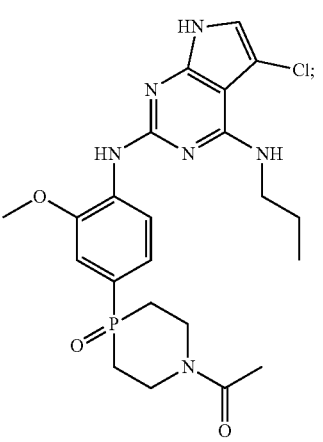
(100)
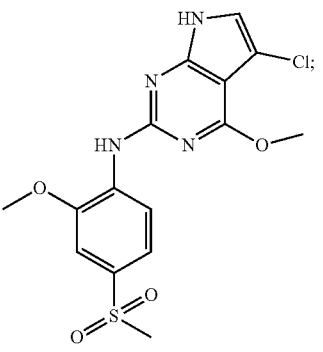
(127)

-continued
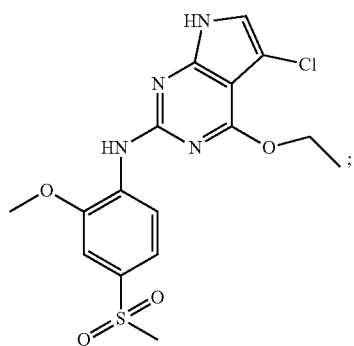 (128)
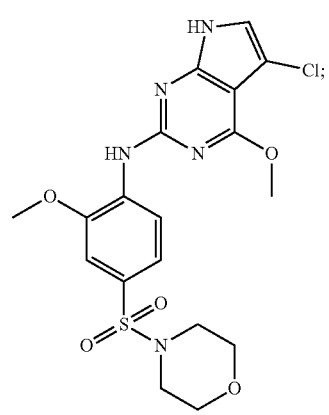 (129)
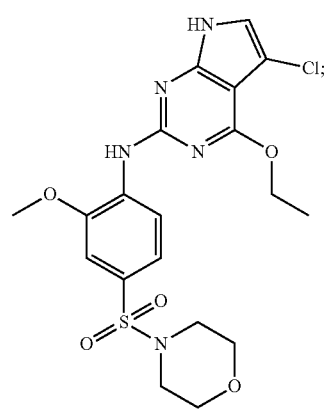 (130)
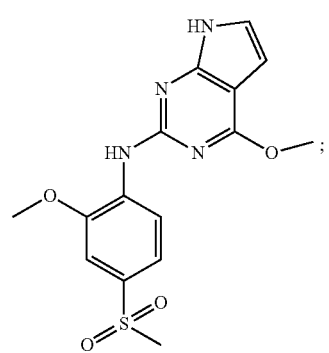 (131)
-continued
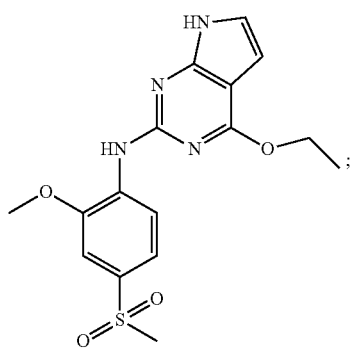 (132)
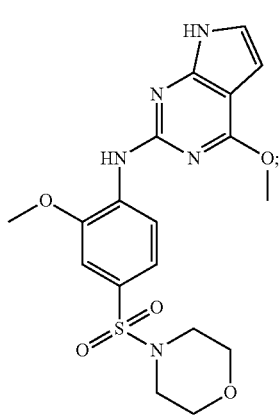 (133)
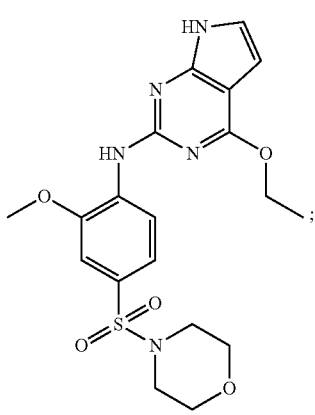 (134)
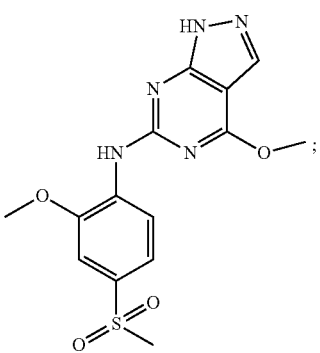 (135)

-continued
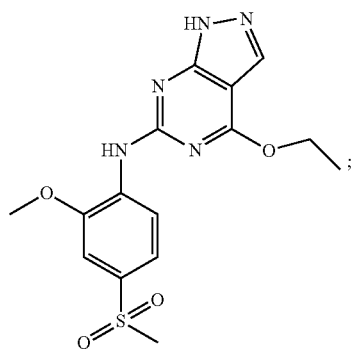 (136)
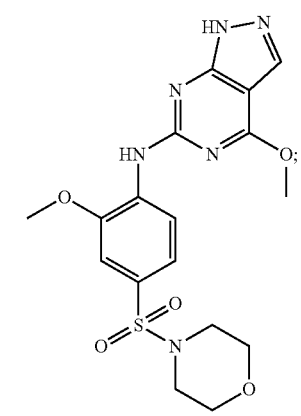 (137)
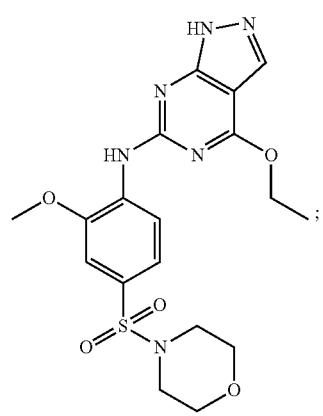 (138)
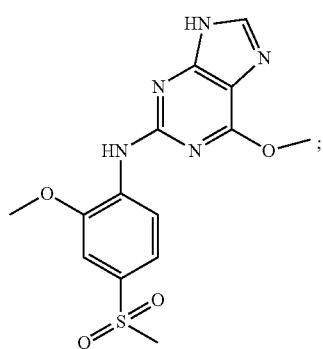 (139)
-continued
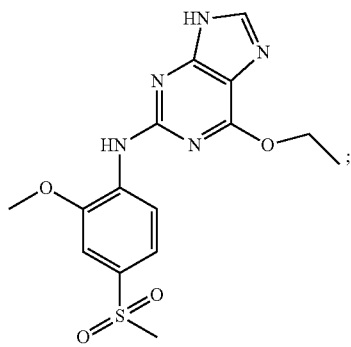 (140)
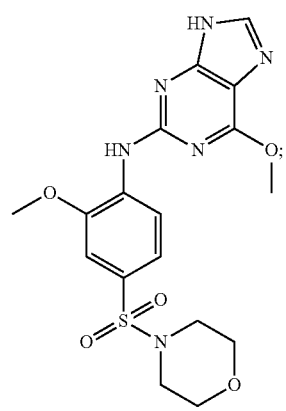 (141)
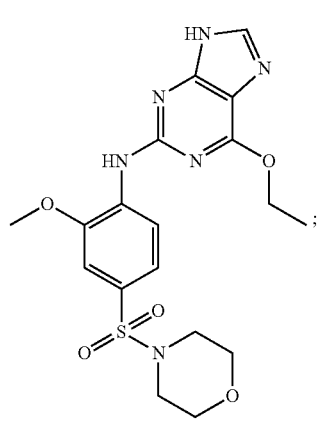 (142)
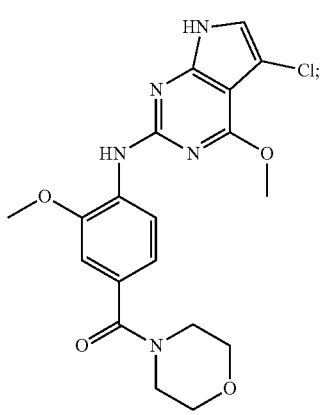 (143)

(144) 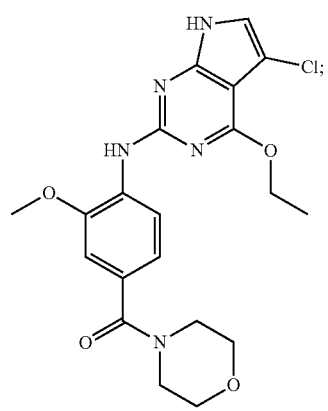

(145) 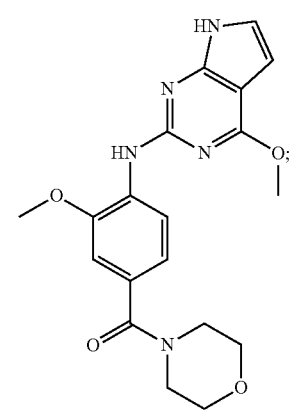

(146) 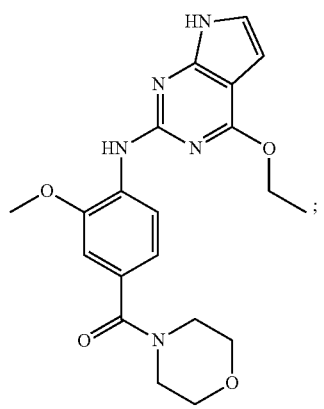

(147) 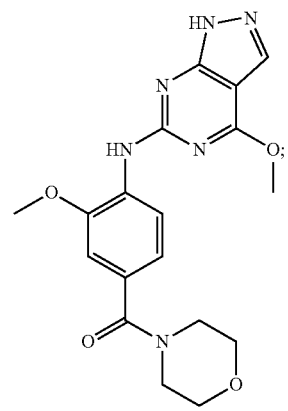

(148) 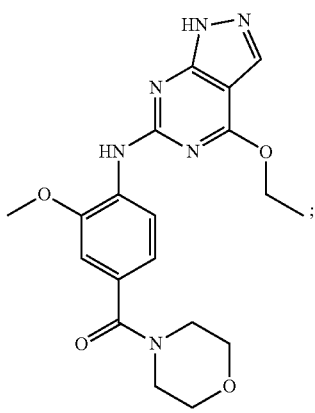

(149) 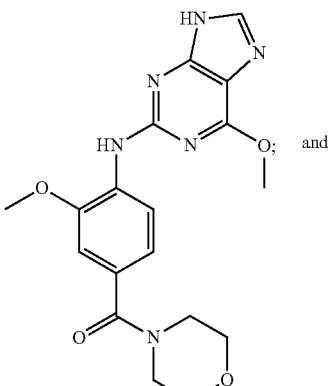 and (150) 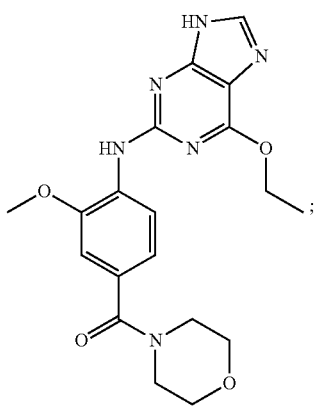

or a pharmaceutically acceptable salt or stereoisomer thereof.

Compounds of formula I may be in the form of a free acid or free base, or a pharmaceutically acceptable salt. As used herein, the term "pharmaceutically acceptable" in the context of a salt refers to a salt of the compound that does not abrogate the biological activity or properties of the compound, and is relatively non-toxic, i.e., the compound in salt form may be administered to a subject without causing undesirable biological effects (such as dizziness or gastric upset) or interacting in a deleterious manner with any of the other components of the composition in which it is contained. The term "pharmaceutically acceptable salt" refers to a product obtained by reaction of the compound of the present invention with a suitable acid or a base. Examples of pharmaceutically acceptable salts of the compounds of this invention include those derived from suitable inorganic bases such as Li, Na, K, Ca, Mg, Fe, Cu, Al, Zn and Mn salts. Examples of pharmaceutically acceptable, nontoxic acid addition salts are salts of an amino group formed with inorganic acids such as hydrochloride, hydrobromide, hydroiodide, nitrate, sulfate, bisulfate, phosphate, isonicotinate, acetate, lactate, salicylate, citrate, tartrate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, 4-methylbenzenesulfonate or p-toluenesulfonate salts and the like. Certain compounds of the invention can form pharmaceutically acceptable salts with various organic bases such as lysine, arginine, guanidine, diethanolamine or metformin.

Compounds of formula I may have at least one chiral center and thus may be in the form of a stereoisomer, which as used herein, embraces all isomers of individual compounds that differ only in the orientation of their atoms in space. The term stereoisomer includes mirror image isomers (enantiomers which include the (R-) or (S-) configurations of the compounds), mixtures of mirror image isomers (physical mixtures of the enantiomers, and racemates or racemic mixtures) of compounds, geometric (cis/trans or E/Z, R/S) isomers of compounds and isomers of compounds with more than one chiral center that are not mirror images of one another (diastereoisomers). The chiral centers of the compounds may undergo epimerization in vivo; thus, for these compounds, administration of the compound in its (R-) form is considered equivalent to administration of the compound in its (S-) form. Accordingly, the compounds of the present invention may be made and used in the form of individual isomers and substantially free of other isomers, or in the form of a mixture of various isomers, e.g., racemic mixtures of stereoisomers.

In some embodiments, the compound of formula I is an isotopic derivative in that it has at least one desired isotopic substitution of an atom, at an amount above the natural abundance of the isotope, i.e., enriched. In one embodiment, the compound includes deuterium or multiple deuterium atoms. Substitution with heavier isotopes such as deuterium, i.e. $^2$H, may afford certain therapeutic advantages resulting from greater metabolic stability, for example, increased in vivo half-life or reduced dosage requirements, and thus may be advantageous in some circumstances.

In addition, the compounds of formula I embrace N-oxides, crystalline forms (also known as polymorphs), active metabolites of the compounds having the same type of activity, tautomers, and unsolvated as well as solvated forms with pharmaceutically acceptable solvents such as water, ethanol, and the like, of the compounds. The solvated forms of the conjugates presented herein are also considered to be disclosed herein.

Methods of Synthesis

In some embodiments, the present invention is directed to a method for making a compound of formula I or a pharmaceutically acceptable salt or stereoisomer thereof. Broadly, the compounds of formula I and pharmaceutically-acceptable salts and stereoisomers thereof, may be prepared by any process known to be applicable to the preparation of chemically related compounds. The compounds of the present invention will be better understood in connection with the synthetic schemes that described in various working examples and which illustrate non-limiting methods by which the compounds of the invention may be prepared.

Pharmaceutical Compositions

Another aspect of the present invention is directed to a pharmaceutical composition that includes a therapeutically effective amount of a compound of formula I or a pharmaceutically acceptable salt or stereoisomer thereof, and a pharmaceutically acceptable carrier. The term "pharmaceutically acceptable carrier," as known in the art, refers to a pharmaceutically acceptable material, composition or vehicle, suitable for administering compounds of the present invention to mammals. Suitable carriers may include, for example, liquids (both aqueous and non-aqueous alike, and combinations thereof), solids, encapsulating materials, gases, and combinations thereof (e.g., semi-solids), and gases, that function to carry or transport the compound from one organ, or portion of the body, to another organ, or portion of the body. A carrier is "acceptable" in the sense of being physiologically inert to and compatible with the other ingredients of the formulation and not injurious to the subject or patient. Depending on the type of formulation, the composition may include one or more pharmaceutically acceptable excipients.

Broadly, compounds of formula I and their pharmaceutically acceptable salts and stereoisomers may be formulated into a given type of composition in accordance with conventional pharmaceutical practice such as conventional mixing, dissolving, granulating, dragee-making, levigating, emulsifying, encapsulating, entrapping and compression processes (see, e.g., Remington: *The Science and Practice of Pharmacy* (20th ed.), ed. A. R. Gennaro, *Lippincott Williams & Wilkins*, 2000 and *Encyclopedia of Pharmaceutical Technology*, eds. J. Swarbrick and J. C. Boylan, 1988-1999, Marcel Dekker, New York). The type of formulation depends on the mode of administration which may include enteral (e.g., oral, buccal, sublingual and rectal), parenteral (e.g., subcutaneous (s.c.), intravenous (i.v.), intramuscular (i.m.), and intrasternal injection, or infusion techniques, intra-ocular, intra-arterial, intramedullary, intrathecal, intraventricular, transdermal, interdermal, intravaginal, intraperitoneal, mucosal, nasal, intratracheal instillation, bronchial instillation, and inhalation) and topical (e.g., transdermal). In general, the most appropriate route of administration will depend upon a variety of factors including, for example, the nature of the agent (e.g., its stability in the environment of the gastrointestinal tract), and/or the condition of the subject (e.g., whether the subject is able to tolerate oral administration). For example, parenteral (e.g., intravenous) administration may also be advantageous in that the compound may be administered relatively quickly such as in the case of a single-dose treatment and/or an acute condition.

In some embodiments, the compounds are formulated for oral or intravenous administration (e.g., systemic intravenous injection).

Accordingly, the compounds and pharmaceutically acceptable salts and stereoisomers thereof may be formulated into solid compositions (e.g., powders, tablets, dispersible granules, capsules, cachets, and suppositories), liquid compositions (e.g., solutions in which the compound is dissolved, suspensions in which solid particles of the compound are dispersed, emulsions, and solutions containing liposomes, micelles, or nanoparticles, syrups and elixirs); semi-solid compositions (e.g., gels, suspensions and creams); and gases (e.g., propellants for aerosol compositions). Compounds may also be formulated for rapid, intermediate or extended release.

Solid dosage forms for oral administration include capsules, tablets, pills, powders, and granules. In such solid dosage forms, the active compound is mixed with a carrier such as sodium citrate or dicalcium phosphate and an additional carrier or excipient such as: a) fillers or extenders such as starches, lactose, sucrose, glucose, mannitol, and silicic acid, b) binders such as, for example, methylcellulose, microcrystalline cellulose, hydroxypropylmethylcellulose, carboxymethylcellulose, sodium carboxymethylcellulose, alginates, gelatin, polyvinylpyrrolidinone, sucrose, and acacia, c) humectants such as glycerol, d) disintegrating agents such as crosslinked polymers (e.g, crosslinked poly vinylpyrrolidone (crospovidone), crosslinked sodium carboxymethyl cellulose (croscarmellose sodium), sodium starch glycolate, agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. In the case of capsules, tablets and pills, the dosage form may also include buffering agents. Solid compositions of a similar type may also be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings. They may further contain an opacifying agent.

In some embodiments, compounds of formula I may be formulated in a hard or soft gelatin capsule. Representative excipients that may be used include pregelatinized starch, magnesium stearate, mannitol, sodium stearyl fumarate, lactose anhydrous, microcrystalline cellulose and croscarmellose sodium. Gelatin shells may include gelatin, titanium dioxide, iron oxides and colorants.

Liquid dosage forms for oral administration include solutions, suspensions, emulsions, micro-emulsions, syrups and elixirs. In addition to the compound, the liquid dosage forms may contain an aqueous or non-aqueous carrier (depending upon the solubility of the compounds) commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethylformamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof. Oral compositions may also include an excipients such as wetting agents, suspending agents, coloring, sweetening, flavoring, and perfuming agents.

Injectable preparations for parenteral administration may include sterile aqueous solutions or oleaginous suspensions. They may be formulated according to standard techniques using suitable dispersing or wetting agents and suspending agents. The sterile injectable preparation may also be a sterile injectable solution, suspension or emulsion in a nontoxic parenterally acceptable diluent or solvent, for example, as a solution in 1,3-butanediol. Among the acceptable vehicles and solvents that may be employed are water, Ringer's solution, U.S.P. and isotonic sodium chloride solution. In addition, sterile, fixed oils are conventionally employed as a solvent or suspending medium. For this purpose any bland fixed oil can be employed including synthetic mono- or diglycerides. In addition, fatty acids such as oleic acid are used in the preparation of injectables. The injectable formulations can be sterilized, for example, by filtration through a bacterial-retaining filter, or by incorporating sterilizing agents in the form of sterile solid compositions which can be dissolved or dispersed in sterile water or other sterile injectable medium prior to use. The effect of the compound may be prolonged by slowing its absorption, which may be accomplished by the use of a liquid suspension or crystalline or amorphous material with poor water solubility. Prolonged absorption of the compound from a parenterally administered formulation may also be accomplished by suspending the compound in an oily vehicle.

In certain embodiments, compounds of formula I may be administered in a local rather than systemic manner, for example, via injection of the conjugate directly into an organ, often in a depot preparation or sustained release formulation. In specific embodiments, long acting formulations are administered by implantation (for example subcutaneously or intramuscularly) or by intramuscular injection. Injectable depot forms are made by forming microencapsule matrices of the compound in a biodegradable polymer, e.g., polylactide-polyglycolides, poly(orthoesters) and poly(anhydrides). The rate of release of the compound may be controlled by varying the ratio of compound to polymer and the nature of the particular polymer employed. Depot injectable formulations are also prepared by entrapping the compound in liposomes or microemulsions that are compatible with body tissues. Furthermore, in other embodiments, the compound is delivered in a targeted drug delivery system, for example, in a liposome coated with organ-specific antibody. In such embodiments, the liposomes are targeted to and taken up selectively by the organ.

The compounds of formula I may be formulated for buccal or sublingual administration, examples of which include tablets, lozenges and gels.

The compounds of formula I may be formulated for administration by inhalation. Various forms suitable for administration by inhalation include aerosols, mists and powders. Pharmaceutical compositions may be delivered in the form of an aerosol spray presentation from pressurized packs or a nebulizer, with the use of a suitable gaseous propellant (e.g., dichlorodifluoromethane, trichlorofluoromethane, dichlorotetrafluoroethane, carbon dioxide or other suitable gas). In some embodiments, the dosage unit of a pressurized aerosol may be determined by providing a valve to deliver a metered amount. In some embodiments, capsules and cartridges including gelatin, for example, for use in an inhaler or insufflator, may be formulated containing a powder mix of the compound and a suitable powder base such as lactose or starch.

The compounds of formula I may be formulated for topical administration which as used herein, refers to administration intradermally by application of the formulation to the epidermis. These types of compositions are typically in the form of ointments, pastes, creams, lotions, gels, solutions and sprays.

Representative examples of carriers useful in formulating compositions for topical application include solvents (e.g., alcohols, poly alcohols, water), creams, lotions, ointments, oils, plasters, liposomes, powders, emulsions, microemulsions, and buffered solutions (e.g., hypotonic or buffered saline). Creams, for example, may be formulated using saturated or unsaturated fatty acids such as stearic acid, palmitic acid, oleic acid, palmito-oleic acid, cetyl, or oleyl alcohols. Creams may also contain a non-ionic surfactant such as polyoxy-40-stearate.

In some embodiments, the topical formulations may also include an excipient, an example of which is a penetration enhancing agent. These agents are capable of transporting a pharmacologically active compound through the stratum corneum and into the epidermis or dermis, preferably, with little or no systemic absorption. A wide variety of compounds have been evaluated as to their effectiveness in enhancing the rate of penetration of drugs through the skin. See, for example, *Percutaneous Penetration Enhancers*, Maibach H. I. and Smith H. E. (eds.), CRC Press, Inc., Boca Raton, Fla. (1995), which surveys the use and testing of various skin penetration enhancers, and Buyuktimkin et al., *Chemical Means of Transdermal Drug Permeation Enhancement in Transdermal and Topical Drug Delivery Systems*, Gosh T. K., Pfister W. R., Yum S. I. (Eds.), Interpharm Press Inc., Buffalo Grove, Ill. (1997). Representative examples of penetration enhancing agents include triglycerides (e.g., soybean oil), aloe compositions (e.g., aloe-vera gel), ethyl alcohol, isopropyl alcohol, octolyphenylpolyethylene glycol, oleic acid, polyethylene glycol 400, propylene glycol, N-decylmethylsulfoxide, fatty acid esters (e.g., isopropyl myristate, methyl laurate, glycerol monooleate, and propylene glycol monooleate), and N-methylpyrrolidone.

Representative examples of yet other excipients that may be included in topical as well as in other types of formulations (to the extent they are compatible), include preservatives, antioxidants, moisturizers, emollients, buffering agents, solubilizing agents, skin protectants, absorption enhancers and surfactants. Suitable preservatives include alcohols, quaternary amines, organic acids, parabens, and phenols. Suitable antioxidants include ascorbic acid and its esters, sodium bisulfite, butylated hydroxytoluene, butylated hydroxyanisole, tocopherols, and chelating agents like EDTA and citric acid. Suitable moisturizers include glycerin, sorbitol, polyethylene glycols, urea, and propylene glycol. Suitable buffering agents include citric, hydrochloric, and lactic acid buffers. Suitable solubilizing agents include quaternary ammonium chlorides, cyclodextrins, benzyl benzoate, lecithin, and polysorbates. Suitable skin protectants include vitamin E oil, allatoin, dimethicone, glycerin, petrolatum, and zinc oxide.

Transdermal formulations typically employ transdermal delivery devices and transdermal delivery patches wherein the compound is formulated in lipophilic emulsions or buffered, aqueous solutions, dissolved and/or dispersed in a polymer or an adhesive. Patches may be constructed for continuous, pulsatile, or on demand delivery of pharmaceutical agents. Transdermal delivery of the compound may be accomplished by means of an iontophoretic patch. Transdermal patches may provide controlled delivery of the compounds wherein the rate of absorption is slowed by using rate-controlling membranes or by trapping the compound within a polymer matrix or gel. Absorption enhancers may be used to increase absorption, examples of which include absorbable pharmaceutically acceptable solvents that assist passage through the skin.

Ophthalmic formulations include eye drops.

Formulations for rectal administration include enemas, rectal gels, rectal foams, rectal aerosols, and retention enemas, which may contain conventional suppository bases such as cocoa butter or other glycerides, as well as synthetic polymers such as polyvinylpyrrolidone, PEG, and the like. Compositions for rectal or vaginal administration may also be formulated as suppositories which can be prepared by mixing the compound with suitable non-irritating carriers and excipients such as cocoa butter, mixtures of fatty acid glycerides, polyethylene glycol, suppository waxes, and combinations thereof, all of which are solid at ambient temperature but liquid at body temperature and therefore melt in the rectum or vaginal cavity and release the compound.

Dosage Amounts

As used herein, the term, "therapeutically effective amount" refers to an amount of a compound of formula I or a pharmaceutically acceptable salt or a stereoisomer thereof that is effective in producing the desired therapeutic response in a particular patient suffering from dysregulated or aberrant LRRK2-mediated disease or disorder. The term "therapeutically effective amount" includes the amount of the compound of formula I or a pharmaceutically acceptable salt or a stereoisomer thereof, that when administered, induces a positive modification in the disease or disorder to be treated (e.g., to inhibit and/or reduce LRRK2 GTP binding activity and/or LRRK2 protein kinase activity and microglial activation, and to inhibit mutant LRRK2-induced neuronal degeneration), or is sufficient to prevent the development or progression of the disease or disorder, or alleviate to some extent, one or more symptoms of the disease or disorder being treated in a subject, or which simply kills or inhibits the growth of diseased cells, or reduces the amount of LRRK2 in diseased cells (e.g. the basal ganglia and the substantia nigra nerve cells).

The total daily dosage of the compounds and usage thereof may be decided in accordance with standard medical practice, e.g., by the attending physician using sound medical judgment. The specific therapeutically effective dose for any particular subject will depend upon a variety of factors including the disease or disorder being treated and the severity thereof (e.g., its present status); the activity of the specific compound employed; the specific composition employed; the age, body weight, general health, sex and diet of the subject; the time of administration, route of administration, and rate of excretion of the specific compound employed; the duration of the treatment; drugs used in combination or coincidental with the specific compound employed; and like factors well known in the medical arts (see, for example, *Goodman and Gilman's, The Pharmacological Basis of Therapeutics*, 10th Edition, A. Gilman, J. Hardman and L. Limbird, eds., McGraw-Hill Press, 155-173, 2001).

The compounds of the present invention may be effective over a wide dosage range. In some embodiments, the total daily dosage (e.g., for adult humans) may range from about 0.001 to about 1600 mg, from 0.01 to about 1600 mg, from 0.01 to about 500 mg, from about 0.01 to about 100 mg, from about 0.5 to about 100 mg, from 1 to about 100-400 mg per day, from about 1 to about 50 mg per day, from about 5 to about 40 mg per day, and in yet other embodiments from about 10 to about 30 mg per day. Individual dosages may be formulated to contain the desired dosage amount depending upon the number of times the compound is administered per day. By way of example, capsules may be formulated with from about 1 to about 200 mg of compound (e.g., 1, 2, 2.5, 3, 4, 5, 10, 15, 20, 25, 50, 100, 150, and 200 mg). In some embodiments, the compound may be administered at a dose in range from about 0.01 mg to about 200 mg/kg of body weight per day. In some embodiments, a dose of from 0.1 to 100 mg/Kg, e.g. from 1 to 30 mg/kg per day in one or more dosages per day may be effective. By way of example, a suitable dose for oral administration may be in the range of 1-30 mg/kg of body weight per day, and a suitable dose for intravenous administration may be in the range of 1-10 mg/kg of body weight per day. In some embodiments, the compound may be administered at a dose of a about 30 mg/Kg.

In some embodiments, the daily dosage of the compound is from about 37.5 mg to about 50 mg. To facilitate such dosing, the compounds may be formulated in capsules in dosages of 12.5 mg, 25 mg, and 50 mg.

METHODS OF USE

In some aspects, the present invention is directed to methods of treating diseases or disorders involving aberrant LRRK2 activity, that entails administration of a therapeutically effective amount of a bifunctional compound of formula I or a pharmaceutically acceptable salt or stereoisomer thereof, to a subject in need thereof.

The diseases or disorders may be said to be characterized or mediated by aberrant LRRK2 activity (e.g., elevated levels of LRRK2 or otherwise functionally abnormal LRRK2 relative to a non-pathological state). Aberrant protein activity may include elevated levels of protein relative to a non-pathological state or activity of a mutant form of the protein. A "disease" is generally regarded as a state of health of a subject wherein the subject cannot maintain homeostasis, and wherein if the disease is not ameliorated then the subject's health continues to deteriorate. In contrast, a "disorder" in a subject is a state of health in which the subject is able to maintain homeostasis, but in which the subject's state of health is less favorable than it would be in the absence of the disorder. Left untreated, a disorder does not necessarily cause a further decrease in the animal's state of health.

The term "subject" (or "patient") as used herein includes all members of the animal kingdom prone to or suffering from the indicated disease or disorder. In some embodiments, the subject is a mammal, e.g., a human or a non-human mammal. The methods are also applicable to companion animals such as dogs and cats as well as livestock such as cows, horses, sheep, goats, pigs, and other domesticated and wild animals. A subject "in need of" treatment according to the present invention may be "suffering from or suspected of suffering from" a specific disease or disorder may have been positively diagnosed or otherwise presents with a sufficient number of risk factors or a sufficient number or combination of signs or symptoms such that a medical professional could diagnose or suspect that the subject was suffering from the disease or disorder. Thus, subjects suffering from, and suspected of suffering from, a specific disease or disorder are not necessarily two distinct groups.

Representative examples of such diseases and disorders include neurodegenerative diseases and disorders, which as used herein, refer to the conditions characterized by progressive degeneration or death of nerve cells, or both, including problems with movement (ataxias), or mental functioning (dementias). Representative examples of neurodegenerative diseases and disorders include Alzheimer's disease (AD) and AD-related dementias, Parkinson's disease (PD) and PD-related dementias, prion disease, motor neuron diseases (MND), Huntington's disease (HD), spinocerebellar ataxia (SCA), spinal muscular atrophy (SMA), primary progressive aphasia (PPA), amyotrophic lateral sclerosis (ALS), traumatic brain injury (TBI), multiple sclerosis (MS), and dementias (e.g., vascular dementia (VaD), Lewy body dementia (LBD), semantic dementia, and frontotemporal lobar dementia (FTD)).

Other representative examples of such diseases and disorders include brain cancer. In some embodiments, the cancer is a glioma or glioblastoma. Glioma is a broad category of brain and spinal cord tumors that originate from glial cells brain cells that support nerve cells. Gliomas are one of the most common types of primary brain tumors. Representative examples of gliomas include astrocytomas, ependymomas and oligodendrogliomas. Glioblastoma is an aggressive type astrocytoma.

Compounds of formula (I) and their pharmaceutically acceptable salts and stereoisomers thereof may inhibit a plurality of aberrant kinases that in addition to LRRK2, include at least one of adaptor-associated protein kinase 1 (AAK1), anaplastic lymphoma kinase (ALK), ALK (C1156Y), ALK(L1196M), AMPK-related protein kinase 5 (ARK5), apoptosis signal-regulating kinase 1 (ASK1), calcium/calmodulin-dependent protein kinase kinase 2 (CAMKK2), cyclin-dependent kinase 7 (CDK7), checkpoint kinase 2 (CHEK2), CLK1, CLK2, CLK4, casein kinase I isoform alpha (CSNK1A1), casein kinase I isoform delta (CSNK1D), casein kinase I isoform epsilon (CSNK1E), casein kinase I isoform gamma 1 (CSNK1G1), CSNK1G2, CSNK1G3, casein kinase II isoform alpha (CSNK2A1), death-associated protein kinase 1 (DAPK1), DAPK2, death-associated protein kinase-related 1 (DRAK1), DRAK2, dual specificity tyrosine-phosphorylation-regulated kinase 1A (DYRK1A), DYRK1B, DYRK2, focal adhesion kinase (FAK), proto-oncogene tyrosine-protein kinase FER (FER), FLT3(D835V), FLT3(D835Y), FLT3(ITD), FMS like tyrosine kinase 3 (FLT)(ITD,D835V), FLT3(ITD,F691L), cyclin G-associated kinase (GAK), general control nonderepressible 2 (GCN2)(Kin.Dom.2,S808G), serine/threonine-protein kinase haspin (HASPIN), homeodomain-interacting protein kinase 1 (HIPK1), hormonally up-regulated neu tumor-associated kinase (HUNK), insulin receptor (INSR), Janus kinase 1 (JAK1)(JH2domain-pseudokinase), JAK3 (JH1domain-catalytic), c-Jun N-terminal kinase 1 (JNK1), JNK2, JNK3, LRRK2(G2019S), leukocyte receptor tyrosine kinase (LTK), mitogen-activated protein kinase kinase kinase 2 (MAP3K2), mitogen-activated protein kinase kinase kinase kinase 2 (MAP4K2), mitogen-activated protein kinase-activated protein kinase 2 (MAPKAPK2), mitogen-activated protein kinase, kinase 3 (MEK3), MEK4, MEK6, Misshapen-like kinase 1 (MINK), mitogen-activated protein kinase-interacting serine/threonine kinase-2 (MKNK2), muscle-specific kinase (MUSK), myosin light chain kinase (MYLK), NF-kappa-B-inducing kinase (NIK), oxidative stress-responsive-1 (OSR1), phosphorylase b kinase gamma catalytic chain, skeletal muscle isoform I (PHKG1), PHKG2, phosphatidylinositol 4-Phosphate-5 kinase 1A (PIP5K1A), PIP5K2C, polo-like kinase 4 (PLK4), serine/threonine-protein kinase D1 (PRKD1), PRKD2, PRKD3, protein tyrosine kinase 2 beta (PYK2), RET proto-oncogene (RET)(V804M), RIO kinase 3 (RIOK3), dual serine/threonine and tyrosine protein kinase (RIPK5), proto-oncogene tyrosine-protein kinase ROS 1 (ROS1)(c-ros oncogene 1), ribosomal s6 kinase A4 (RPS6KA4)(Kin.Dom.2-C-terminal), RPS6KA5(Kin.Dom.2-C-terminal), ribosomal S6 Kinase 2 (RSK2) (Kin.Dom.2-C-terminal), RSK3(Kin.Dom.2-C-terminal), serum and glucocorticoid-regulated kinase (SGK), SGK3, SNF1/AMP kinase-related kinase SNARK, serine/threonine-protein kinase 33 (STK33), STK39, transforming growth factor beta-activated kinase 1 (TAK1), TANK binding kinase 1 (TBK1), testis-specific serine/threonine-protein kinase 1B (TSSK1B), monopolar spindle 1 (Mpsl) kinase (TTK), mitogen-activated protein kinase kinase kinase 19 (YSK4, also known as MAP3K19), and zeta chain of T cell receptor associated protein kinase 70 (ZAP70). Thus, yet further aspects of the present invention entail use of inventive compounds to treat diseases and disorders that are mediated by aberrant activity of any of these kinases.

In some embodiments, compounds of the present invention may be useful in the treatment of diseases and disorders mediated by aberrant ALK activity. Representative examples of such diseases and disorders include ALK-dependent non-small-cell lung carcinoma (NSCLC) and ALK-dependent neuroblastoma.

The methods of the present invention may entail administration of an inventive compound or pharmaceutical compositions thereof to the patient in a single dose or in multiple doses (e.g., 1, 2, 3, 4, 5, 6, 7, 8, 10, 15, 20, or more doses). For example, the frequency of administration may range from once a day up to about once every eight weeks. In some embodiments, the frequency of administration ranges from about once a day for 1, 2, 3, 4, 5, or 6 weeks, and in other embodiments entails at least one 28-day cycle which includes daily administration for 3 weeks (21 days) and a 7-day "off" period. In other embodiments, the compound may be dosed twice a day (BID) over the course of two and a half days (for a total of 5 doses) or once a day (QD) over the course of two days (for a total of 2 doses). In other embodiments, the compound may be dosed once a day (QD) over the course of five days.

The compounds of formula I may be administered to a patient, e.g., a patient suffering from a neurodegenerative disease or disorder, brain cancer (e.g., gliomas and glioblastomas), or an ALK-mediated disease or disorder (e.g., ALK-dependent non-small-cell lung carcinoma (NSCLC) and ALK-dependent neuroblastoma) as a monotherapy or by way of combination therapy. The compounds may be administered concurrently with another active agent. Representative examples of other active agents known to treat neurodegenerative diseases and disorders include dopaminergic treatments (e.g., Carbidopa-levodopa, pramipexole (Mirapex®), ropinirole (Requip®) and rotigotine (Neupro®, given as a patch)). Apomorphine and monoamine oxidase B (MAO-B) inhibitors (e.g., selegiline (Eldepryl®, Zelapar®), rasagiline (Azilect®) and safinamide (Xadago®)) for PD and movement disorders, cholinesterase inhibitors for cognitive disorders (e.g., benztropine (Cogentin®) or trihexyphenidyl), antipsychotic drugs for behavioral and psychological symptoms of dementia, as well as agents aimed to slow the development of diseases, such as Riluzole (Rilutek® for ALS, cerebellar ataxia and Huntington's disease, non-steroidal anti-inflammatory drugs for Alzheimer's disease, and caffeine A2A receptor antagonists and CERE-120 (adeno-associated virus serotype 2-neurturin) for the neuroprotection of PD. Representative examples of other active agents known to treat brain cancer include temozolomide (Temodar®), bevacizumab (Avastin®), lomustine (CCNU, CeeNU®), carmustine wafer (BCNU, Gliadel®), and Toca 5 (Tocagen®). Representative examples of other active agents known to treat ALK-dependent NSCLC and ALK-dependent neuroblastoma include alectinib, brigatinib, ceritinib, crizotinib, and lorlatinib. The term "concurrently" is not limited to the administration of the anti-neurodegenerative or anti-cancer therapeutics at exactly the same time. Rather, it is meant that they are administered to a subject as part of the same course of treatment such as in a sequence and within a time interval such that they can act together (e.g., synergistically) to provide an increased benefit than if they were administered otherwise.

Pharmaceutical Kits

The present compounds and/or compositions containing them may be assembled into kits or pharmaceutical systems. Kits or pharmaceutical systems according to this aspect of the invention include a carrier or package such as a box, carton, tube or the like, having in close confinement therein one or more containers, such as vials, tubes, ampoules, or bottles, which contain the compound of formula I or a pharmaceutical composition thereof. The kits or pharmaceutical systems of the invention may also include printed instructions for using the compounds and compositions.

EXAMPLES

General Synthetic Scheme

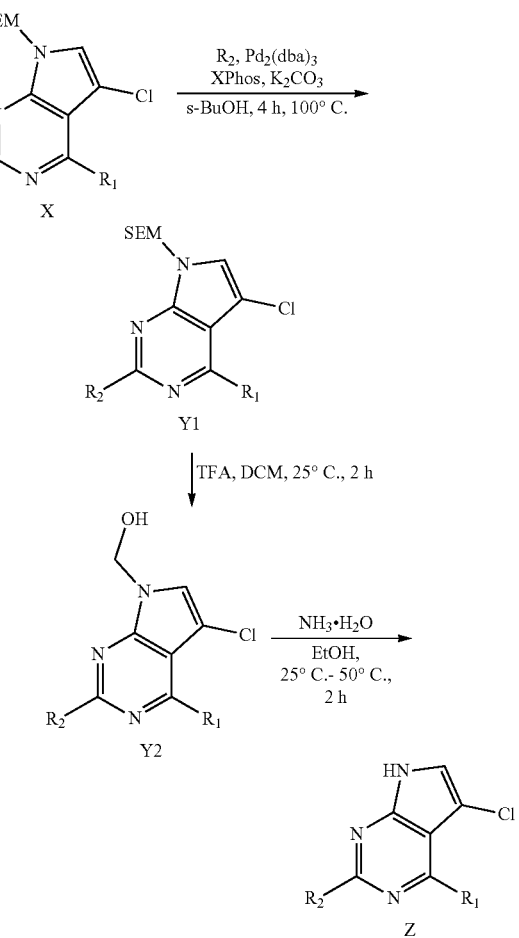

Example 1: Synthesis of (8-((5-chloro-4-(ethylamino)-7H-pyrrolo[2,3-d]pyrimidin-2-yl)amino)-2,3-dihydrobenzo[b][1,4]dioxin-5-yl)(4-morpholinopiperidin-1-yl)methanone (1)

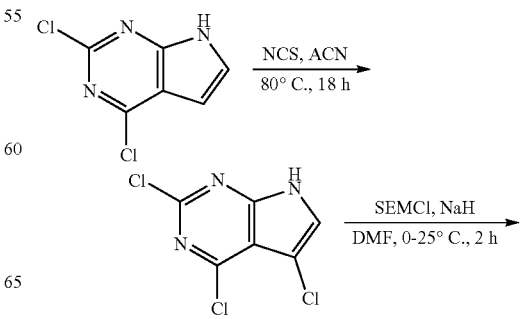

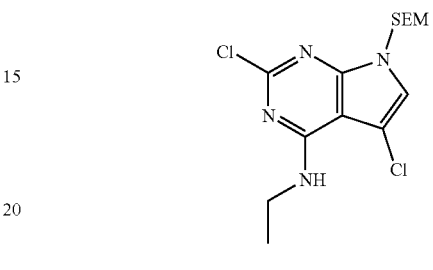

water (5 L), extracted with EA (800 mL×3), washed with brine (1 L×1), dried over Na₂SO₄, filtered and concentrated under. The residue was purified by column chromatography (SiO₂, Petroleum ether/Ethyl acetate=1/0 to 10:1) to give two batches of product: trimethyl-[2-[(2,4,5-trichloropyrrolo[2,3-d]pyrimidin-7-yl)methoxy]ethyl]-silane (100 g, 235.31 mmol, 52.88% yield, 83% purity) as white solid ¹HNMR (400 MHz, DMSO-d₆): 8.15 (s, 1H), 5.53 (br s, 2H), 3.57-3.51 (m, 2H), 0.88-0.83 (m, 2H), −0.07 (s, 9H).

LCMS: m/z=353.9 (M+H)⁺.

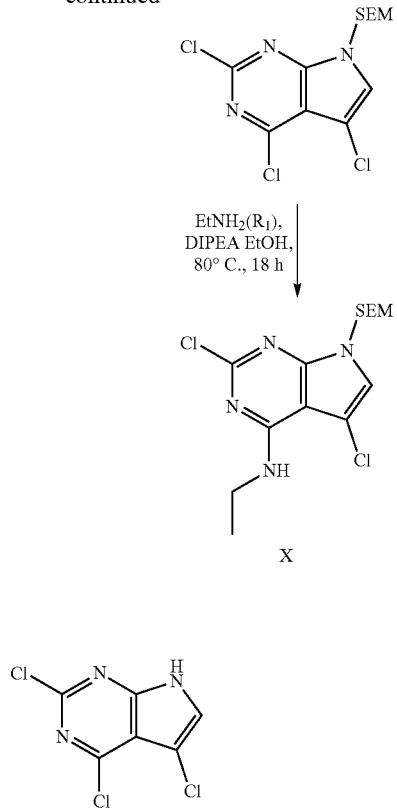

X 2,5-Dichloro-N-ethyl-7-((2-(trimethylsilyl)ethoxy)methyl)-7H-pyrrolo[2,3-d]pyrimidin-4-amine (X)

To a solution of trimethyl-[2-[(2,4,5-trichloropyrrolo[2,3-d]pyrimidin-7-yl)methoxy]ethyl]silane (11.77 mmol) in EtOH (50 mL) was added N,N-diisopropylethylamine (DIPEA) (21.18 mmol), ethylamine (R₁) (17.65 mmol) and the mixture was stirred at 80° C. for 18 h. The mixture was concentrated. The residue was dissolved in ethyl acetate (EA) (50 mL), washed with 1 N HCl (50 mL×2), then saturated aqueous NaHCO₃ solution (50 mL×2), brine (50 mL×1), dried over Na₂SO₄, filtered and concentrated to give the title product as yellow solid (2.9 g, yield 93% yield (81% purity)).

¹HNMR (400 MHz, DMSO-d₆): 7.48 (s, 1H), 7.13 (br t, J=5.6 Hz, 1H), 5.39 (s, 2H), 3.53-3.46 (m, 4H), 1.17 (t, J=7.0 Hz, 4H), 0.89-0.77 (m, 3H), 0.06-0.10 (m, 9H);

LCMS: m/z=361.1 (M+H)⁺.

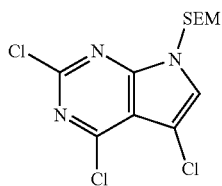 [SMILES: C[Si](C)(C)CCOCn1cc(Cl)c2c(Cl)nc(Cl)nc21]

2,4,5-trichloro-7H-pyrrolo[2,3-d]pyrimidine

To a solution of 2,4-dichloro-7H-pyrrolo[2,3-d]pyrimidine (100 g, 531.88 mmol) in acetonitrile (ACN) (1.0 L) was added N-chlorosuccinimide (NCS) (85.23 g, 638.25 mmol). After stirred at 80° C. for 18 h, the mixture was concentrated. The residue was triturated with methyl tert-butyl ether (MTBE) (500 mL) for 1 hour (h), filtered and the filter cake was washed with MTBE (50 mL×2), and then triturated with H₂O (300 mL), filtered and dried to give 2,4,5-trichloro-7H-pyrrolo [2,3-d]pyrimidine (99 g, 445.03 mmol, 83.67% yield) as a grey solid.

¹HNMR (400 MHz, DMSO-d₆): δ=13.05 (br s, 1H), 7.91 (s, 1H).

Trimethyl-[2-[(2,4,5-trichloropyrrolo[2,3-d]pyrimidin-7-yl)methoxy]ethyl]silane 2,4,5-trichloro-7H-pyrrolo[2,3-d]pyrimidine (99 g, 445.03 mmol) in DMF (400 mL) was added drop-wise to a mixture of NaH (21.36 g, 534.03 mmol, 60% purity) in DMF (500 mL) at 0° C. The mixture was stirred at 0° C. for 0.5 h. 2-(chloromethoxy)ethyl-trimethyl-silane (SEMCl) (102 mL, 576.32 mmol) was added drop-wise at 0° C. The reaction mixture was allowed to warm to 25° C. and was stirred for 2 h. The reaction was then quenched with ice

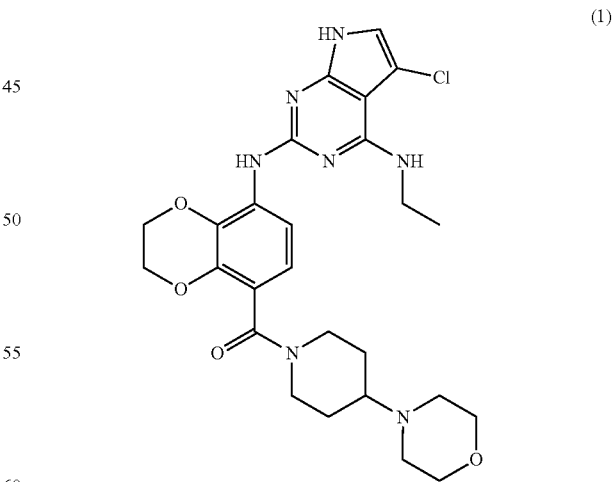

(1)

To a solution of 2,5-dichloro-N-ethyl-7-((2-(trimethylsilyl)ethoxy)methyl)-7H-pyrrolo[2,3-d]pyrimidin-4-amine (0.5 mmol) and in sec-butyl alcohol (5 mL) was added (8-amino-2,3-dihydrobenzo[b][1,4]dioxin-5-yl)(4-morpholinopiperidin-1-yl)methanone (0.5 mmol), dicyclohexyl-[2-[2,4,6-tri(propan-2-yl)phenyl]phenyl]phosphane (XPhos) (23.84 mg, 0.05 mmol), Pd$_2$(dba)$_3$ (22.89 mg, 0.025 mmol) and K$_3$PO$_4$ (345 mg, 2.0 mmol). The reaction mixture was degassed and purged with N$_2$ for 3 times, and then the mixture was stirred at 80° C. for 4 hours under N$_2$ atmosphere. After allowing the reaction to cool to 25° C., the mixture was filtered and the filtrate was concentrated under reduced pressure to give the crude product (Y1) as brown oil.

Without any further purification, the crude intermediate was dissolved in TFA (1 mL) and stirred at 25° C. for 1 h. The reaction was evaporated in vacuum to give the crude corresponding Y2 intermediate which was used in next step directly.

To a solution of intermediate Y2 in EtOH (2 mL), NH$_3$·H$_2$O (1 mL) was added and then the mixture was stirred at 60° C. for 1 h. After allowing the reaction to cool to 25° C., the solvent was removed under vacuum. The crude product was purified by preparative (Prep)-HPLC to afford compound 1 as an off-white solid (42.14 mg, 19.4% yield over 3 steps).

$^1$HNMR (400 MHz, DMSO-d$_6$): δ=11.43 (br s, 1H), 8.12 (d, J=8.4 Hz, 1H), 7.22 (s, 1H), 6.98 (s, 1H), 6.79-6.62 (m, 1H), 6.50 (t, J=5.2 Hz, 1H), 4.50-4.26 (m, 5H), 3.62-3.45 (m, 7H), 3.04-2.86 (m, 1H), 2.78-2.65 (m, 1H), 2.46 (s, 4H), 2.39-2.37 (m, 1H), 1.88-1.80 (m, 1H), 1.71 (d, J=2.0 Hz, 1H), 1.48-1.24 (m, 2H), 1.20 (br t, J=6.8 Hz, 3H).

LCMS: m/z=542.2 (M+H)$^+$.

Example 2: Synthesis of (8-((5-chloro-4-(propylamino)-7H-pyrrolo[2,3-d]pyrimidin-2-yl)amino)-2,3-dihydrobenzo[b][1,4]dioxin-5-yl)(4-morpholinopiperidin-1-yl)methanone (2)

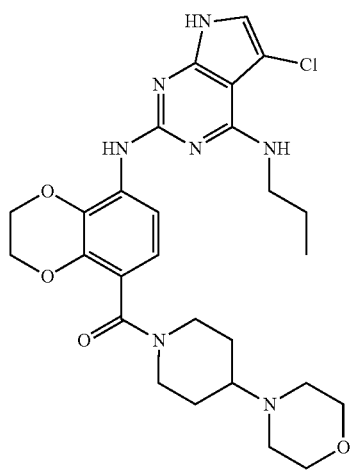

(2)

Compound 2 was prepared in an analogous manner to compound 1 in Example 1 and was isolated as an off-white solid (44.7 mg, 32.1% yield over 3 steps).

$^1$HNMR (400 MHz, DMSO-d$_6$): δ=11.42 (s, 1H), 8.12 (d, J=8.4 Hz, 1H), 7.22 (s, 1H), 6.98 (d, J=2.0 Hz, 1H), 6.70 (d, J=9.2 Hz, 1H), 6.49 (t, J=5.6 Hz, 1H), 4.53-4.19 (m, 5H), 3.61-3.38 (m, 7H), 3.08-2.84 (m, 1H), 2.80-2.62 (m, 1H), 2.45 (s, 4H), 2.41-2.36 (m, 1H), 1.84 (d, J=11.0 Hz, 1H), 1.71 (s, 1H), 1.68-1.58 (m, 2H), 1.43-1.11 (m, 2H), 0.93 (t, J=7.2 Hz, 3H).

LCMS: m/z=556.2 (M+H)$^+$.

Example 3: Synthesis of (8-((5-chloro-4-(cyclopropylamino)-7H-pyrrolo[2,3-d]pyrimidin-2-yl)amino)-2,3-dihydrobenzo[b][1,4]dioxin-5-yl)(4-morpholinopiperidin-1-yl)methanone (3)

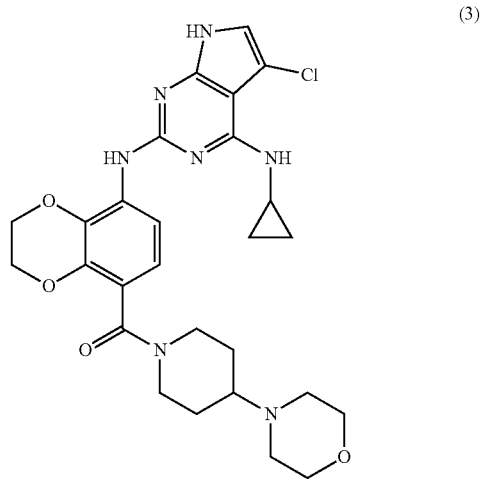 [SMILES: O=C(c1ccc(Nc2nc(NC3CC3)c3c(Cl)c[nH]c3n2)c2c1OCCO2)N1CCC(N2CCOCC2)CC1]

(3)

Compound 3 was prepared in an analogous manner to compound 1 in Example 1 and was isolated as an off-white solid (33.36 mg, 15% yield over 3 steps).

$^1$HNMR (400 MHz, DMSO-d$_6$): δ=11.46 (s, 1H), 8.28 (d, J=8.4 Hz, 1H), 7.26 (s, 1H), 7.00 (d, J=2.4 Hz, 1H), 6.78-6.66 (m, 1H), 6.38 (d, J=2.4 Hz, 1H), 4.53-4.23 (m, 5H), 3.60-3.45 (m, 5H), 3.07-2.96 (m, 1H), 2.90 (dt, J=3.6, 6.8 Hz, 1H), 2.81-2.68 (m, 1H), 2.46 (br s, 4H), 2.39-2.36 (m, 1H), 1.90-1.79 (m, 1H), 1.78-1.65 (m, 1H), 1.49-1.10 (m, 2H), 0.85-0.76 (m, 2H), 0.69-0.60 (m, 2H).

LCMS: m/z=554.2 (M+H)$^+$.

Example 4: Synthesis of (8-((5-chloro-4-(cyclobutylamino)-7H-pyrrolo[2,3-d]pyrimidin-2-yl)amino)-2,3-dihydrobenzo[b][1,4]dioxin-5-yl)(4-morpholinopiperidin-1-yl)methanone (4)

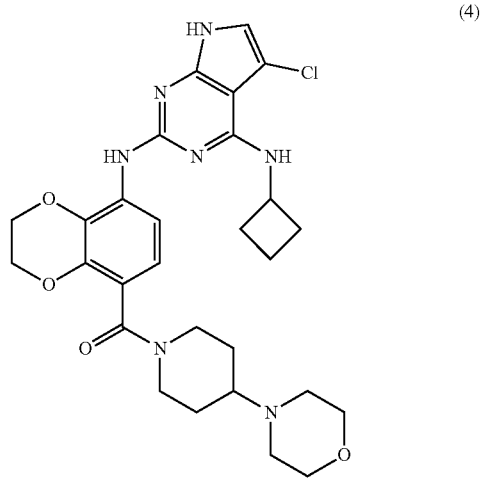 [SMILES: O=C(c1ccc(Nc2nc(NC3CCC3)c3c(Cl)c[nH]c3n2)c2c1OCCO2)N1CCC(N2CCOCC2)CC1]

(4)

Compound 4 was prepared in an analogous manner to compound 1 in Example 1 and was isolated as an off-white solid (43.21 mg, 19% yield over 3 steps).

¹HNMR (400 MHz, DMSO-d₆): δ=11.46 (br s, 1H), 8.10 (d, J=8.4 Hz, 1H), 7.24 (s, 1H), 7.00 (d, J=2.4 Hz, 1H), 6.79-6.63 (m, 1H), 6.31 (br d, J=7.6 Hz, 1H), 4.71-4.60 (m, 1H), 4.51-4.26 (m, 5H), 3.59-3.46 (m, 5H), 3.05-2.87 (m, 1H), 2.79-2.68 (m, 1H), 2.45 (br s, 4H), 2.41-2.39 (m, 1H), 2.35-2.30 (m, 2H), 2.14-2.05 (m, 2H), 1.84 (d, J=11.6 Hz, 1H), 1.76-1.67 (m, 3H), 1.44-1.14 (m, 2H).

LCMS: m/z=568.2 (M+H)⁺.

Example 5: Synthesis of (8-((5-chloro-4-((2-methoxyethyl)amino)-7H-pyrrolo[2,3-d]pyrimidin-2-yl)amino)-2,3-dihydrobenzo[b][1,4]dioxin-5-yl)(4-morpholinopiperidin-1-yl)methanone (5)

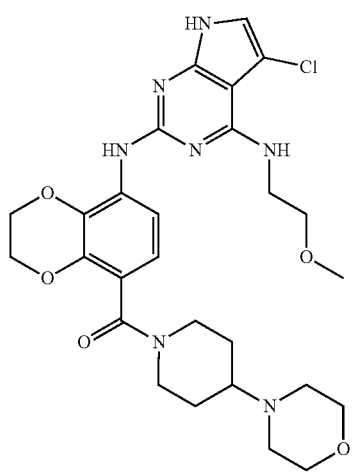

(5)

Compound 5 was prepared in an analogous manner to compound 1 in Example 1 and was isolated as an off-white solid (24.8 mg, 10.8% yield over 3 steps).

¹HNMR (400 MHz, DMSO-d₆): δ=11.47 (d, J=2.1 Hz, 1H), 8.08 (d, J=8.4 Hz, 1H), 7.25 (s, 1H), 7.00 (d, J=2.5 Hz, 1H), 6.80-6.57 (m, 1H), 6.43 (t, J=5.6 Hz, 1H), 4.57-4.24 (m, 5H), 3.66 (q, J=5.6 Hz, 2H), 3.57-3.45 (m, 7H), 3.29 (s, 3H), 3.05-2.84 (m, 1H), 2.78-2.67 (m, 1H), 2.44 (br s, 4H), 2.40-2.34 (m, 1H), 1.90-1.78 (m, 1H), 1.76-1.63 (m, 1H), 1.42-1.12 (m, 2H).

LCM: m/z=572.2 (M+H)⁺.

Example 6: Synthesis of 5-chloro-N4-ethyl-N2-(2-methoxy-4-(morpholinosulfonyl)phenyl)-7H-pyrrolo[2,3-d]pyrimidine-2,4-diamine (6)

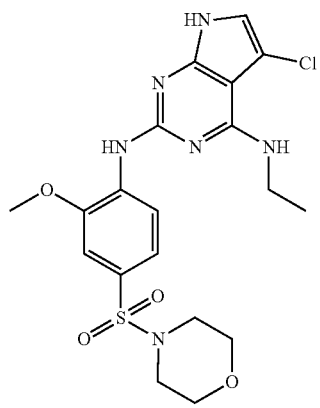

(6)

Compound 6 was prepared in an analogous manner to compound 1 in Example 1 and was isolated as an off-white solid (13.45 mg, 7.2% yield over 3 steps).

¹H NMR (400 MHz, DMSO-d₆) δ=11.75-11.20 (m, 1H), 9.03-8.63 (m, 1H), 7.70-7.55 (m, 1H), 7.37-7.29 (m, 1H), 7.22-7.17 (m, 1H), 7.09-7.01 (m, 1H), 6.66-6.56 (m, 1H), 4.07-3.90 (m, 3H), 3.67-3.61 (m, 4H), 3.60-3.51 (m, 2H), 2.92-2.84 (m, 4H), 1.26-1.19 (m, 3H).

LCMS (Method 3): m/z=467.1 (M+H)⁺.

Example 7: Synthesis of 5-chloro-N4-cyclobutyl-N2-(2-methoxy-4-(morpholinosulfonyl)phenyl)-7H-pyrrolo[2,3-d]pyrimidine-2,4-diamine (7)

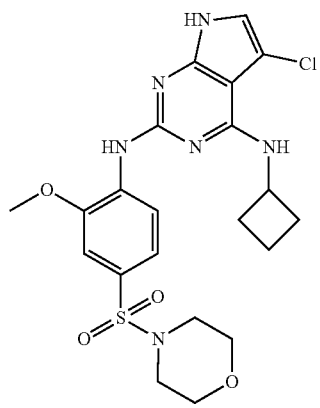

(7)

Compound 7 was prepared in an analogous manner to compound 1 in Example 1 and was isolated as an off-white solid (38.93 mg, 19.7% yield over 3 steps).

¹HNMR (400 MHz, DMSO-d₆): δ=11.56 (br s, 1H), 8.83 (d, J=8.5 Hz, 1H), 7.64 (s, 1H), 7.34 (dd, J=1.8, 8.6 Hz, 1H), 7.20 (d, J=1.8 Hz, 1H), 7.08 (d, J=2.1 Hz, 1H), 6.42 (d, J=7.5 Hz, 1H), 4.79-4.58 (m, 1H), 4.00 (s, 3H), 3.68-3.59 (m, 4H), 2.93-2.83 (m, 4H), 2.38-2.31 (m, 2H), 2.19-2.08 (m, 2H), 1.80-1.69 (in, 2H).

LCMS (Method 3): m/z=493.1 (M+H)⁺.

Example 8: Synthesis of 5-chloro-N2-(2-methoxy-4-(methylsulfonyl)phenyl)-N4-propyl-7H-pyrrolo[2,3-d]pyrimidine-2,4-diamine (8)

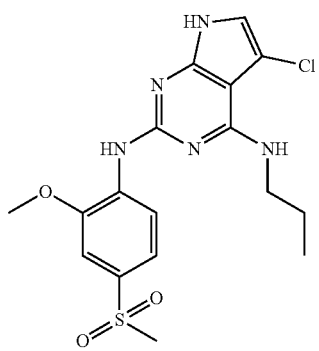

(8)

Compound 8 was prepared in an analogous manner to compound 1 in Example 1 and was isolated as an off-white solid (39.61 mg, 24.1% yield over 3 steps).

$^1$HNMR (400 MHz, DMSO-d$_6$): δ=11.64-11.40 (m, 1H), 9.03-8.68 (m, 1H), 7.64-7.58 (m, 1H), 7.50-7.42 (m, 2H), 7.08-7.01 (m, 1H), 6.63-6.57 (m, 1H), 4.07-3.93 (m, 3H), 3.54-3.43 (m, 2H), 3.22-3.13 (m, 3H), 1.73-1.59 (m, 2H), 0.95 (t, J=7.4 Hz, 3H).

LCMS: m/z=410.1 (M+H)$^+$.

Example 9: Synthesis of (8-((5-chloro-4-((2-methoxyethyl)amino)-7H-pyrrolo[2,3-d]pyrimidin-2-yl)amino)-2,3-dihydrobenzo[b][1,4]dioxin-5-yl)(morpholino)methanone (9)

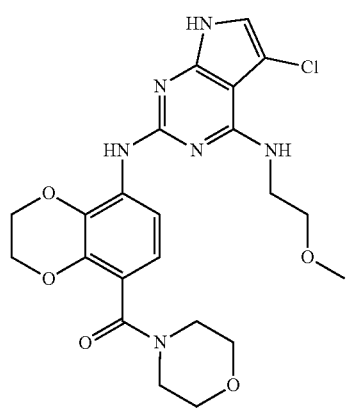

(9)

Compound 9 was prepared in an analogous manner to compound 1 in Example 1 and was isolated as an off-white solid (39.42 mg, 20.1% yield over 3 steps).

$^1$HNMR (400 MHz, DMSO-d$_6$): δ=11.48 (d, J=2.0 Hz, 1H), 8.25-7.98 (m, 1H), 7.27 (s, 1H), 7.01 (d, J=2.4 Hz, 1H), 6.74 (d, J=8.5 Hz, 1H), 6.44 (t, J=5.6 Hz, 1H), 4.41-4.28 (m, 4H), 3.67 (q, J=5.6 Hz, 2H), 3.63-3.49 (m, 8H), 3.31 (s, 3H), 3.29-3.20 (m, 2H).

LCMS: m/z=489.1 (M+H)$^+$.

Example 10: Synthesis of (8-((5-chloro-4-(methylamino)-7H-pyrrolo[2,3-d]pyrimidin-2-yl)amino)-2,3-dihydrobenzo[b][1,4]dioxin-5-yl)(4-morpholinopiperidin-1-yl)methanone (10)

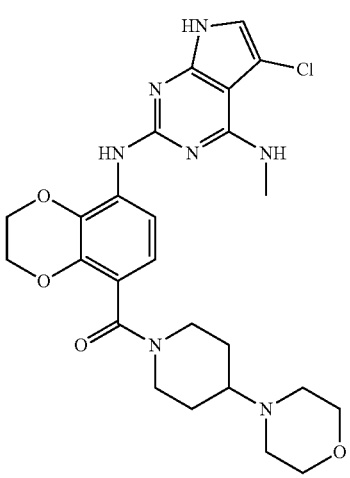

(10)

Compound 10 was prepared in an analogous manner to compound 1 in Example 1 and was isolated as an off-white solid (43.93 mg, 20.8% yield over 3 steps).

$^1$HNMR (400 MHz, DMSO-d$_6$): δ=11.43 (d, J=1.5 Hz, 1H), 8.15 (d, J=8.4 Hz, 1H), 7.23 (s, 1H), 6.97 (d, J=2.4 Hz, 1H), 6.77-6.65 (m, 1H), 6.62-6.54 (m, 1H), 4.52-4.22 (m, 4H), 3.66-3.45 (m, 5H), 2.97 (d, J=4.6 Hz, 3H), 2.79-2.69 (m, 1H), 2.47-2.35 (m, 5H), 1.91-1.61 (m, 2H), 1.45-1.11 (m, 2H).

LCMS: m/z=528.2 (M+H)$^+$.

Example 11: Synthesis of 5-chloro-N2-(2-methoxy-4-(morpholinosulfonyl)phenyl)-N4-methyl-7H-pyrrolo[2,3-d]pyrimidine-2,4-diamine (11)

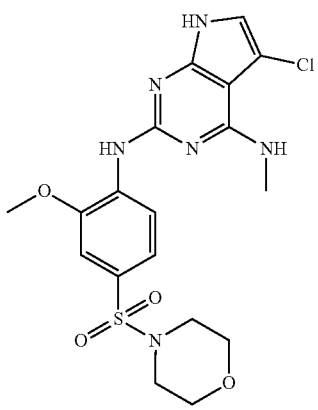

(11)

Compound 11 was prepared in an analogous manner to compound 1 in Example 1 and was isolated as an off-white solid (54.02 mg, 29.7% yield over 3 steps).

$^1$HNMR (400 MHz, DMSO-d$_6$): δ=11.52 (d, J=2.0 Hz, 1H), 8.88 (d, J=8.6 Hz, 1H), 7.64 (s, 1H), 7.33 (dd, J=1.9, 8.6 Hz, 1H), 7.19 (d, J=1.8 Hz, 1H), 7.04 (d, J=2.4 Hz, 1H), 6.70 (q, J=4.2 Hz, 1H), 4.00 (s, 3H), 3.67-3.59 (m, 4H), 3.01 (d, J=4.6 Hz, 3H), 2.92-2.85 (m, 4H).
LCMS: m/z=453.1 (M+H)+.

Example 12: Synthesis of 5-chloro-N2-(2-methoxy-4-((4-morpholinopiperidin-1-yl)sulfonyl)phenyl)-N4-methyl-7H-pyrrolo[2,3-d]pyrimidine-2,4-diamine (12)

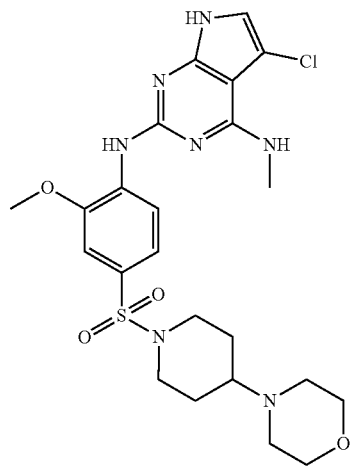
(12)

Compound 12 was prepared in an analogous manner to compound 1 in Example 1 and was isolated as an off-white solid (41.4 mg, 16.3% yield over 3 steps).
¹HNMR (400 MHz, DMSO-d₆): δ=11.51 (d, J=2.2 Hz, 1H), 8.85 (d, J=8.7 Hz, 1H), 7.61 (s, 1H), 7.32 (dd, J=1.8, 8.6 Hz, 1H), 7.19 (d, J=2.0 Hz, 1H), 7.04 (d, J=2.4 Hz, 1H), 6.69 (q, J=4.6 Hz, 1H), 3.99 (s, 3H), 3.65 (br d, J=11.9 Hz, 2H), 3.55-3.46 (m, 4H), 3.01 (d, J=4.6 Hz, 3H), 2.38 (br s, 4H), 2.26 (br t, J=11.1 Hz, 2H), 2.12 (br s, 1H), 1.80 (br d, J=11.7 Hz, 2H), 1.48-1.34 (m, 2H).
LCMS: m/z=536.2 (M+H)+.

Example 13: Synthesis of 5-chloro-N2-(2-methoxy-4-(methylsulfonyl)phenyl)-N4-methyl-7H-pyrrolo[2,3-d]pyrimidine-2,4-diamine (13)

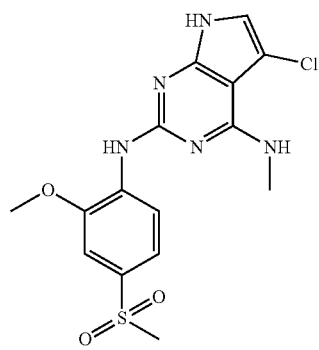
(13)

Compound 13 was prepared in an analogous manner to compound 1 in Example 1 and was isolated as an off-white solid (46.33 mg, 30.3% yield over 3 steps).

¹HNMR (400 MHz, DMSO-d₆): δ=11.54 (s, 1H), 8.85 (d, J=8.6 Hz, 1H), 7.63 (s, 1H), 7.49 (dd, J=2.0, 8.6 Hz, 1H), 7.43 (d, J=2.0 Hz, 1H), 7.04 (d, J=2.0 Hz, 1H), 6.74-6.64 (m, 1H), 4.01 (s, 3H), 3.18 (s, 3H), 3.01 (d, J=4.6 Hz, 3H).
LCMS: m/z=382.0 (M+H)+.

Example 14: Synthesis of (8-((5-chloro-4-(methylamino)-7H-pyrrolo[2,3-d]pyrimidin-2-yl)amino)-2,3-dihydrobenzo[b][1,4]dioxin-5-yl)(morpholino)methanone (14)

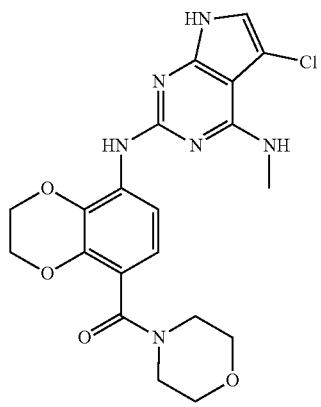
(14)

Compound 14 was prepared in an analogous manner to compound 1 in Example 1 and was isolated as an off-white solid (28.58 mg, 16.0% yield over 3 steps).
¹HNMR (400 MHz, DMSO-d₆): δ=11.45 (d, J=2.3 Hz, 1H), 8.18 (d, J=8.5 Hz, 1H), 7.25 (s, 1H), 6.97 (d, J=2.5 Hz, 1H), 6.75 (d, J=8.5 Hz, 1H), 6.60 (q, J=4.7 Hz, 1H), 4.42-4.27 (m, 4H), 3.60 (br s, 4H), 3.56-3.47 (m, 2H), 3.31-3.15 (m, 2H), 2.97 (d, J=4.6 Hz, 3H).
LCMS: m/z=445.1 (M+H)+.

Example 15: Synthesis of 5-chloro-N4-ethyl-N2-(2-methoxy-4-((4-morpholinopiperidin-1-yl)sulfonyl)phenyl)-7H-pyrrolo[2,3-d]pyrimidine-2,4-diamine (15)

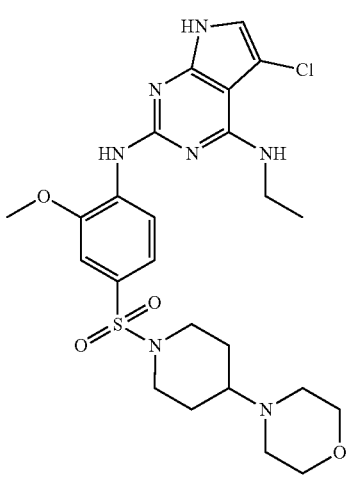
(15)

Compound 15 was prepared in an analogous manner to compound 1 in Example 1 and was isolated as an off-white solid (52.11 mg, 23.7% yield over 3 steps).

$^1$HNMR (400 MHz, DMSO-d$_6$): δ=11.51 (d, J=2.0 Hz, 1H), 8.82 (d, J=8.6 Hz, 1H), 7.59 (s, 1H), 7.31 (dd, J=1.8, 8.6 Hz, 1H), 7.19 (d, J=1.8 Hz, 1H), 7.04 (d, J=2.4 Hz, 1H), 6.60 (t, J=5.8 Hz, 1H), 3.99 (s, 3H), 3.64 (br d, J=11.5 Hz, 2H), 3.58-3.53 (m, 2H), 3.53-3.48 (m, 4H), 2.42-2.34 (m, 4H), 2.31-2.22 (m, 2H), 2.15-2.05 (m, 1H), 1.79 (br d, J=11.0 Hz, 2H), 1.47-1.35 (m, 2H), 1.23 (t, J=7.1 Hz, 3H).

LCMS: m/z=550.2 (M+H)$^+$.

Example 16: Synthesis of 5-chloro-N4-ethyl-N2-(2-methoxy-4-(methylsulfonyl)phenyl)-7H-pyrrolo[2,3-d]pyrimidine-2,4-diamine (16)

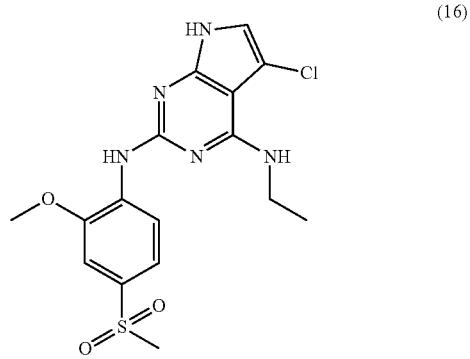 [SMILES: CCNc1nc(Nc2ccc(S(C)(=O)=O)cc2OC)nc2[nH]cc(Cl)c12]

(16)

Compound 16 was prepared in an analogous manner to compound 1 in Example 1 and was isolated as an off-white solid (44.6 mg, 28.1% yield over 3 steps).

$^1$HNMR (400 MHz, DMSO-d$_6$): δ=11.53 (d, J=2.0 Hz, 1H), 8.83 (d, J=8.6 Hz, 1H), 7.61 (s, 1H), 7.49 (dd, J=1.8, 8.6 Hz, 1H), 7.43 (d, J=2.0 Hz, 1H), 7.05 (d, J=2.4 Hz, 1H), 6.61 (s, 1H), 4.01 (s, 3H), 3.65-3.47 (m, 2H), 3.18 (s, 3H), 1.23 (t, J=7.1 Hz, 3H).

LCMS: m/z=396.1 (M+H)$^+$.

Example 17: Synthesis of (8-((5-chloro-4-(ethylamino)-7H-pyrrolo[2,3-d]pyrimidin-2-yl)amino)-2,3-dihydrobenzo[b][1,4]dioxin-5-yl)(morpholino)methanone (17)

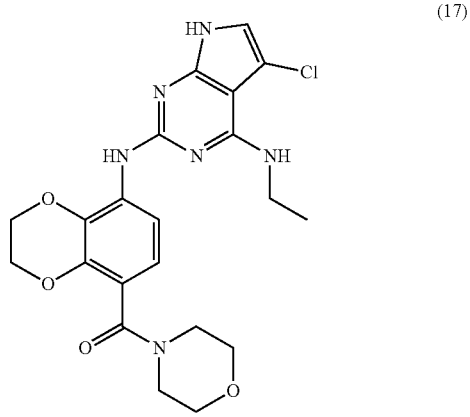 [SMILES: CCNc1nc(Nc2ccc(C(=O)N3CCOCC3)c3c2OCCO3)nc2[nH]cc(Cl)c12]

(17)

Compound 17 was prepared in an analogous manner to compound 1 in Example 1 and was isolated as an off-white solid (29.52, 16.1% yield over 3 steps).

$^1$HNMR (400 MHz, DMSO-d$_6$): δ=11.45 (d, J=2.3 Hz, 1H), 8.16 (d, J=8.5 Hz, 1H), 7.24 (s, 1H), 6.99 (d, J=2.5 Hz, 1H), 6.75 (d, J=8.5 Hz, 1H), 6.53 (t, J=5.8 Hz, 1H), 4.39 (br d, J=2.8 Hz, 2H), 4.32 (br d, J=3.4 Hz, 2H), 3.61 (br s, 4H), 3.57-3.49 (m, 4H), 3.31-3.17 (m, 2H), 1.21 (t, J=7.1 Hz, 3H).

LCMS: m/z=459.1 (M+H)$^+$.

Example 18: Synthesis of 5-chloro-N2-(2-methoxy-4-(morpholinosulfonyl)phenyl)-N4-propyl-7H-pyrrolo[2,3-d]pyrimidine-2,4-diamine (18)

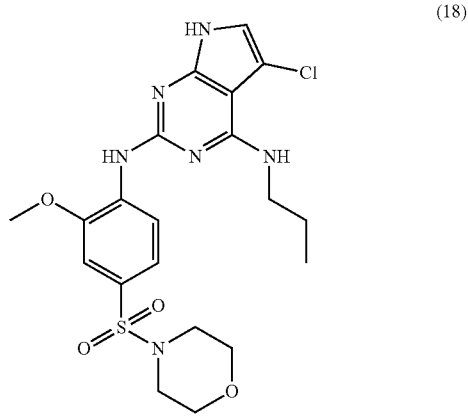 [SMILES: CCCNc1nc(Nc2ccc(S(=O)(=O)N3CCOCC3)cc2OC)nc2[nH]cc(Cl)c12]

(18)

Compound 18 was prepared in an analogous manner to compound 1 in Example 1 and was isolated as an off-white solid (37.48 mg, 19.5% yield over 3 steps).

$^1$HNMR (400 MHz, DMSO-d$_6$): δ=11.51 (d, J=2.1 Hz, 1H), 8.83 (d, J=8.7 Hz, 1H), 7.62 (s, 1H), 7.31 (dd, J=1.9, 8.6 Hz, 1H), 7.19 (d, J=2.0 Hz, 1H), 7.05 (d, J=2.4 Hz, 1H), 6.60 (t, J=5.7 Hz, 1H), 4.00 (s, 3H), 3.70-3.58 (m, 4H), 3.53-3.44 (m, 2H), 2.93-2.82 (m, 4H), 1.71-1.61 (m, 2H), 0.95 (t, J=7.4 Hz, 3H).

LCMS: m/z=481.1 (M+H)$^+$.

Example 19: Synthesis of 5-chloro-N2-(2-methoxy-4-((4-morpholinopiperidin-1-yl)sulfonyl)phenyl)-N4-propyl-7H-pyrrolo[2,3-d]pyrimidine-2,4-diamine (19)

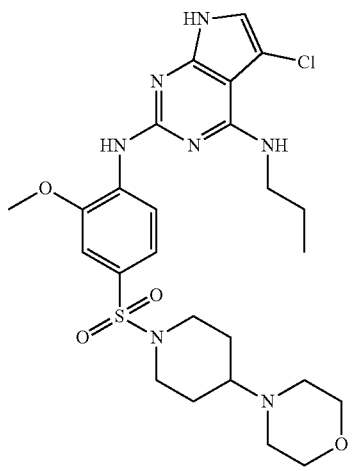

(19)

Compound 19 was prepared in an analogous manner to compound 1 in Example 1 and was isolated as an off-white solid (29.75 mg, 13.2% yield over 3 steps).

$^1$HNMR (400 MHz, DMSO-d$_6$): δ=11.74-11.19 (m, 1H), 8.80 (d, J=8.6 Hz, 1H), 7.59 (s, 1H), 7.33-7.26 (m, 1H), 7.19 (d, J=2.0 Hz, 1H), 7.05 (d, J=2.6 Hz, 1H), 6.59 (t, J=5.9 Hz, 1H), 3.98 (s, 3H), 3.70-3.60 (m, 2H), 3.56-3.44 (m, 6H), 2.39 (br s, 4H), 2.31-2.21 (m, 2H), 2.17-2.05 (m, 1H), 1.80 (br d, J=11.0 Hz, 2H), 1.71-1.60 (m, 2H), 1.49-1.35 (m, 2H), 1.01-0.88 (m, 3H).

LCMS: m/z=564.2 (M+H)$^+$.

Example 20: Synthesis of (8-((5-chloro-4-(propylamino)-7H-pyrrolo[2,3-d]pyrimidin-2-yl)amino)-2,3-dihydrobenzo[b][1,4]dioxin-5-yl)(morpholino)methanone (20)

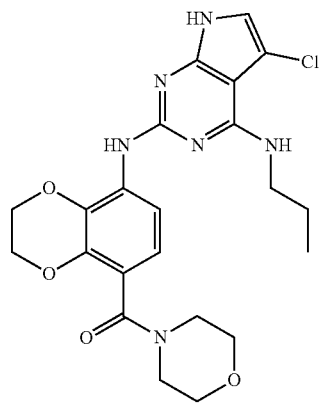

(20)

Compound 20 was prepared in an analogous manner to compound 1 in Example 1 and was isolated as an off-white solid (31.83 mg, 16.8% yield over 3 steps).

$^1$HNMR (400 MHz, DMSO-d$_6$): δ=11.37 (d, J=2.1 Hz, 1H), 8.12-8.05 (m, 1H), 7.17 (s, 1H), 6.92 (d, J=2.5 Hz, 1H), 6.67 (d, J=8.5 Hz, 1H), 6.46 (t, J=5.8 Hz, 1H), 4.33-4.20 (m, 4H), 3.57-3.43 (m, 6H), 3.41-3.36 (m, 2H), 3.26-3.11 (m, 2H), 1.62-1.50 (m, 2H), 0.86 (t, J=7.4 Hz, 3H).

LCMS: m/z=473.1 (M+H)$^+$.

Example 21: Synthesis of 5-chloro-N2-(2-methoxy-4-(morpholinosulfonyl)phenyl)-N4-(2-methoxyethyl)-7H-pyrrolo[2,3-d]pyrimidine-2,4-diamine (21)

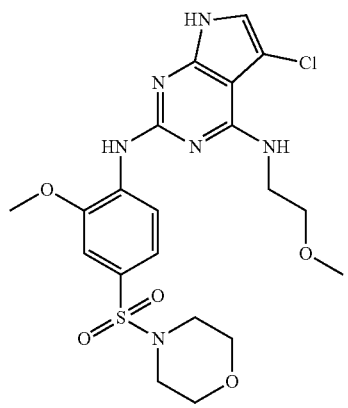

(21)

Compound 21 was prepared in an analogous manner to compound 1 in Example 1 and was isolated as an off-white solid (30.97 mg, 15.6% yield over 3 steps).

$^1$HNMR (400 MHz, DMSO-d$_6$): δ=11.52 (d, J=2.1 Hz, 1H), 8.76 (d, J=8.5 Hz, 1H), 7.61 (s, 1H), 7.25 (dd, J=1.9, 8.6 Hz, 1H), 7.13 (d, J=1.9 Hz, 1H), 7.02 (d, J=2.5 Hz, 1H), 6.48 (t, J=5.6 Hz, 1H), 3.93 (s, 3H), 3.64 (q, J=5.8 Hz, 2H), 3.59-3.55 (m, 4H), 3.53-3.49 (m, 2H), 3.25 (s, 3H), 2.86-2.77 (m, 4H).

LCMS: m/z=497.1 (M+H)$^+$.

Example 22: Synthesis of 5-chloro-N2-(2-methoxy-4-((4-morpholinopiperidin-1-yl)sulfonyl)phenyl)-N4-(2-methoxyethyl)-7H-pyrrolo[2,3-d]pyrimidine-2,4-diamine (22)

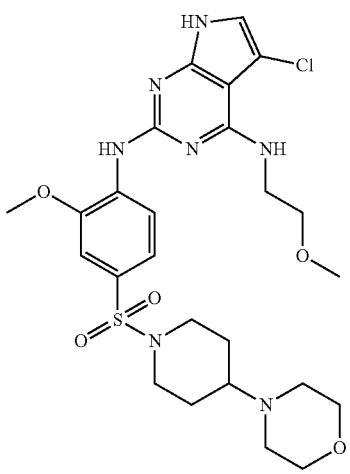

(22)

Compound 22 was prepared in an analogous manner to compound 1 in Example 1 and was isolated as an off-white solid (36.15 mg, 15.6% yield over 3 steps).

¹HNMR (400 MHz, DMSO-d₆): δ=11.50 (d, J=2.3 Hz, 1H), 8.73 (d, J=8.5 Hz, 1H), 7.58 (s, 1H), 7.24 (dd, J=1.9, 8.5 Hz, 1H), 7.13 (d, J=1.9 Hz, 1H), 7.01 (d, J=2.5 Hz, 1H), 6.48 (t, J=5.6 Hz, 1H), 3.92 (s, 3H), 3.66-3.61 (m, 2H), 3.58 (br d, J=11.8 Hz, 2H), 3.53-3.49 (m, 2H), 3.48-3.40 (m, 4H), 3.25 (s, 3H), 2.33 (br s, 4H), 2.19 (br t, J=11.1 Hz, 2H), 2.06 (br s, 1H), 1.74 (br d, J=11.5 Hz, 2H), 1.41-1.29 (m, 2H).

LCMS: m/z=580.2 (M+H)⁺.

Example 23: Synthesis of 5-chloro-N2-(2-methoxy-4-(methylsulfonyl)phenyl)-N4-(2-methoxyethyl)-7H-pyrrolo[2,3-d]pyrimidine-2,4-diamine (23)

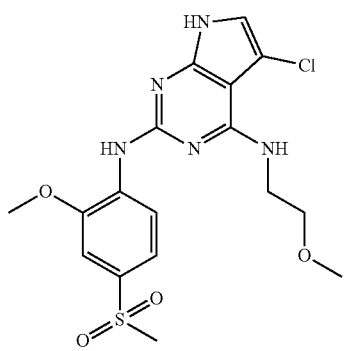

(23)

Compound 23 was prepared in an analogous manner to compound 1 in Example 1 and was isolated as an off-white solid (51.23 mg, 30% yield over 3 steps).

¹HNMR (400 MHz, DMSO-d₆): δ=11.53 (d, J=2.1 Hz, 1H), 8.73 (d, J=8.6 Hz, 1H), 7.58 (s, 1H), 7.42 (dd, J=8.6, 2.0 Hz, 1H), 7.37 (d, J=2.0 Hz, 1H), 7.01 (d, J=2.5 Hz, 1H), 6.48 (t, J=5.6 Hz, 1H), 3.94 (s, 3H), 3.64 (q, J=5.7 Hz, 2H), 3.53-3.49 (m, 2H), 3.25 (s, 3H), 3.12 (s, 3H).

LCMS: m/z=426.1 (M+H)⁺.

Example 24: Synthesis of 5-chloro-N4-cyclopropyl-N2-(2-methoxy-4-(morpholinosulfonyl)phenyl)-7H-pyrrolo[2,3-d]pyrimidine-2,4-diamine (24)

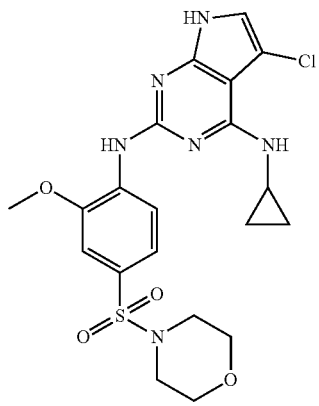

(24)

Compound 24 was prepared in an analogous manner to compound 1 in Example 1 and was isolated as an off-white solid (27.88 mg, 14.5% yield over 3 steps).

¹HNMR (400 MHz, DMSO-d₆): δ=11.56 (d, J=2.3 Hz, 1H), 9.04 (d, J=8.6 Hz, 1H), 7.68 (s, 1H), 7.35 (dd, J=1.9, 8.6 Hz, 1H), 7.20 (d, J=2.0 Hz, 1H), 7.08 (d, J=2.5 Hz, 1H), 6.54 (d, J=2.9 Hz, 1H), 4.01 (s, 3H), 3.68-3.61 (m, 4H), 2.97-2.93 (m, 1H), 2.92-2.86 (m, 4H), 0.90-0.81 (m, 2H), 0.72-0.65 (m, 2H).

LCMS: m/z=479.1 (M+H)⁺.

Example 25: Synthesis of 5-chloro-N4-cyclopropyl-N2-(2-methoxy-4-((4-morpholinopiperidin-1-yl)sulfonyl)phenyl)-7H-pyrrolo[2,3-d]pyrimidine-2,4-diamine (25)

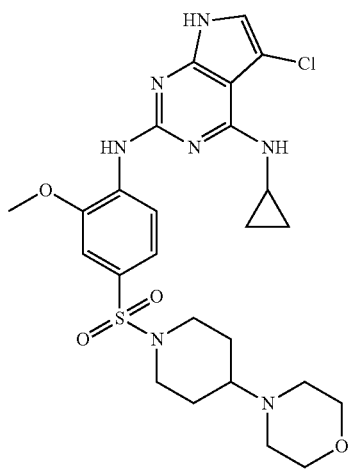

(25)

Compound 25 was prepared in an analogous manner to compound 1 in Example 1 and was isolated as an off-white solid (19.35 mg, 8.6% yield over 3 steps).

¹HNMR (400 MHz, DMSO-d₆): δ=11.47 (d, J=2.3 Hz, 1H), 8.94 (d, J=8.5 Hz, 1H), 7.57 (s, 1H), 7.27 (dd, J=1.9, 8.6 Hz, 1H), 7.13 (d, J=2.0 Hz, 1H), 7.01 (d, J=2.5 Hz, 1H), 6.46 (d, J=2.9 Hz, 1H), 3.92 (s, 3H), 3.58 (br d, J=11.6 Hz, 2H), 3.45 (br s, 4H), 2.93-2.82 (m, 1H), 2.32 (br s, 4H), 2.23-2.15 (m, 2H), 2.09-2.00 (m, 1H), 1.73 (br d, J=11.5 Hz, 2H), 1.41-1.28 (m, 2H), 0.81-0.75 (m, 2H), 0.63-0.57 (m, 2H).

LCMS: m/z=562.2 (M+H)⁺.

Example 26: Synthesis of 5-chloro-N4-cyclopropyl-N2-(2-methoxy-4-(methylsulfonyl)phenyl)-7H-pyrrolo[2,3-d]pyrimidine-2,4-diamine (26)

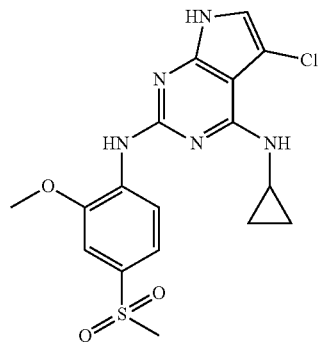
(26)

Compound 26 was prepared in an analogous manner to compound 1 in Example 1 and was isolated as an off-white solid (25.3 mg, 15.5% yield over 3 steps).

$^1$HNMR (400 MHz, DMSO-d$_6$): δ=11.50 (d, J=2.0 Hz, 1H), 8.94 (d, J=8.6 Hz, 1H), 7.59 (s, 1H), 7.44 (dd, J=1.9, 8.6 Hz, 1H), 7.37 (d, J=2.0 Hz, 1H), 7.01 (d, J=2.5 Hz, 1H), 6.46 (d, J=2.8 Hz, 1H), 3.95 (s, 3H), 3.12 (s, 3H), 2.90-2.83 (m, 1H), 0.82-0.75 (m, 2H), 0.64-0.57 (m, 2H).

LCMS: m/z=408.1 (M+H)$^+$.

Example 26: Synthesis of (8-((5-chloro-4-(cyclopropylamino)-7H-pyrrolo[2,3-d]pyrimidin-2-yl)amino)-2,3-dihydrobenzo[b][1,4]dioxin-5-yl)(morpholino)methanone (27)

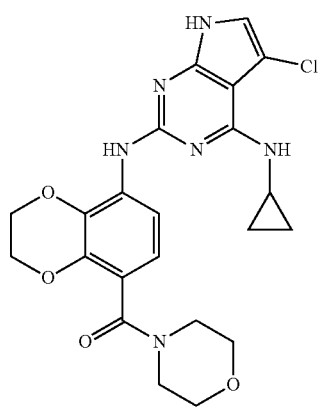
(27)

Compound 27 was prepared in an analogous manner to compound 1 in Example 1 and was isolated as an off-white solid (51.97 mg, 27.6% yield over 3 steps).

$^1$HNMR (400 MHz, DMSO-d$_6$): δ=11.42 (d, J=2.0 Hz, 1H), 8.24 (d, J=8.5 Hz, 1H), 7.20 (s, 1H), 6.94 (d, J=2.5 Hz, 1H), 6.70 (d, J=8.5 Hz, 1H), 6.34 (d, J=2.9 Hz, 1H), 4.39-4.19 (m, 4H), 3.53 (br s, 4H), 3.46 (br s, 2H), 3.18 (br s, 2H), 2.90-2.80 (m, 1H), 0.77-0.70 (m, 2H), 0.61-0.55 (m, 2H).

LCMS: m/z=471.1 (M+H)$^+$.

Example 28: Synthesis of 5-chloro-N4-cyclobutyl-N2-(2-methoxy-4-((4-morpholinopiperidin-1-yl)sulfonyl)phenyl)-7H-pyrrolo[2,3-d]pyrimidine-2,4-diamine (28)

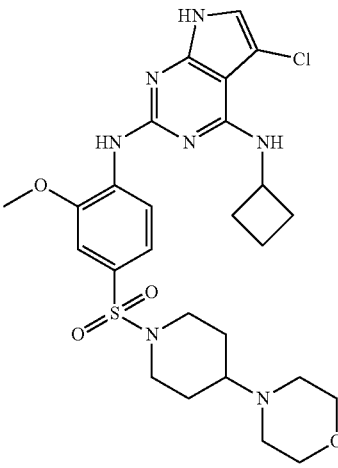
(28)

Compound 28 was prepared in an analogous manner to compound 1 in Example 1 and was isolated as an off-white solid (34.78 mg, 15.1% yield over 3 steps).

$^1$HNMR (400 MHz, DMSO-d$_6$): δ=11.50 (d, J=2.3 Hz, 1H), 8.80-8.67 (m, 1H), 7.55 (s, 1H), 7.27 (dd, J=1.9, 8.5 Hz, 1H), 7.13 (d, J=1.9 Hz, 1H), 7.01 (d, J=2.5 Hz, 1H), 6.35 (d, J=7.6 Hz, 1H), 4.66-4.54 (m, 1H), 3.92 (s, 3H), 3.59 (br d, J=11.5 Hz, 2H), 3.45 (br s, 4H), 2.34-2.24 (m, 6H), 2.23-2.15 (m, 2H), 2.11-1.99 (m, 3H), 1.78-1.62 (m, 4H), 1.41-1.28 (m, 2H).

LCMS: m/z=576.1 (M+H)$^+$.

Example 29: Synthesis of 5-chloro-N4-cyclobutyl-N2-(2-methoxy-4-(methylsulfonyl)phenyl)-7H-pyrrolo[2,3-d]pyrimidine-2,4-diamine (29)

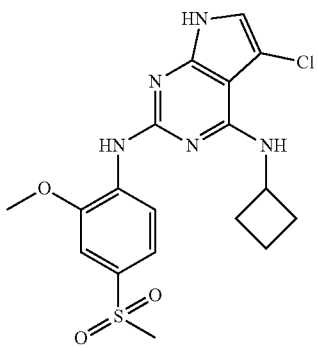
(29)

Compound 29 was prepared in an analogous manner to compound 1 in Example 1 and was isolated as an off-white solid (24.16 mg, 14.3% yield over 3 steps).

$^1$HNMR (400 MHz, DMSO-d$_6$): δ=11.52 (d, J=2.0 Hz, 1H), 8.75 (d, J=8.6 Hz, 1H), 7.57 (s, 1H), 7.44 (dd, J=1.9, 8.6 Hz, 1H), 7.37 (d, J=2.0 Hz, 1H), 7.01 (d, J=2.5 Hz, 1H), 6.36 (d, J=7.5 Hz, 1H), 4.68-4.54 (m, 1H), 3.94 (s, 3H), 3.12 (s, 3H), 2.33-2.22 (m, 2H), 2.13-2.00 (m, 2H), 1.73-1.61 (m, 2H).

LCMS: m/z=422.1 (M+H)$^+$.

Example 30: Synthesis of (8-((5-chloro-4-(cyclobutylamino)-7H-pyrrolo[2,3-d]pyrimidin-2-yl)amino)-2,3-dihydrobenzo[b][1,4]dioxin-5-yl)(morpholino)methanone (30)

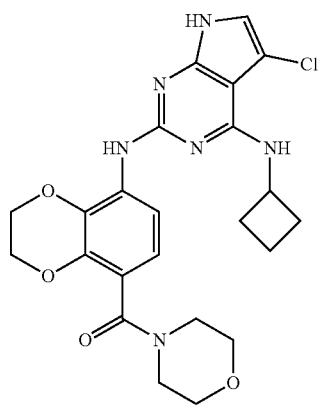

(30)

Compound 30 was prepared in an analogous manner to compound 1 in Example 1 and was isolated as an off-white solid (43.04 mg, 22.2% yield over 3 steps).

$^1$HNMR (400 MHz, DMSO-d$_6$): δ=11.42 (d, J=2.1 Hz, 1H), 8.07 (d, J=8.5 Hz, 1H), 7.19 (s, 1H), 6.94 (d, J=2.4 Hz, 1H), 6.70 (d, J=8.5 Hz, 1H), 6.26 (d, J=7.6 Hz, 1H), 4.62-4.52 (m, 1H), 4.31 (br d, J=2.5 Hz, 2H), 4.25 (br d, J=3.4 Hz, 2H), 3.53 (br s, 4H), 3.46 (br s, 2H), 3.18 (br s, 2H), 2.30-2.19 (m, 2H), 2.09-1.97 (m, 2H), 1.69-1.58 (m, 2H).

LCMS: m/z=485.1 (M+H)$^+$.

Example 31: Synthesis of 5-chloro-N4-isobutyl-N2-(2-methoxy-4-(morpholinosulfonyl)phenyl)-7H-pyrrolo[2,3-d]pyrimidine-2,4-diamine (31)

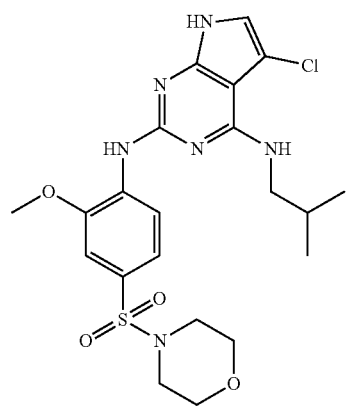

(31)

Compound 31 was prepared in an analogous manner to compound 1 in Example 1 and was isolated as an off-white solid (28.31 mg, 14.3% yield over 3 steps).

$^1$H NMR (400 MHz, DMSO-d$_6$): δ=11.52 (d, J=2.1 Hz, 1H), 8.82 (d, J=8.6 Hz, 1H), 7.62 (s, 1H), 7.30 (dd, J=1.9, 8.6 Hz, 1H), 7.19 (d, J=2.0 Hz, 1H), 7.06 (d, J=2.4 Hz, 1H), 6.54 (t, J=5.9 Hz, 1H), 3.99 (s, 3H), 3.68-3.60 (m, 4H), 3.37 (t, J=6.4 Hz, 2H), 2.92-2.84 (m, 4H), 2.06-1.97 (m, 1H), 0.95 (d, J=6.6 Hz, 6H).

LCMS: m/z=495.1 (M+H)$^+$.

Example 32: Synthesis of compound 5-chloro-N4-isobutyl-N2-(2-methoxy-4-(methylsulfonyl)phenyl)-7H-pyrrolo[2,3-d]pyrimidine-2,4-diamine (32)

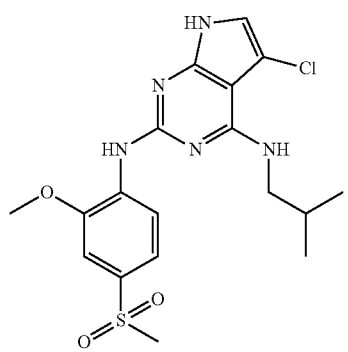

(32)

Compound 32 was prepared in an analogous manner to compound 1 in Example 1 and was isolated as an off-white solid (32.56 mg, 19.2% yield over 3 steps).

$^1$H NMR (400 MHz, DMSO-d$_6$): δ=11.53 (d, J=2.1 Hz, 1H), 8.81 (d, J=8.6 Hz, 1H), 7.61 (s, 1H), 7.50-7.42 (m, 2H), 7.06 (d, J=2.6 Hz, 1H), 6.54 (t, J=5.9 Hz, 1H), 4.01 (s, 3H), 3.37 (t, J=6.4 Hz, 2H), 3.18 (s, 3H), 2.10-1.96 (m, 1H), 0.96 (d, J=6.7 Hz, 6H).

LCMS: m/z=424.1 (M+H)$^+$.

Example 33: Synthesis of (8-((5-chloro-4-(isobutylamino)-7H-pyrrolo[2,3-d]pyrimidin-2-yl)amino)-2,3-dihydrobenzo[b][1,4]dioxin-5-yl)(morpholino)methanone (33)

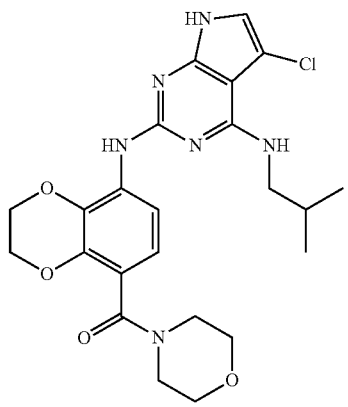

(33)

Compound 33 was prepared in an analogous manner to compound 1 in Example 1 and was isolated as an off-white solid (26.92 mg, 13.8% yield over 3 steps).

$^1$H NMR (400 MHz, DMSO-d$_6$): δ=11.43 (d, J=2.1 Hz, 1H), 8.14 (d, J=8.4 Hz, 1H), 7.23 (s, 1H), 6.99 (d, J=2.4 Hz, 1H), 6.74 (d, J=8.4 Hz, 1H), 6.44 (t, J=5.9 Hz, 1H), 4.42-4.27 (m, 4H), 3.60 (br s, 4H), 3.53 (br d, J=1.0 Hz, 2H), 3.37-3.33 (m, 2H), 3.25 (br d, J=9.0 Hz, 2H), 2.07-1.92 (m, 1H), 0.94 (d, J=6.6 Hz, 6H).
LCMS: m/z=487.1 (M+H)+.

Example 34: Synthesis of 5-chloro-N4-isopropyl-N2-(2-methoxy-4-(methylsulfonyl)phenyl)-7H-pyrrolo[2,3-d]pyrimidine-2,4-diamine (34)

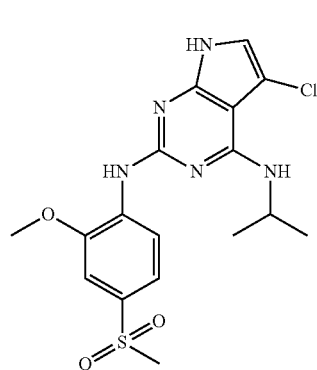

(34)

Compound 34 was prepared in an analogous manner to compound 1 in Example 1 and was isolated as an off-white solid (33.51 mg, 20.4% yield over 3 steps).
$^1$H NMR (400 MHz, DMSO-d$_6$): δ=11.57 (br d, J=2.0 Hz, 1H), 8.82 (d, J=8.6 Hz, 1H), 7.64 (s, 1H), 7.50 (dd, J=2.0, 8.6 Hz, 1H), 7.44 (d, J=2.0 Hz, 1H), 7.08 (d, J=2.6 Hz, 1H), 5.97 (d, J=7.9 Hz, 1H), 4.52-4.35 (m, 1H), 4.02 (s, 3H), 3.19 (s, 3H), 1.30 (d, J=6.6 Hz, 6H).
LCMS: m/z=410.1 (M+H)+.

Example 35: Synthesis of (8-((5-chloro-4-(isopropylamino)-7H-pyrrolo[2,3-d]pyrimidin-2-yl)amino)-2,3-dihydrobenzo[b][1,4]dioxin-5-yl)(morpholino)methanone (35)

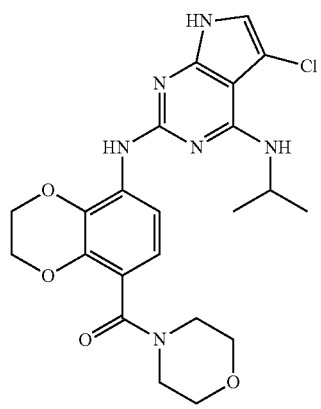

(35)

Compound 35 was prepared in an analogous manner to compound 1 in Example 1 and was isolated as an off-white solid (33.03 mg, 17.4% yield over 3 steps).
$^1$H NMR (400 MHz, DMSO-d$_6$): δ=11.48 (d, J=2.1 Hz, 1H), 8.14 (d, J=8.4 Hz, 1H), 7.26 (s, 1H), 7.01 (d, J=2.4 Hz, 1H), 6.76 (d, J=8.4 Hz, 1H), 5.87 (d, J=7.8 Hz, 1H), 4.42-4.25 (m, 5H), 3.66-3.58 (m, 4H), 3.57-3.49 (m, 2H), 3.26 (br s, 2H), 1.27 (d, J=6.6 Hz, 6H).
LCMS: m/z=473.1 (M+H)+.

Example 36: Synthesis of (8-((5-chloro-4-(cyclopentylamino)-7H-pyrrolo[2,3-d]pyrimidin-2-yl)amino)-2,3-dihydrobenzo[b][1,4]dioxin-5-yl)(morpholino)methanone (36)

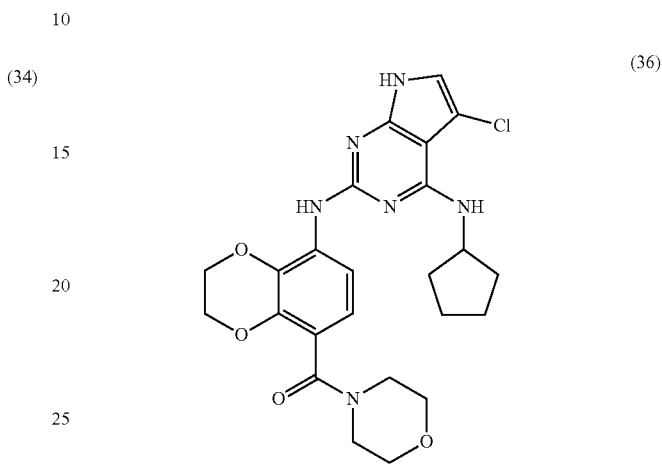

(36)

Compound 36 was prepared in an analogous manner to compound 1 in Example 1 and was isolated as an off-white solid (28.59 mg, 14.3% yield over 3 steps).
$^1$H NMR (400 MHz, DMSO-d$_6$): δ=11.42 (d, J=2.1 Hz, 1H), 8.09 (d, J=8.5 Hz, 1H), 7.20 (s, 1H), 6.94 (d, J=2.5 Hz, 1H), 6.68 (d, J=8.5 Hz, 1H), 5.89 (d, J=7.3 Hz, 1H), 4.46-4.34 (m, 1H), 4.31 (br d, J=2.4 Hz, 2H), 4.25 (br d, J=3.3 Hz, 2H), 3.53 (br s, 4H), 3.49-3.42 (m, 2H), 3.18 (br s, 2H), 2.04-1.90 (m, 2H), 1.72-1.60 (m, 2H), 1.60-1.41 (m, 4H).
LCMS: m/z=499.1 (M+H)+.

Example 37: Synthesis of (8-((5-chloro-4-(cyclohexylamino)-7H-pyrrolo[2,3-d]pyrimidin-2-yl)amino)-2,3-dihydrobenzo[b][1,4]dioxin-5-yl)(morpholino)methanone (37)

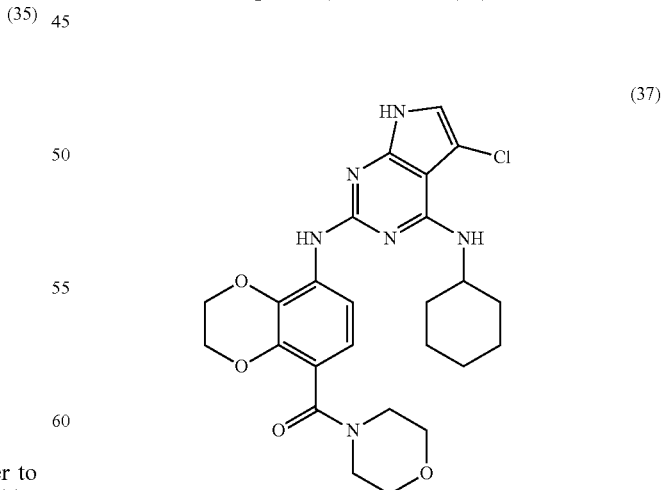

(37)

Compound 37 was prepared in an analogous manner to compound 1 in Example 1 and was isolated as an off-white solid (31.87 mg, 15.5% yield over 3 steps).

¹H NMR (400 MHz, DMSO-d₆): δ=11.46 (d, J=2.1 Hz, 1H), 8.46-7.82 (m, 1H), 7.39-7.11 (m, 1H), 7.01 (d, J=2.4 Hz, 1H), 6.82-6.57 (m, 1H), 6.00-5.76 (m, 1H), 4.49-4.20 (m, 4H), 4.12-3.89 (m, 1H), 3.60 (br s, 4H), 3.57-3.47 (m, 2H), 3.29-3.11 (m, 2H), 2.08-1.87 (m, 2H), 1.83-1.67 (m, 2H), 1.62 (br d, J=12.1 Hz, 1H), 1.51-1.33 (m, 4H), 1.30-1.13 (m, 1H).

LCMS: m/z=513.2 (M+H)⁺.

Example 38: Synthesis (R)-5-chloro-N2-(2-methoxy-4-(morpholinosulfonyl)phenyl)-N4-(tetrahydrofuran-3-yl)-7H-pyrrolo[2,3-d]pyrimidine-2,4-diamine (38)

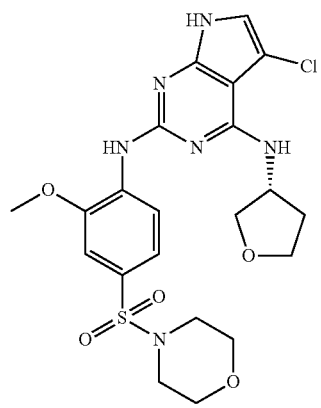

(38)

Compound 38 was prepared in an analogous manner to compound 1 in Example 1 and was isolated as an off-white solid (62.73 mg, 30.8% yield over 3 steps).

¹H NMR (400 MHz, DMSO-d₆): δ=11.55 (d, J=2.3 Hz, 1H), 8.74 (d, J=8.6 Hz, ¹H), 7.64 (s, 1H), 7.28 (dd, J=1.9, 8.6 Hz, 1H), 7.13 (d, J=1.9 Hz, 1H), 7.04 (d, J=2.5 Hz, 1H), 6.16 (d, J=6.8 Hz, 1H), 4.81-4.50 (m, 1H), 3.93 (s, 3H), 3.90 (dd, J=5.9, 8.9 Hz, 1H), 3.87-3.80 (m, 1H), 3.70 (dt, J=5.9, 8.2 Hz, 1H), 3.62 (dd, J=4.1, 9.0 Hz, 1H), 3.59-3.53 (m, 4H), 2.87-2.73 (m, 4H), 2.31-2.16 (m, 1H), 1.98-1.72 (m, 1H).

LCMS: m/z=509.1 (M+H)⁺.

Example 39: Synthesis of (R)-5-chloro-N2-(2-methoxy-4-((4-morpholinopiperidin-1-yl)sulfonyl)phenyl)-N4-(tetrahydrofuran-3-yl)-7H-pyrrolo[2,3-d]pyrimidine-2,4-diamine (39)

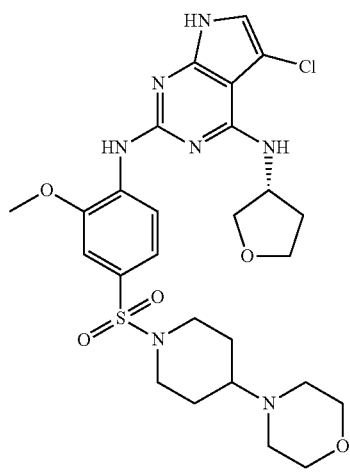

(39)

Compound 39 was prepared in an analogous manner to compound 1 in Example 1 and was isolated as an off-white solid (37.67 mg, 15.9% yield over 3 steps).

¹H NMR (400 MHz, DMSO-d₆): δ=11.60 (d, J=2.1 Hz, 1H), 8.77 (d, J=8.6 Hz, 1H), 7.67 (s, 1H), 7.33 (dd, J=1.8, 8.6 Hz, 1H), 7.19 (d, J=1.9 Hz, 1H), 7.09 (d, J=2.5 Hz, 1H), 6.21 (d, J=6.6 Hz, 1H), 4.88-4.61 (m, 1H), 3.98 (s, 3H), 3.96-3.93 (m, 1H), 3.93-3.85 (m, 1H), 3.76 (dt, J=6.1, 8.2 Hz, 1H), 3.70-3.59 (m, 3H), 3.51 (br s, 4H), 2.44-2.34 (m, 4H), 2.32-2.20 (m, 3H), 2.15-2.07 (m, 1H), 2.04-1.93 (m, 1H), 1.79 (br d, J=11.4 Hz, 2H), 1.48-1.32 (m, 2H).

LCMS: m/z=592.2 (M+H)⁺.

Example 40: Synthesis of R)-5-chloro-N2-(2-methoxy-4-(methylsulfonyl)phenyl)-N4-(tetrahydrofuran-3-yl)-7H-pyrrolo[2,3-d]pyrimidine-2,4-diamine (40)

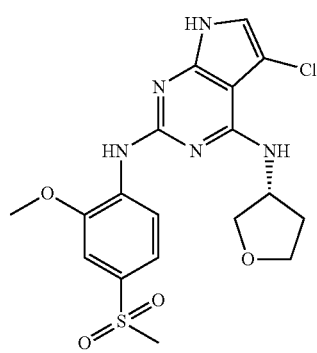

(40)

Compound 40 was prepared in an analogous manner to compound 1 in Example 1 and was isolated as an off-white solid (40.18 mg, 22.9% yield over 3 steps).

¹H NMR (400 MHz, DMSO-d₆): δ=11.57 (d, J=2.1 Hz, 1H), 8.72 (d, J=8.6 Hz, 1H), 7.63 (s, 1H), 7.44 (dd, J=1.9, 8.6 Hz, 1H), 7.37 (d, J=2.0 Hz, 1H), 7.04 (d, J=2.5 Hz, 1H), 6.16 (d, J=6.8 Hz, 1H), 4.73-4.59 (m, 1H), 3.94 (s, 3H), 3.90 (dd, J=5.9, 8.9 Hz, 1H), 3.87-3.80 (m, 1H), 3.70 (dt, J=6.0, 8.3 Hz, 1H), 3.62 (dd, J=4.1, 9.0 Hz, 1H), 3.12 (s, 3H), 2.31-2.19 (m, 1H), 1.99-1.84 (m, 1H).

LCMS: m/z=438.1 (M+H)+.

Example 41: Synthesis of 5-chloro-N4-(cyclopropylmethyl)-N2-(2-methoxy-4-((4-morpholinopiperidin-1-yl)sulfonyl)phenyl)-7H-pyrrolo[2,3-d]pyrimidine-2,4-diamine (41)

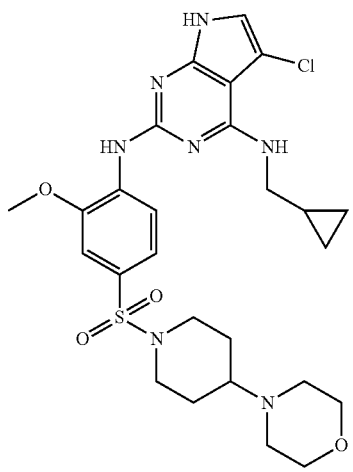

(41)

Compound 41 was prepared in an analogous manner to compound 1 in Example 1 and was isolated as an off-white solid (42.61 mg, 18.5% yield over 3 steps).

$^1$H NMR (400 MHz, DMSO-d$_6$): δ=11.54 (d, J=2.2 Hz, 1H), 8.81 (d, J=8.6 Hz, 1H), 7.61 (s, 1H), 7.31 (dd, J=1.8, 8.6 Hz, 1H), 7.20 (d, J=1.8 Hz, 1H), 7.07 (d, J=2.6 Hz, 1H), 6.60 (t, J=5.7 Hz, 1H), 3.99 (s, 3H), 3.65 (br d, J=11.6 Hz, 2H), 3.55-3.48 (m, 4H), 3.44-3.38 (m, 3H), 2.39 (br s, 4H), 2.27 (br t, J=11.1 Hz, 2H), 2.10 (m, 1H), 1.80 (br d, J=11.1 Hz, 2H), 1.50-1.33 (m, 2H), 1.28-1.14 (m, 1H), 0.51-0.41 (m, 2H), 0.38-0.26 (m, 2H).

LCMS: m/z=576.0 (M+H)+.

Example 42: Synthesis of 5-chloro-N4-(cyclobutylmethyl)-N2-(2-methoxy-4-(morpholinosulfonyl)phenyl)-7H-pyrrolo[2,3-d]pyrimidine-2,4-diamine (42)

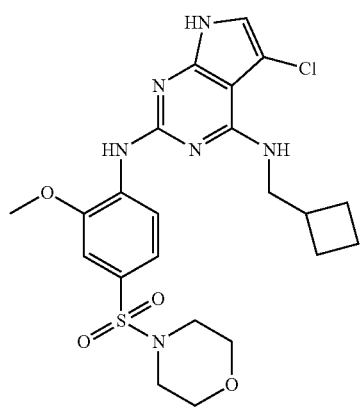

(42)

Compound 42 was prepared in an analogous manner to compound 1 in Example 1 and was isolated as an off-white solid (43.31 mg, 21.4% yield over 3 steps).

$^1$H NMR (400 MHz, DMSO-d$_6$): δ=11.53 (d, J=2.1 Hz, 1H), 8.83 (d, J=8.6 Hz, 1H), 7.63 (s, 1H), 7.31 (dd, J=2.0, 8.6 Hz, 1H), 7.20 (d, J=2.0 Hz, 1H), 7.06 (d, J=2.6 Hz, 1H), 6.52 (t, J=5.8 Hz, 1H), 4.01 (s, 3H), 3.68-3.62 (m, 4H), 3.61-3.56 (m, 2H), 2.93-2.84 (m, 4H), 2.74-2.66 (m, 1H), 2.09-1.97 (m, 2H), 1.93-1.73 (m, 4H).

LCMS: m/z=507.0 (M+H)+.

Example 43: Synthesis of 5-chloro-N4-(cyclobutylmethyl)-N2-(2-methoxy-4-((4-morpholinopiperidin-1-yl)sulfonyl)phenyl)-7H-pyrrolo[2,3-d]pyrimidine-2,4-diamine (43)

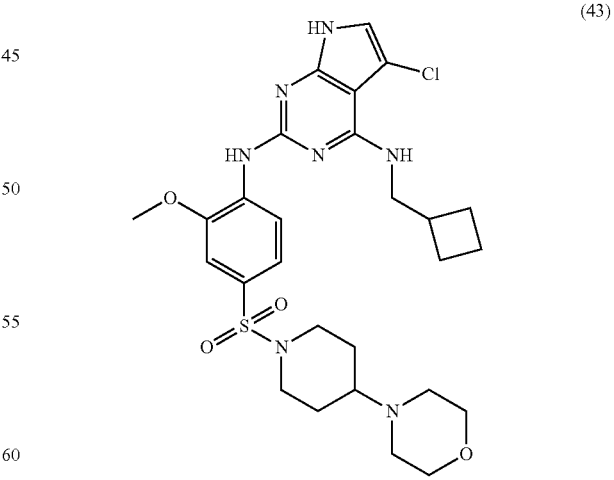

(43)

Compound 43 was prepared in an analogous manner to Compound 1 in Example 1 and was isolated as an off-white solid (33.04 mg, 13.9% yield over 3 steps).

$^1$H NMR (400 MHz, DMSO-d$_6$): δ=11.52 (d, J=2.2 Hz, 1H), 8.81 (d, J=8.6 Hz, 1H), 7.61 (s, 1H), 7.30 (dd, J=1.9, 8.6 Hz, 1H), 7.20 (d, J=2.0 Hz, 1H), 7.06 (d, J=2.6 Hz, 1H), 6.51 (t, J=5.8 Hz, 1H), 3.99 (s, 3H), 3.65 (br d, J=11.6 Hz, 2H), 3.58 (t, J=6.4 Hz, 2H), 3.55-3.47 (m, 4H), 2.74-2.64 (m, 1H), 2.39 (br s, 4H), 2.27 (br t, J=11.1 Hz, 2H), 2.16-2.08 (m, 1H), 2.07-1.97 (m, 2H), 1.91-1.71 (m, 6H), 1.42 (m, 2H).

LCMS: m/z=590.0 (M+H)$^+$.

Example 44: Synthesis of (8-((5-chloro-4-((cyclobutylmethyl)amino)-7H-pyrrolo[2,3-d]pyrimidin-2-yl)amino)-2,3-dihydrobenzo[b][1,4]dioxin-5-yl)(morpholino)methanone (44)

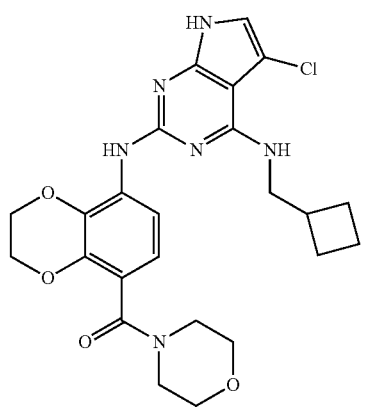

(44)

Compound 44 was prepared in an analogous manner to compound 1 in Example 1 and was isolated as an off-white solid (38.32 mg, 19.2% yield over 3 steps).

$^1$H NMR (400 MHz, DMSO-d$_6$): δ=11.44 (d, J=2.1 Hz, 1H), 8.15 (d, J=8.6 Hz, 1H), 7.24 (s, 1H), 6.99 (d, J=2.6 Hz, 1H), 6.75 (d, J=8.4 Hz, 1H), 6.41 (t, J=5.7 Hz, 1H), 4.39 (br d, J=2.6 Hz, 2H), 4.32 (br d, J=3.3 Hz, 2H), 3.61 (br s, 4H), 3.58-3.49 (m, 4H), 3.28-3.16 (m, 2H), 2.72-2.64 (m, 1H), 2.09-1.96 (m, 2H), 1.88-1.71 (m, 4H).

LCMS: m/z=499.0 (M+H)$^+$.

Example 45: Synthesis of 5-chloro-N4-(cyclopentylmethyl)-N2-(2-methoxy-4-(morpholinosulfonyl)phenyl)-7H-pyrrolo[2,3-d]pyrimidine-2,4-diamine (45)

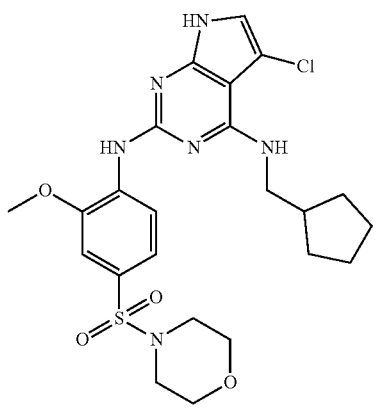

(45)

Compound 45 was prepared in an analogous manner to compound 1 in Example 1 and was isolated as an off-white solid (36.26 mg, 17.4% yield over 3 steps).

$^1$H NMR (400 MHz, DMSO-d$_6$): δ=11.53 (d, J=2.1 Hz, 1H), 8.83 (d, J=8.7 Hz, 1H), 7.63 (s, 1H), 7.31 (dd, J=1.8, 8.6 Hz, 1H), 7.20 (d, J=2.0 Hz, 1H), 7.06 (d, J=2.4 Hz, 1H), 6.54 (t, J=5.7 Hz, 1H), 4.00 (s, 3H), 3.70-3.60 (m, 4H), 3.52-3.44 (m, 2H), 2.96-2.80 (m, 4H), 2.37-2.29 (m, 1H), 1.79-1.67 (m, 2H), 1.66-1.58 (m, 2H), 1.57-1.47 (m, 2H), 1.41-1.28 (m, 2H).

LCMS: m/z=521.0 (M+H)$^+$.

Example 46: Synthesis of (8-((5-chloro-4-((cyclopentylmethyl)amino)-7H-pyrrolo[2,3-d]pyrimidin-2-yl)amino)-2,3-dihydrobenzo[b][1,4]dioxin-5-yl)(morpholino)methanone (46)

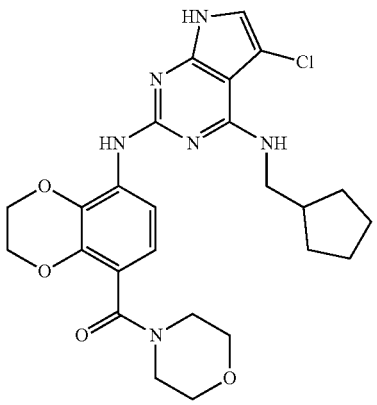

(46)

Compound 46 was prepared in an analogous manner to compound 1 in Example 1 and was isolated as an off-white solid (25.64 mg, 12.5% yield over 3 steps).

$^1$H NMR (400 MHz, DMSO-d$_6$): δ=11.43 (d, J=2.1 Hz, 1H), 8.15 (d, J=8.6 Hz, 1H), 7.24 (s, 1H), 6.99 (d, J=2.6 Hz, 1H), 6.74 (d, J=8.4 Hz, 1H), 6.44 (t, J=5.7 Hz, 1H), 4.38 (m, 2H), 4.32 (m, 2H), 3.61 (br s, 4H), 3.54 (br s, 2H), 3.47-3.42 (m, 2H), 3.28-3.20 (m, 2H), 2.33-2.24 (m, 1H), 1.74-1.65 (m, 2H), 1.65-1.59 (m, 2H), 1.56-1.47 (m, 2H), 1.38-1.26 (m, 2H).

LCMS: m/z=513.0 (M+H)$^+$.

Example 47: Synthesis of (R)—N4-(sec-butyl)-5-chloro-N2-(2-methoxy-4-(morpholinosulfonyl)phenyl)-7H-pyrrolo[2,3-d]pyrimidine-2,4-diamine (47)

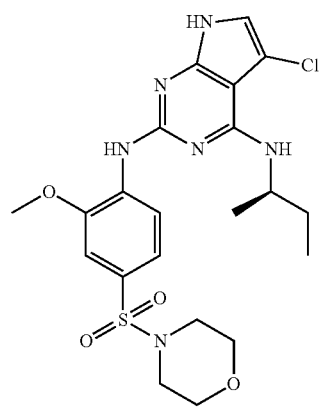

(47)

Compound 47 was prepared in an analogous manner to compound 1 in Example 1 and was isolated as an off-white solid (42.49 mg, 21.5% yield over 3 steps).

$^1$H NMR (400 MHz, DMSO-d$_6$): δ=11.50 (d, J=2.3 Hz, 1H), 8.81-8.68 (m, 1H), 7.60-7.55 (m, 1H), 7.26 (dd, J=1.9, 8.6 Hz, 1H), 7.13 (d, J=1.9 Hz, 1H), 7.01 (d, J=2.5 Hz, 1H), 5.86 (d, J=8.3 Hz, 1H), 4.22-4.10 (m, 1H), 3.93 (s, 3H), 3.64-3.49 (m, 4H), 2.92-2.73 (m, 4H), 1.67-1.45 (m, 2H), 1.25-1.09 (m, 3H), 0.87 (t, J=7.4 Hz, 3H).

LCMS: m/z=495.0 (M+H)$^+$.

Example 48: Synthesis of (R)—N4-(sec-butyl)-5-chloro-N2-(2-methoxy-4-((4-morpholinopiperidin-1-yl)sulfonyl)phenyl)-7H-pyrrolo[2,3-d]pyrimidine-2,4-diamine (48)

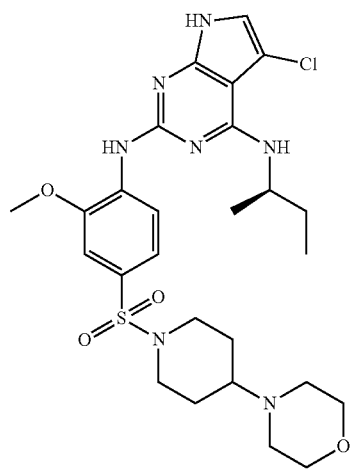

(48)

Compound 48 was prepared in an analogous manner to compound 1 in Example 1 and was isolated as an off-white solid (51.56 mg, 21.5% yield over 3 steps).

$^1$H NMR (400 MHz, DMSO-d$_6$): δ=11.49 (d, J=2.0 Hz, 1H), 8.77-8.65 (m, 1H), 7.55 (s, 1H), 7.24 (dd, J=1.8, 8.6 Hz, 1H), 7.13 (d, J=1.8 Hz, 1H), 7.01 (d, J=2.4 Hz, 1H), 5.85 (d, J=8.3 Hz, 1H), 4.21-4.11 (m, 1H), 3.91 (s, 3H), 3.62-3.54 (m, 2H), 3.48-3.42 (m, 4H), 2.37-2.28 (m, 4H), 2.23-2.13 (m, 2H), 2.10-2.00 (m, 1H), 1.77-1.69 (m, 2H), 1.65-1.48 (m, 2H), 1.40-1.29 (m, 2H), 1.19 (d, J=6.6 Hz, 3H), 0.87 (t, J=7.4 Hz, 3H).

LCMS: m/z=578.0 (M+H)$^+$.

Example 49: Synthesis of (R)—N4-(sec-butyl)-5-chloro-N2-(2-methoxy-4-(methylsulfonyl)phenyl)-7H-pyrrolo[2,3-d]pyrimidine-2,4-diamine (49)

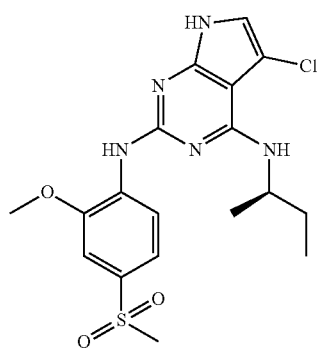

(49)

Compound 49 was prepared in an analogous manner to compound 1 in Example 1 and was isolated as an off-white solid (13.35 mg, 7.9% yield over 3 steps).

$^1$H NMR (400 MHz, DMSO-d$_6$): δ=11.51 (d, J=1.6 Hz, 1H), 8.74 (d, J=8.6 Hz, 1H), 7.57 (s, 1H), 7.42 (dd, J=1.9, 8.6 Hz, 1H), 7.37 (d, J=2.0 Hz, 1H), 7.01 (d, J=2.0 Hz, 1H), 5.86 (d, J=1.6 Hz, 1H), 4.22-4.12 (m, 1H), 3.94 (s, 3H), 3.12 (s, 3H), 1.66-1.47 (m, 2H), 1.19 (d, J=6.5 Hz, 3H), 0.91-0.84 (m, 3H).

LCMS: m/z=424.0 (M+H)$^+$.

Example 50: Synthesis of (R)-(8-((4-(sec-butylamino)-5-chloro-7H-pyrrolo[2,3-d]pyrimidin-2-yl)amino)-2,3-dihydrobenzo[b][1,4]dioxin-5-yl)(morpholino)methanone (50)

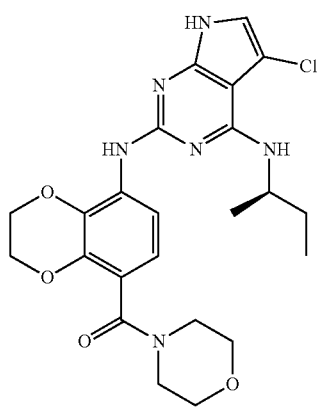

(50)

Compound 50 was prepared in an analogous manner to compound 1 in Example 1 and was isolated as an off-white solid (16.50 mg, 8.5% yield over 3 steps).

$^1$H NMR (400 MHz, DMSO-d$_6$): δ=11.57-11.42 (m, 1H), 8.17 (d, J=8.4 Hz, 1H), 7.30 (s, 1H), 7.05 (d, J=2.5 Hz, 1H), 6.79 (d, J=2.4 Hz, 1H), 5.93-5.82 (m, 1H), 4.44-4.33 (m, 4H), 4.29-4.20 (m, 1H), 3.68-3.62 (m, 4H), 3.61-3.54 (m, 2H), 3.35-3.21 (m, 2H), 1.76-1.58 (m, 2H), 1.28 (d, J=6.5 Hz, 3H), 0.97 (t, J=7.4 Hz, 3H).
LCMS: m/z=487.0 (M+H)$^+$.

Example 51: Synthesis of (S)—N4-(sec-butyl)-5-chloro-N2-(2-methoxy-4-(morpholinosulfonyl)phenyl)-7H-pyrrolo[2,3-d]pyrimidine-2,4-diamine (51)

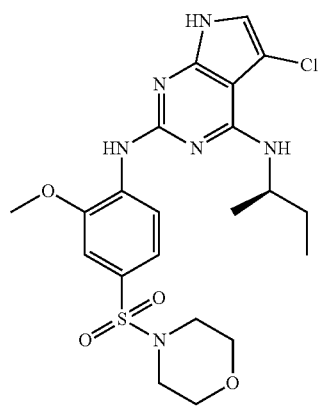

Compound 51 was prepared in an analogous manner to compound 1 in Example 1 and was isolated as an off-white solid (41.19 mg, 20.7% yield over 3 steps).
$^1$H NMR (400 MHz, DMSO-d$_6$): δ=11.67-11.45 (m, 1H), 8.82 (d, J=8.6 Hz, 1H), 7.65 (s, 1H), 7.32 (dd, J=6.0, 2.0 Hz, 1H), 7.21-7.18 (m, 1H), 7.08 (d, J=2.5 Hz, 1H), 5.95-5.89 (m, 1H), 4.28-4.20 (m, 1H), 3.99 (s, 3H), 3.66-3.61 (m, 4H), 2.91-2.86 (m, 4H), 1.72-1.56 (m, 2H), 1.29-1.26 (m, J=1.6 Hz, 3H), 0.97-0.91 (m, 3H).
LCMS: m/z=495.0 (M+H)$^+$.

Example 52: Synthesis of (S)—N4-(sec-butyl)-5-chloro-N2-(2-methoxy-4-((4-morpholinopiperidin-1-yl)sulfonyl)phenyl)-7H-pyrrolo[2,3-d]pyrimidine-2,4-diamine (52)

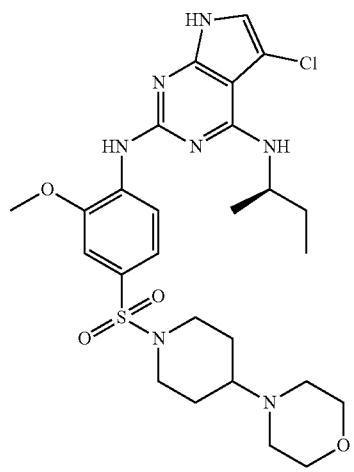

Compound 52 was prepared in an analogous manner to compound 1 in Example 1 and was isolated as an off-white solid (51.21 mg, 22.1% yield over 3 steps).
$^1$H NMR (400 MHz, DMSO-d$_6$): δ=11.49 (d, J=2.3 Hz, 1H), 8.72 (d, J=8.6 Hz, 1H), 7.56 (s, 1H), 7.24 (dd, J=1.8, 8.6 Hz, 1H), 7.13 (d, J=1.9 Hz, 1H), 7.01 (d, J=2.5 Hz, 1H), 5.88-5.83 (m, 1H), 4.22-4.12 (m, 1H), 3.91 (s, 3H), 3.62-3.54 (m, 2H), 3.47-3.41 (m, 4H), 2.32 (br s, 4H), 2.23-2.14 (m, 2H), 2.10-1.99 (m, 1H), 1.77-1.69 (m, 2H), 1.65-1.48 (m, 2H), 1.43-1.26 (m, 2H), 1.19 (d, J=6.5 Hz, 3H), 0.87 (t, J=7.4 Hz, 3H).
LCMS: m/z=578.0 (M+H)$^+$.

Example 53: Synthesis of (S)—N4-(sec-butyl)-5-chloro-N2-(2-methoxy-4-(methylsulfonyl)phenyl)-7H-pyrrolo[2,3-d]pyrimidine-2,4-diamine (53)

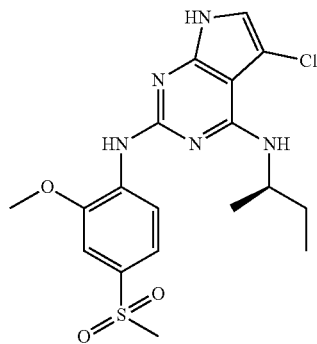

Compound 53 was prepared in an analogous manner to compound 1 in Example 1 and was isolated as an off-white solid (36.40 mg, 21.2% yield over 3 steps).
$^1$H NMR (400 MHz, DMSO-d$_6$): δ=11.51 (d, J=2.1 Hz, 1H), 8.74 (d, J=8.5 Hz, 1H), 7.57 (s, 1H), 7.42 (dd, J=1.9, 8.6 Hz, 1H), 7.37 (d, J=1.9 Hz, 1H), 7.01 (d, J=2.5 Hz, 1H), 5.86 (d, J=8.3 Hz, 1H), 4.21-4.13 (m, 1H), 3.94 (s, 3H), 3.12 (s, 3H), 1.67-1.48 (m, 2H), 1.19 (d, J=6.5 Hz, 3H), 0.88 (t, J=7.4 Hz, 3H).
LCMS: m/z=424.0 (M+H)$^+$.

Example 54: Synthesis of (S)-(8-((4-(sec-butylamino)-5-chloro-7H-pyrrolo[2,3-d]pyrimidin-2-yl)amino)-2,3-dihydrobenzo[b][1,4]dioxin-5-yl)(morpholino)methanone (54)

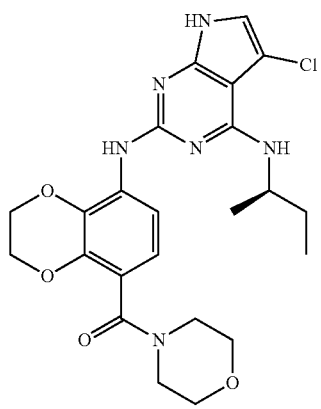

Compound 54 was prepared in an analogous manner to compound 1 in Example 1 and was isolated as an off-white solid (14.93 mg, 7.7% yield over 3 steps).

$^1$H NMR (400 MHz, DMSO-d$_6$): δ=11.48 (d, J=2.1 Hz, 1H), 8.13 (d, J=8.5 Hz, 1H), 7.26 (s, 1H), 7.01 (d, J=2.5 Hz, 1H), 6.75 (d, J=8.5 Hz, 1H), 5.83 (d, J=8.3 Hz, 1H), 4.40-4.29 (m, 4H), 4.25-4.15 (m, 1H), 3.60 (br s, 4H), 3.53 (br s, 2H), 3.25 (br s, 1H), 2.55-2.51 (m, 1H), 1.71-1.53 (m, 2H), 1.24 (d, J=6.5 Hz, 3H), 0.93 (t, J=7.4 Hz, 3H).

LCMS: m/z=487.0 (M+H)$^+$.

Example 55: Synthesis of 5-chloro-N4-cyclopentyl-N2-(2-methoxy-4-(morpholinosulfonyl)phenyl)-7H-pyrrolo[2,3-d]pyrimidine-2,4-diamine (55)

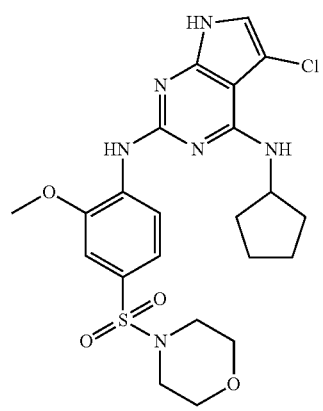

(55)

Compound 55 was prepared in an analogous manner to compound 1 in Example 1 and was isolated as an off-white solid (47.16 mg, 23.3% yield over 3 steps).

$^1$H NMR (400 MHz, DMSO-d$_6$): δ=11.50 (d, J=2.1 Hz, 1H), 8.77 (d, J=8.5 Hz, 1H), 7.59 (s, 1H), 7.26 (dd, J=1.9, 8.5 Hz, 1H), 7.13 (d, J=1.9 Hz, 1H), 7.01 (d, J=2.5 Hz, 1H), 5.98 (d, J=7.4 Hz, 1H), 4.49-4.38 (m, 1H), 3.93 (s, 3H), 3.61-3.53 (m, 4H), 2.84-2.78 (m, 4H), 2.04-1.94 (m, 2H), 1.70-1.63 (m, 2H), 1.60-1.48 (m, 4H).

LCMS: m/z=507.0 (M+H)$^+$.

Example 56: Synthesis of 5-chloro-N4-cyclopentyl-N2-(2-methoxy-4-((4-morpholinopiperidin-1-yl)sulfonyl)phenyl)-7H-pyrrolo[2,3-d]pyrimidine-2,4-diamine (56)

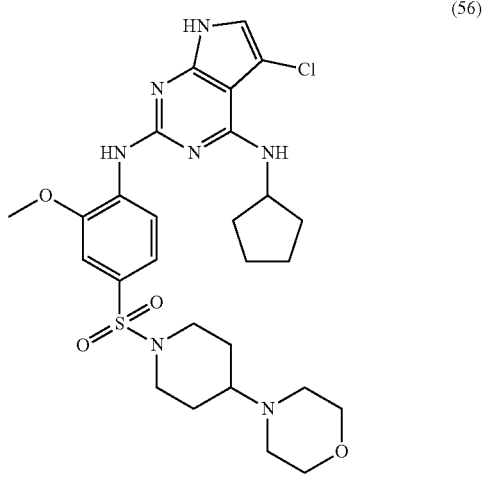 [SMILES: COc1cc(S(=O)(=O)N2CCC(N3CCOCC3)CC2)ccc1Nc1nc(NC2CCCC2)c2c(Cl)c[nH]c2n1]

(56)

Compound 56 was prepared in an analogous manner to compound 1 in Example 1 and was isolated as an off-white solid (10.01 mg, 4.2% yield over 3 steps).

$^1$H NMR (400 MHz, DMSO-d$_6$): δ=11.61 (d, J=2.3 Hz, 1H), 8.86 (d, J=8.6 Hz, 1H), 7.69 (s, 1H), 7.37 (dd, J=1.9, 8.6 Hz, 1H), 7.24 (d, J=1.9 Hz, 1H), 7.12 (d, J=2.5 Hz, 1H), 6.09 (d, J=7.3 Hz, 1H), 4.58-4.49 (m, 1H), 4.03 (s, 3H), 3.70 (br d, J=11.6 Hz, 2H), 3.57 (br s, 4H), 2.45 (br s, 4H), 2.35-2.26 (m, 2H), 2.18 (br s, 1H), 2.14-2.06 (m, 2H), 1.86 (br d, J=11.4 Hz, 2H), 1.80-1.74 (m, 2H), 1.70-1.60 (m, 4H), 1.54-1.40 (m, 2H).

LCMS: m/z=590.0 (M+H)$^+$.

Example 57: Synthesis of 5-chloro-N4-cyclopentyl-N2-(2-methoxy-4-(methylsulfonyl)phenyl)-7H-pyrrolo[2,3-d]pyrimidine-2,4-diamine (57)

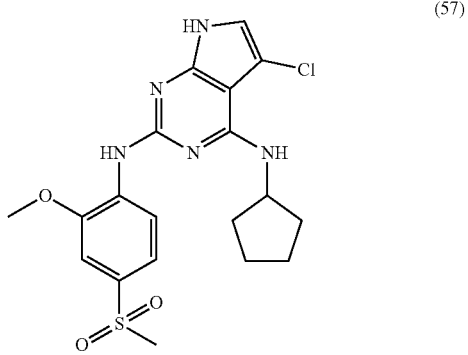 [SMILES: COc1cc(S(C)(=O)=O)ccc1Nc1nc(NC2CCCC2)c2c(Cl)c[nH]c2n1]

(57)

Compound 57 was prepared in an analogous manner to compound 1 in Example 1 and was isolated as an off-white solid (39.5 mg, 22.2% yield over 3 steps).

$^1$H NMR (400 MHz, DMSO-d$_6$): δ=11.51 (d, J=2.0 Hz, 1H), 8.76 (d, J=8.6 Hz, 1H), 7.57 (s, 1H), 7.43 (dd, J=1.9, 8.6 Hz, 1H), 7.37 (d, J=2.0 Hz, 1H), 7.01 (d, J=2.5 Hz, 1H), 5.98 (d, J=7.4 Hz, 1H), 4.49-4.38 (m, 1H), 3.94 (s, 3H), 3.12 (s, 3H), 2.04-1.94 (m, 2H), 1.70-1.63 (m, 2H), 1.60-1.48 (m, 4H).
LCMS: m/z=436.0 (M+H)+.

Example 58: Synthesis of 5-chloro-N4-cyclohexyl-N2-(2-methoxy-4-(morpholinosulfonyl)phenyl)-7H-pyrrolo[2,3-d]pyrimidine-2,4-diamine (58)

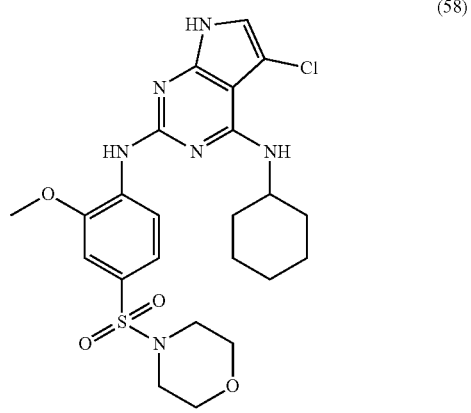 [SMILES: COc1cc(S(=O)(=O)N2CCOCC2)ccc1Nc1nc(NC2CCCCC2)c2c(Cl)c[nH]c2n1]
(58)

Compound 58 was prepared in an analogous manner to compound 1 in Example 1 and was isolated as an off-white solid (19.73 mg, 9.4% yield over 3 steps).
¹HNMR (400 MHz, DMSO-d₆): 11.56 (d, J=2.0 Hz, 1H), 8.81 (d, J=8.6 Hz, 1H), 7.66 (s, 1H), 7.31 (dd, J=1.9, 8.6 Hz, 1H), 7.20 (d, J=2.0 Hz, 1H), 7.09 (d, J=2.4 Hz, 1H), 5.99 (d, J=8.0 Hz, 1H), 4.15-4.05 (m, 1H), 4.00 (s, 3H), 3.69-3.61 (m, 4H), 2.93-2.85 (m, 4H), 2.05-1.95 (m, 2H), 1.81-1.70 (m, 2H), 1.64 (br d, J=12.4 Hz, 1H), 1.50-1.35 (m, 4H), 1.33-1.19 (m, 1H).
LCMS: m/z=521.2 (M+H)+.

Example 59: Synthesis of 5-chloro-N4-cyclohexyl-N2-(2-methoxy-4-(methylsulfonyl)phenyl)-7H-pyrrolo[2,3-d]pyrimidine-2,4-diamine (59)

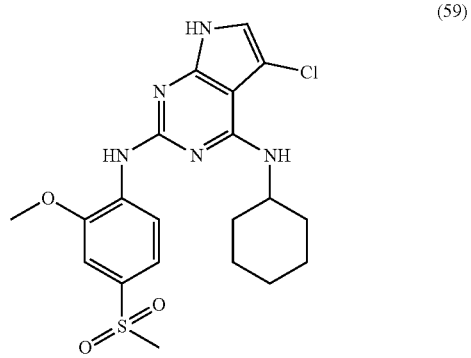 [SMILES: COc1cc(S(C)(=O)=O)ccc1Nc1nc(NC2CCCCC2)c2c(Cl)c[nH]c2n1]
(59)

Compound 59 was prepared in an analogous manner to compound 1 in Example 1 and was isolated as an off-white solid (20.08 mg, 11.1% yield over 3 steps).
¹HNMR (400 MHz, DMSO-d₆): 11.55 (d, J=2.3 Hz, 1H), 8.79 (d, J=8.5 Hz, 1H), 7.62 (s, 1H), 7.46 (dd, J=2.0, 8.5 Hz, 1H), 7.43 (d, J=2.0 Hz, 1H), 7.07 (d, J=2.5 Hz, 1H), 5.98 (d, J=8.0 Hz, 1H), 4.13-4.03 (m, 1H), 4.00 (s, 3H), 3.18 (s, 3H), 2.03-1.94 (m, 2H), 1.81-1.69 (m, 2H), 1.63 (br d, J=11.4 Hz, 1H), 1.48-1.35 (m, 4H), 1.32-1.12 (m, 1H).
LCMS: m/z=450.1 (M+H)+.

Example 60: Synthesis of (S)-5-chloro-N2-(2-methoxy-4-(morpholinosulfonyl)phenyl)-N4-(tetrahydrofuran-3-yl)-7H-pyrrolo[2,3-d]pyrimidine-2,4-diamine (60)

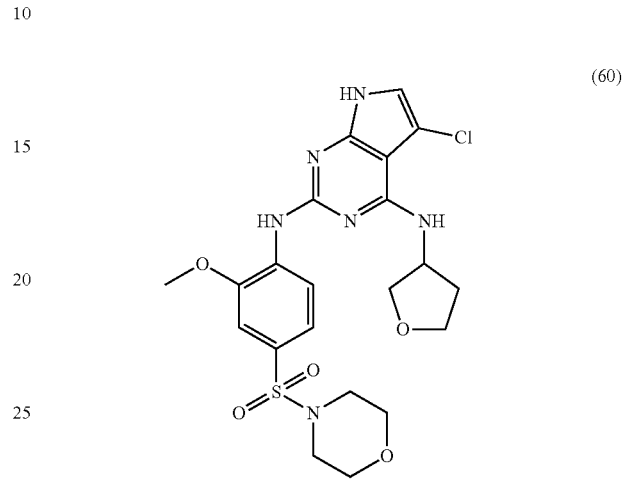
(60)

Compound 60 was prepared in an analogous manner to compound 1 in Example 1 and was isolated as an off-white solid (31.25 mg, 15.3% yield over 3 steps).
¹HNMR (400 MHz, DMSO-d₆): 11.63 (d, J=1.9 Hz, 1H), 8.82 (d, J=8.6 Hz, 1H), 7.71 (s, 1H), 7.35 (dd, J=2.0, 8.6 Hz, 1H), 7.21 (d, J=2.0 Hz, 1H), 7.11 (d, J=2.4 Hz, 1H), 6.23 (d, J=6.8 Hz, 1H), 4.84-4.65 (m, 1H), 4.01 (s, 3H), 3.97 (dd, J=5.9, 8.9 Hz, 1H), 3.94-3.88 (m, 1H), 3.78 (dt, J=6.0, 8.3 Hz, 1H), 3.69 (dd, J=4.1, 8.9 Hz, 1H), 3.67-3.61 (m, 4H), 2.94-2.84 (m, 4H), 2.37-2.27 (m, 1H), 2.06-1.94 (m, 1H).
LCMS: m/z=509.1 (M+H)+.

Example 61: Synthesis of (S)-5-chloro-N2-(2-methoxy-4-((4-morpholinopiperidin-1-yl)sulfonyl)phenyl)-N4-(tetrahydrofuran-3-yl)-7H-pyrrolo[2,3-d]pyrimidine-2,4-diamine (61)

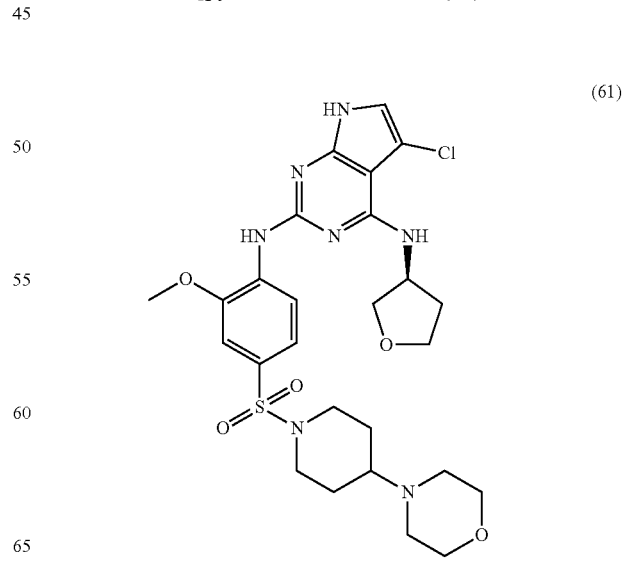
(61)

Compound 61 was prepared in an analogous manner to compound 1 in Example 1 and was isolated as an off-white solid (31.19 mg, 13.2% yield over 3 steps).

¹HNMR (400 MHz, DMSO-d$_6$): δ=11.60 (d, J=2.1 Hz, 1H), 8.77 (d, J=8.5 Hz, 1H), 7.67 (s, 1H), 7.32 (dd, J=1.9, 8.6 Hz, 1H), 7.19 (d, J=2.0 Hz, 1H), 7.09 (d, J=2.4 Hz, 1H), 6.21 (d, J=6.8 Hz, 1H), 4.80-4.64 (m, 1H), 3.97 (s, 3H), 3.96-3.93 (m, 1H), 3.92-3.84 (m, 1H), 3.76 (dt, J=6.0, 8.3 Hz, 1H), 3.70-3.60 (m, 3H), 3.55-3.45 (m, 4H), 2.41-2.34 (m, 4H), 2.33-2.29 (m, 1H), 2.28-2.20 (m, 2H), 2.16-2.05 (m, 1H), 2.04-1.94 (m, 1H), 1.78 (br d, J=11.0 Hz, 2H), 1.47-1.33 (m, 2H).

LCMS: m/z=592.2 (M+H)⁺.

Example 62: Synthesis of 5-chloro-N2-(2-methoxy-4-(morpholinosulfonyl)phenyl)-N4-(tetrahydro-2H-pyran-4-yl)-7H-pyrrolo[2,3-d]pyrimidine-2,4-diamine (62)

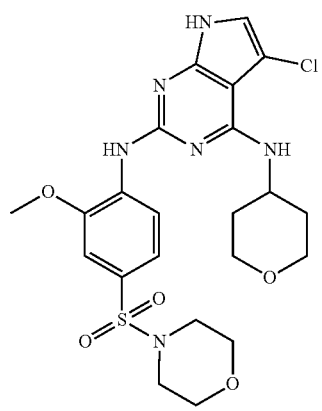

(62)

Compound 62 was prepared in an analogous manner to compound 1 in Example 1 and was isolated as an off-white solid (23.97 mg, 11.4% yield over 3 steps).

¹HNMR (400 MHz, DMSO-d$_6$): 11.58 (d, J=2.0 Hz, 1H), 8.79 (d, J=8.6 Hz, 1H), 7.67 (s, 1H), 7.32 (dd, J=1.9, 8.6 Hz, 1H), 7.19 (d, J=2.0 Hz, 1H), 7.09 (d, J=2.4 Hz, 1H), 6.11 (d, J=7.9 Hz, 1H), 4.30 (dt, J=3.4, 7.3 Hz, 1H), 3.99 (s, 3H), 3.94-3.87 (m, 2H), 3.70-3.57 (m, 4H), 3.50 (dt, J=1.9, 11.5 Hz, 2H), 2.93-2.83 (m, 4H), 1.95 (br dd, J=2.2, 12.4 Hz, 2H), 1.74-1.61 (m, 2H).

LCMS: m/z=523.1 (M+H)⁺.

Example 63: Synthesis of 5-chloro-N2-(2-methoxy-4-(methylsulfonyl)phenyl)-N4-(tetrahydro-2H-pyran-4-yl)-7H-pyrrolo[2,3-d]pyrimidine-2,4-diamine (63)

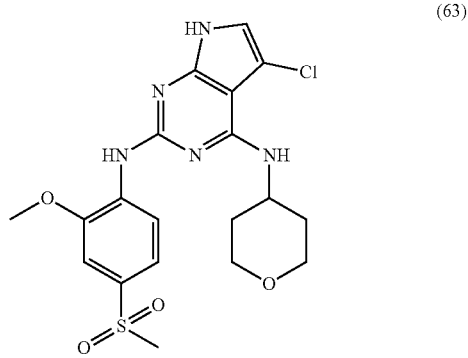

(63)

Compound 63 was prepared in an analogous manner to compound 1 in Example 1 and was isolated as an off-white solid (41.87 mg, 23.2% yield over 3 steps).

¹HNMR (400 MHz, DMSO-d$_6$): 11.58 (d, J=2.1 Hz, 1H), 8.78 (d, J=8.6 Hz, 1H), 7.66 (s, 1H), 7.50 (dd, J=2.0, 8.6 Hz, 1H), 7.44 (d, J=2.0 Hz, 1H), 7.09 (d, J=2.4 Hz, 1H), 6.11 (d, J=7.9 Hz, 1H), 4.42-4.21 (m, 1H), 4.00 (s, 3H), 3.96-3.87 (m, 2H), 3.50 (dt, J=1.8, 11.5 Hz, 2H), 3.19 (s, 3H), 2.52 (br d, J=1.9 Hz, 2H), 1.95 (br dd, J=2.2, 12.3 Hz, 2H), 1.78-1.58 (m, 2H).

LCMS: m/z=452.1 (M+H)⁺.

Example 64: Synthesis of 5-chloro-N4-(cyclopropylmethyl)-N2-(2-methoxy-4-(methylsulfonyl)phenyl)-7H-pyrrolo[2,3-d]pyrimidine-2,4-diamine (64)

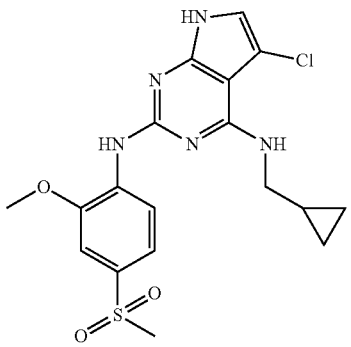

(64)

Compound 64 was prepared in an analogous manner to compound 1 in Example 1 (40.87 mg, 24.2% yield over 3 steps).

¹HNMR (400 MHz, DMSO-d$_6$): 11.77-11.37 (m, 1H), 8.93-8.66 (m, 1H), 7.65-7.58 (m, 1H), 7.51-7.46 (m, 1H), 7.45-7.41 (m, 1H), 7.10-7.04 (m, 1H), 6.65-6.57 (m, 1H), 4.10-3.90 (m, 3H), 3.43-3.38 (m, 2H), 3.21-3.16 (m, 3H), 1.29-1.14 (m, 1H), 0.51-0.41 (m, 2H), 0.39-0.23 (m, 2H).

LCMS: m/z=422.1 (M+H)⁺.

Example 65: Synthesis of (8-((5-chloro-4-((cyclopropylmethyl)amino)-7H-pyrrolo[2,3-d]pyrimidin-2-yl)amino)-2,3-dihydrobenzo[b][1,4]dioxin-5-yl)(morpholino)methanone (65)

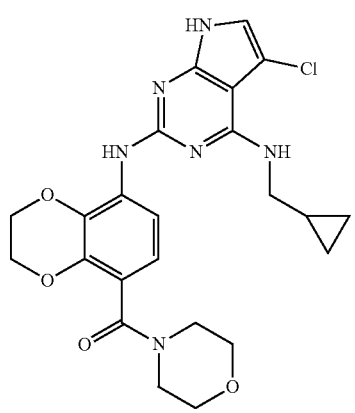

(65)

Compound 65 was prepared in an analogous manner to compound 1 in Example 1 (8.83 mg, 4.6% yield over 3 steps).

$^1$HNMR (400 MHz, DMSO-$d_6$): 11.23 (d, J=2.1 Hz, 1H), 7.90 (d, J=8.5 Hz, 1H), 7.02 (s, 1H), 6.76 (d, J=2.5 Hz, 1H), 6.51 (d, J=8.5 Hz, 1H), 6.29 (t, J=5.8 Hz, 1H), 4.18-4.05 (m, 4H), 3.41-3.27 (m, 6H), 3.01 (br s, 4H), 1.03-0.87 (m, 1H), 0.25-0.17 (m, 2H), 0.12-0.02 (m, 2H).

LCMS: m/z=485.1 (M+H)$^+$.

Example 66: Synthesis of 5-chloro-N4-(cyclobutylmethyl)-N2-(2-methoxy-4-(methylsulfonyl)phenyl)-7H-pyrrolo[2,3-d]pyrimidine-2,4-diamine (66)

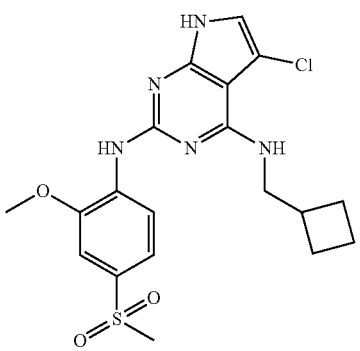

(66)

Compound 66 was prepared in an analogous manner to compound 1 in Example 1 (25.54 mg, 14.1% yield over 3 steps).

$^1$HNMR (400 MHz, DMSO-$d_6$): 11.56 (d, J=2.1 Hz, 1H), 8.82 (d, J=8.6 Hz, 1H), 7.62 (s, 1H), 7.48 (dd, J=2.0, 8.5 Hz, 1H), 7.44 (d, J=2.0 Hz, 1H), 7.07 (d, J=2.5 Hz, 1H), 6.53 (t, J=5.8 Hz, 1H), 4.02 (s, 3H), 3.61-3.56 (m, 2H), 3.19 (s, 3H), 2.73-2.66 (m, 1H), 2.08-1.99 (m, 2H), 1.91-1.75 (m, 4H).

LCMS: m/z=436.1 (M+H)$^+$.

Example 67: Synthesis of 5-chloro-N4-(cyclopentylmethyl)-N2-(2-methoxy-4-((4-morpholinopiperidin-1-yl)sulfonyl)phenyl)-7H-pyrrolo[2,3-d]pyrimidine-2,4-diamine (67)

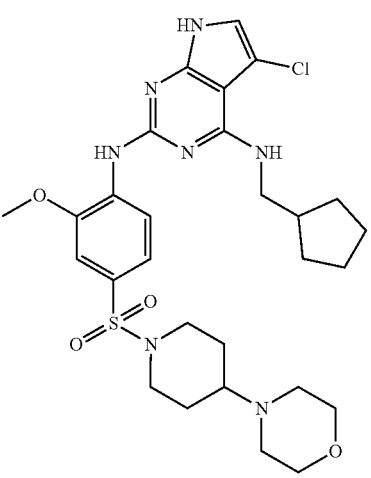

(67)

Compound 67 was prepared in an analogous manner to compound 1 in Example 1 (26.84 mg, 11.8% yield over 3 steps).

$^1$HNMR (400 MHz, DMSO-$d_6$): 11.53 (d, J=2.4 Hz, 1H), 8.81 (d, J=8.8 Hz, 1H), 7.61 (s, 1H), 7.30 (m, 1H), 7.20 (d, J=2.0 Hz, 1H), 7.07 (d, J=2.4 Hz, 1H), 6.55 (t, J=6.0 Hz, 1H), 3.99 (s, 3H), 3.65 (d, J=11.6 Hz, 2H), 3.54-3.50 (m, 4H), 3.49-3.44 (m, 2H), 2.41-2.36 (m, 4H), 2.36-2.31 (m, 1H), 2.31-2.20 (m, 2H), 2.16-2.03 (m, 1H), 1.80 (d, J=10.8 Hz, 2H), 1.76-1.67 (m, 2H), 1.66-1.57 (m, 2H), 1.57-1.47 (m, 2H), 1.47-1.26 (m, 4H).

LCMS: m/z=604.2 (M+H)$^+$.

Example 68: Synthesis of 5-chloro-N2-(2-methoxy-4-(morpholinosulfonyl)phenyl)-N4-(2-(methylsulfonyl)ethyl)-7H-pyrrolo[2,3-d]pyrimidine-2,4-diamine (68)

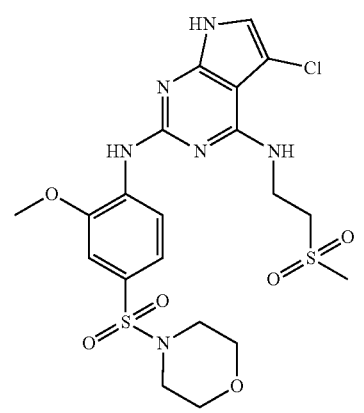

(68)

Compound 68 was prepared in an analogous manner to compound 1 in Example 1 (26.98 mg, 12.4% yield over 3 steps).

¹HNMR (400 MHz, DMSO-d₆): 11.61 (br s, 1H), 8.81 (d, J=8.5 Hz, 1H), 7.74 (s, 1H), 7.35 (dd, J=1.9, 8.5 Hz, 1H), 7.20 (d, J=1.9 Hz, 1H), 7.10 (s, 1H), 6.94 (t, J=5.8 Hz, 1H), 4.04-3.95 (m, 5H), 3.68-3.61 (m, 4H), 3.53 (t, J=6.8 Hz, 2H), 3.08 (s, 3H), 2.93-2.85 (m, 4H).

LCMS: m/z=545.0 (M+H)⁺.

Example 69: Synthesis of 5-chloro-N2-(2-methoxy-4-((4-morpholinopiperidin-1-yl)sulfonyl)phenyl)-N4-(2-(methylsulfonyl)ethyl)-7H-pyrrolo[2,3-d]pyrimidine-2,4-diamine (69)

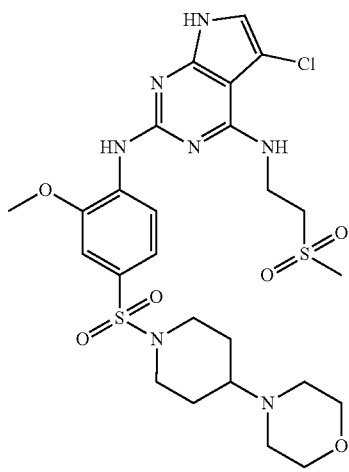
(69)

Compound 69 was prepared in an analogous manner to compound 1 in Example 1 (29.32 mg, 11.7% yield over 3 steps).

¹HNMR (400 MHz, DMSO-d₆): δ=11.60 (s, 1H), 8.78 (d, J=8.4 Hz, 1H), 7.71 (s, 1H), 7.34 (dd, J=2.0, 8.4 Hz, 1H), 7.20 (d, J=2.0 Hz, 1H), 7.10 (s, 1H), 6.93 (t, J=6.0 Hz, 1H), 4.05-3.93 (m, 4H), 3.65 (d, J=11.6 Hz, 2H), 3.57-3.45 (m, 6H), 3.08 (s, 3H), 2.43-2.36 (m, 4H), 2.27 (t, J=11.2 Hz, 2H), 2.16-2.08 (m, 1H), 1.80 (d, J=10.8 Hz, 2H), 1.42 (m, 2H).

LCMS: m/z=628.2 (M+H)⁺.

Example 70: Synthesis of (8-((5-chloro-4-((2-(methylsulfonyl)ethyl)amino)-7H-pyrrolo[2,3-d]pyrimidin-2-yl)amino)-2,3-dihydrobenzo[b][1,4]dioxin-5-yl)(morpholino)methanone (70)

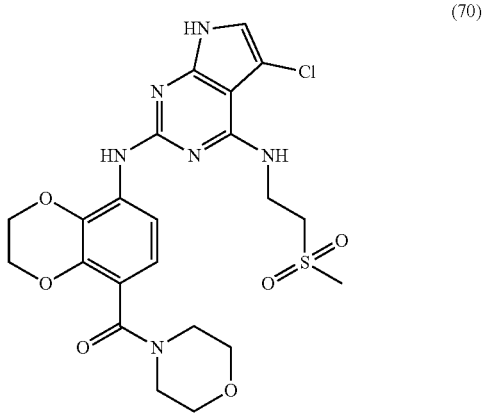 [SMILES: CS(=O)(=O)CCNc1nc(Nc2ccc(C(=O)N3CCOCC3)c3c2OCCO3)nc2[nH]cc(Cl)c12]
(70)

Compound 70 was prepared in an analogous manner to compound 1 in Example 1 (64.88 mg, 30.3% yield over 3 steps).

¹HNMR (400 MHz, DMSO-d₆): 11.52 (d, J=1.5 Hz, 1H), 8.10 (d, J=8.5 Hz, 1H), 7.37 (s, 1H), 7.03 (d, J=2.4 Hz, 1H), 6.83 (t, J=5.8 Hz, 1H), 6.76 (d, J=8.5 Hz, 1H), 4.38 (br d, J=2.8 Hz, 2H), 4.32 (br d, J=3.5 Hz, 2H), 3.94 (q, J=6.5 Hz, 2H), 3.60 (br s, 4H), 3.56-3.45 (m, 4H), 3.24 (br d, J=5.5 Hz, 2H), 3.06 (s, 3H).

LCMS: m/z=537.1 (M+H)⁺.

Example 71: Synthesis of N4-butyl-5-chloro-N2-(2-methoxy-4-(morpholinosulfonyl)phenyl)-7H-pyrrolo[2,3-d]pyrimidine-2,4-diamine (71)

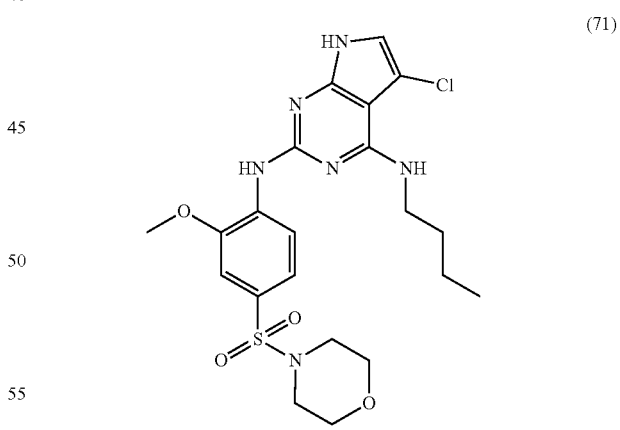
(71)

Compound 71 was prepared in an analogous manner to compound 1 in Example 1 (54.89 mg, 27.8% yield over 3 steps).

¹HNMR (400 MHz, DMSO-d₆): 11.53 (s, 1H), 8.84 (d, J=8.6 Hz, 1H), 7.63 (s, 1H), 7.31 (dd, J=1.9, 8.5 Hz, 1H), 7.20 (d, J=1.9 Hz, 1H), 7.06 (d, J=2.1 Hz, 1H), 6.60 (t, J=5.8 Hz, 1H), 4.01 (s, 3H), 3.67-3.61 (m, 4H), 3.57-3.48 (m, 2H), 2.92-2.85 (m, 4H), 1.64 (quin, J=7.3 Hz, 2H), 1.40 (qd, J=7.4, 14.9 Hz, 2H), 0.94 (t, J=7.3 Hz, 3H).

LCMS: m/z=495.1 (M+H)⁺.

Example 72: Synthesis of N4-butyl-5-chloro-N2-(2-methoxy-4-((4-morpholinopiperidin-1-yl)sulfonyl)phenyl)-7H-pyrrolo[2,3-d]pyrimidine-2,4-diamine (72)

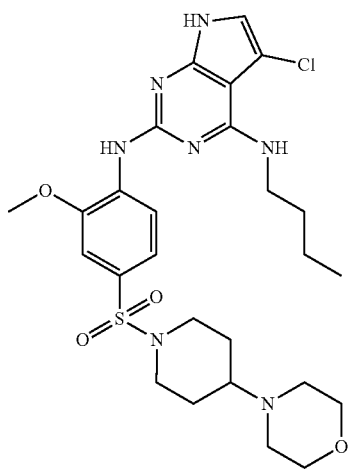

(72)

Compound 72 was prepared in an analogous manner to compound 1 in Example 1 (54.46 mg, 23.6% yield over 3 steps).

¹HNMR (400 MHz, DMSO-d₆) δ=11.51 (s, 1H), 8.80 (d, J=8.5 Hz, 1H), 7.59 (s, 1H), 7.29 (dd, J=1.9, 8.5 Hz, 1H), 7.19 (d, J=1.9 Hz, 1H), 7.05 (d, J=2.0 Hz, 1H), 6.58 (t, J=5.8 Hz, 1H), 3.98 (s, 3H), 3.64 (br d, J=11.8 Hz, 2H), 3.56-3.44 (m, 6H), 2.41-2.35 (m, 4H), 2.30-2.20 (m, 2H), 2.10 (br s, 1H), 1.79 (br d, J=11.0 Hz, 2H), 1.63 (br t, J=7.2 Hz, 2H), 1.39 (td, J=7.3, 14.9 Hz, 4H), 0.93 (t, J=7.3 Hz, 3H).

LCMS: mz=578.2 (M+H)⁺.

Example 73: Synthesis of N4-butyl-5-chloro-N2-(2-methoxy-4-(methylsulfonyl)phenyl)-7H-pyrrolo[2,3-d]pyrimidine-2,4-diamine (73)

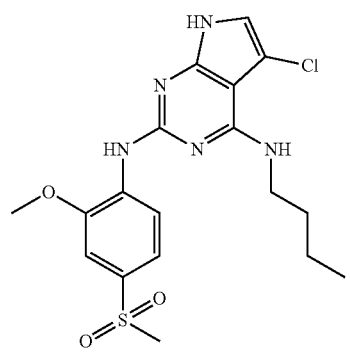

(73)

Compound 73 was prepared in an analogous manner to compound 1 in Example 1 (53.71 mg, 31.7% yield over 3 steps).

¹HNMR (400 MHz, DMSO-d₆): 11.53 (s, 1H), 8.81 (d, J=8.5 Hz, 1H), 7.61 (s, 1H), 7.51-7.36 (m, 2H), 7.05 (d, J=1.3 Hz, 1H), 6.58 (t, J=5.8 Hz, 1H), 4.01 (s, 3H), 3.53 (q, J=6.8 Hz, 2H), 3.18 (s, 3H), 1.71-1.55 (m, 2H), 1.48-1.29 (m, 2H), 0.94 (t, J=7.3 Hz, 3H).

LCMS: m/z=424.1 (M+H)⁺.

Example 74: Synthesis of (8-((4-(butylamino)-5-chloro-7H-pyrrolo[2,3-d]pyrimidin-2-yl)amino)-2,3-dihydrobenzo[b][1,4]dioxin-5-yl)(morpholino)methanone (74)

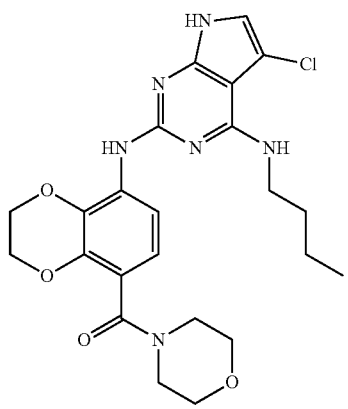

(74)

Compound 74 was prepared in an analogous manner to compound 1 in Example 1 (24.2 mg, 12.4% yield over 3 steps).

¹HNMR (400 MHz, DMSO-d₆): δ=11.44 (s, 1H), 8.16 (d, J=8.4 Hz, 1H), 7.23 (s, 1H), 6.99 (d, J=1.2 Hz, 1H), 6.74 (d, J=8.4 Hz, 1H), 6.49 (t, J=6.0 Hz, 1H), 4.46-4.25 (m, 4H), 3.68-3.47 (m, 8H), 3.29-3.13 (m, 2H), 1.62 (m, 2H), 1.47-1.26 (m, 2H), 0.94 (t, J=7.2 Hz, 3H).

LCMS: m/z=487.2 (M+H)⁺.

Example 75: Synthesis of (7-((5-chloro-4-(methyl-amino)-7H-pyrrolo[2,3-d]pyrimidin-2-yl)amino)benzo[d][1,3]dioxol-4-yl)(4-morpholinopiperidin-1-yl)methanone

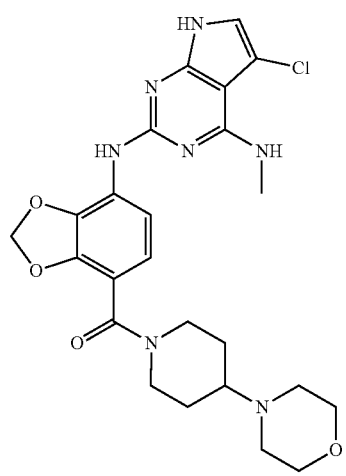

(75)

Compound 75 was prepared in an analogous manner to compound 1 in Example 1 (6.5 mg, 52.4% yield over 3 steps).

¹H NMR (400 MHz, DMSO-d₆): 11.35 (s, 1H), 7.90 (s, 1H), 7.62 (d, J=8.7 Hz, 1H), 6.93 (d, J=2.2 Hz, 1H), 6.81 (d, J=8.6 Hz, 1H), 6.52 (d, J=4.6 Hz, 1H), 6.05 (s, 2H), 4.44 (s, 2H), 3.56 (s, 5H), 3.39 (s, 4H), 2.96 (d, J=4.6 Hz, 3H), 2.45 (s, 5H).

LCMS: m/z=514.3 (M+H)⁺.

Example 76: Synthesis of (7-((5-chloro-4-(methylamino)-7H-pyrrolo[2,3-d]pyrimidin-2-yl)amino)-2,3-dihydrobenzofuran-4-yl)(morpholino)methanone (76)

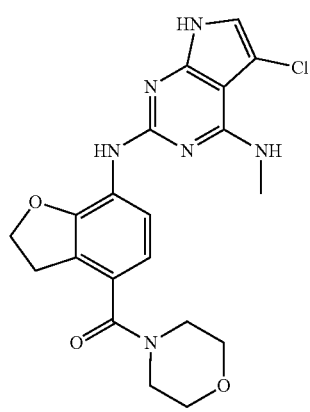

(76)

Compound 76 was prepared in an analogous manner to compound 1 in Example 1 (40.86 mg, 23.9% yield over 3 steps).

¹HNMR (400 MHz, DMSO-d₆): 11.42 (d, J=2.4 Hz, 1H), 8.21 (d, J=8.4 Hz, 1H), 7.21 (s, 1H), 6.97 (d, J=2.4 Hz, 1H), 6.79 (d, J=8.4 Hz, 1H), 6.58 (d, J=4.6 Hz, 1H), 4.64 (t, J=8.8 Hz, 2H), 3.68-3.43 (m, 8H), 3.21 (t, J=8.8 Hz, 2H), 2.98 (d, J=4.8 Hz, 3H).

LCMS: m/z=429.1 (M+H)⁺.

Example 77: Synthesis of 4-(4-((5-chloro-4-(methylamino)-7H-pyrrolo[2,3-d]pyrimidin-2-yl)amino)-3-methoxyphenyl)-1-(tetrahydro-2H-pyran-4-yl)-1,4-azaphosphinane 4-oxide (77)

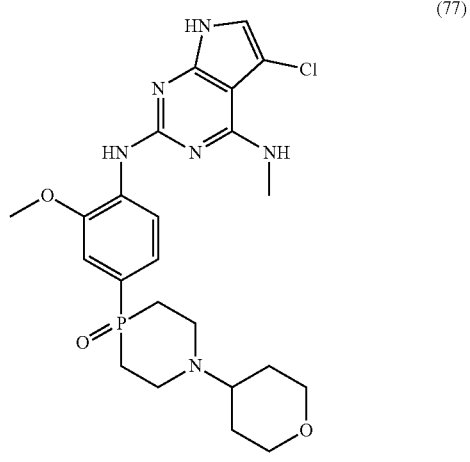 [SMILES: CNc1nc(Nc2ccc(P3(=O)CCN(C4CCOCC4)CC3)cc2OC)nc2[nH]cc(Cl)c12]

(77)

Compound 77 was prepared in an analogous manner to compound 1 in Example 1 (33.61 mg, 16.7% yield over 3 steps).

¹HNMR (400 MHz, DMSO-d₆): 11.52 (d, J=2.4 Hz, 1H), 8.76 (m, 1H), 7.53 (s, 1H), 7.41-7.20 (m, 2H), 7.02 (d, J=2.4 Hz, 1H), 6.67 (q, J=4.8 Hz, 1H), 3.89 (m, 2H), 3.28 (m, 2H), 3.01 (d, J=4.8 Hz, 3H), 2.98-2.85 (m, 3H), 2.97-2.83 (m, 1H), 2.68 (m, 1H), 2.20 (m, 2H), 1.84 (m, 2H), 1.65 (d, J=11.2 Hz, 2H), 1.56-1.38 (m, 2H).

LCMS: m/z=505.2, (M+H)⁺.

Example 78: Synthesis of 4-(4-((5-chloro-4-(cyclopentylamino)-7H-pyrrolo[2,3-d]pyrimidin-2-yl)amino)-3-methoxyphenyl)-1-cyclopropyl-1,4-azaphosphinane 4-oxide (78)

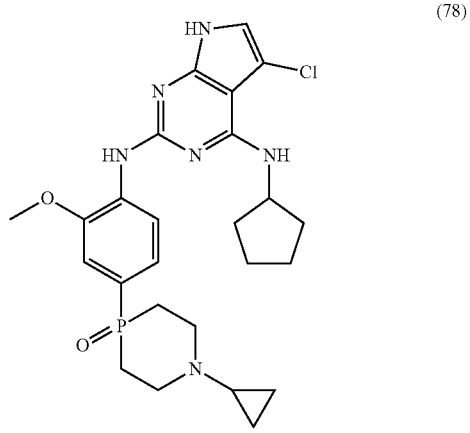 [SMILES: COc1cc(P2(=O)CCN(C3CC3)CC2)ccc1Nc1nc(NC2CCCC2)c2c(Cl)c[nH]c2n1]

(78)

Compound 78 was prepared in an analogous manner to compound 1 in Example 1 (19.39 mg, 9.4% yield over 3 steps).

¹HNMR (400 MHz, DMSO-d₆): 11.54 (br s, 1H), 9.04-8.57 (m, 1H), 7.60-7.51 (m, 1H), 7.42-7.27 (m, 2H), 7.05 (d, J=2.3 Hz, 1H), 6.01 (br d, J=7.0 Hz, 1H), 4.58-4.39 (m, 1H), 3.97 (s, 3H), 3.89-3.77 (m, 1H), 3.12-2.88 (m, 3H), 2.86-2.73 (m, 1H), 2.47-2.42 (m, 1H), 2.28-2.12 (m, 2H), 2.09-2.01 (m, 2H), 1.89-1.80 (m, 1H), 1.79-1.66 (m, 3H), 1.66-1.54 (m, 4H), 1.27-1.12 (m, 1H), 0.94-0.82 (m, 1H), 0.55-0.30 (m, 2H).

LCMS: m/z=515.2 (M+H)⁺.

Example 79: Synthesis of 4-(4-((5-chloro-4-(cyclopentylamino)-7H-pyrrolo[2,3-d]pyrimidin-2-yl)amino)-3-methoxyphenyl)-1-cyclopropyl-1,4-azaphosphinane 4-oxide (79)

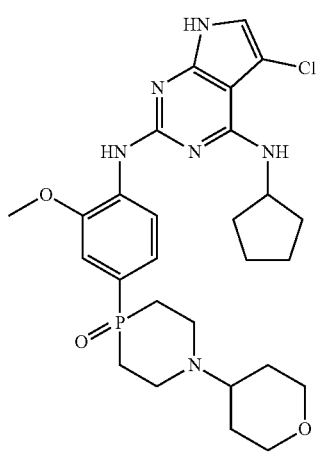

(79)

Compound 79 was prepared in an analogous manner to compound 1 in Example 1 (64.64 mg, 29.0% yield over 3 steps).

¹HNMR (400 MHz, DMSO-d₆): 11.53 (br s, 1H), 8.73 (br s, 1H), 7.52 (br s, 1H), 7.44-7.23 (m, 2H), 7.03 (d, J=2.5 Hz, 1H), 5.99 (d, J=7.3 Hz, 1H), 4.51-4.37 (m, 1H), 3.96 (s, 3H), 3.93-3.80 (m, 2H), 3.27 (br d, J=8.1 Hz, 2H), 3.02-2.82 (m, 3H), 2.55-2.49 (m, 4H), 2.27-2.09 (m, 2H), 2.07-1.98 (m, 2H), 1.92-1.40 (m, 11H).

LCMS: m/z=559.2 (M+H)⁺.

Example 80: Synthesis of (7-((5-chloro-4-(cyclohexylamino)-7H-pyrrolo[2,3-d]pyrimidin-2-yl)amino)-2,3-dihydrobenzofuran-4-yl)(4-morpholinopiperidin-1-yl)methanone (80)

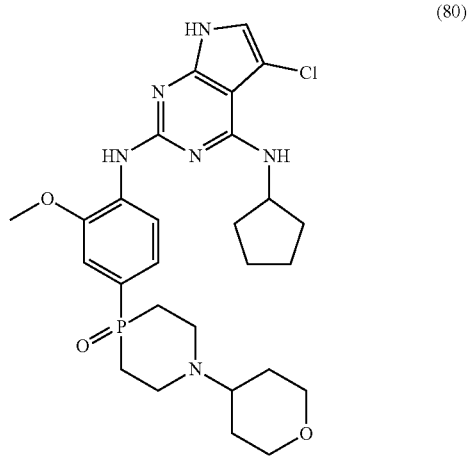 [SMILES: COc1cc(P2(=O)CCN(C3CCOCC3)CC2)ccc1Nc1nc(NC2CCCC2)c2c(Cl)c[nH]c2n1]

(80)

Compound 80 was prepared in an analogous manner to compound 1 in Example 1 (56.53 mg, 24.4% yield over 3 steps).

¹HNMR (400 MHz, DMSO-d₆): 11.41 (d, J=2.3 Hz, 1H), 8.25-7.90 (m, 1H), 7.32 (s, 1H), 6.98 (d, J=2.4 Hz, 1H), 6.75 (br d, J=8.1 Hz, 1H), 5.85 (d, J=8.0 Hz, 1H), 4.62 (br t, J=8.7 Hz, 2H), 4.11-3.94 (m, 2H), 3.83-3.66 (m, 1H), 3.64 (br dd, J=1.5, 5.8 Hz, 1H), 3.61-3.50 (m, 2H), 3.49-3.40 (m, 1H), 3.18 (br t, J=8.3 Hz, 2H), 2.54-2.51 (m, 6H), 2.43-2.36 (m, 1H), 2.20-1.91 (m, 3H), 1.86-1.68 (m, 3H), 1.61 (br d, J=12.0 Hz, 1H), 1.45-1.31 (m, 5H), 1.31-1.13 (m, 2H).

LCMS: m/z=580.3 (M+H)⁺.

Example 81: Synthesis of 4-(4-((5-chloro-4-(cyclohexylamino)-7H-pyrrolo[2,3-d]pyrimidin-2-yl)amino)-3-methoxyphenyl)-1-(tetrahydro-2H-pyran-4-yl)-1,4-azaphosphinane 4-oxide (81)

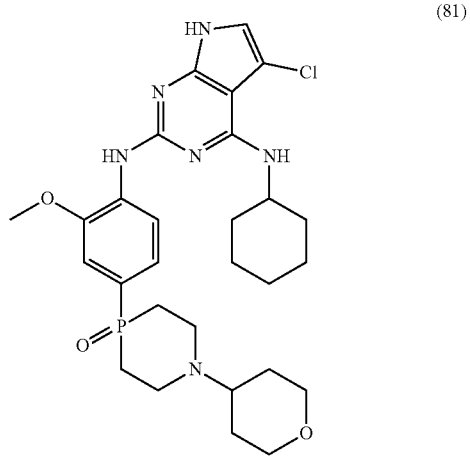 [SMILES: COc1cc(P2(=O)CCN(C3CCOCC3)CC2)ccc1Nc1nc(NC2CCCCC2)c2c(Cl)c[nH]c2n1]

(81)

Compound 81 was prepared in an analogous manner to compound 1 in Example 1 (42.17 mg, 18.4% yield over 3 steps).

$^{1}$HNMR (400 MHz, DMSO-d$_{6}$): 11.52 (br s, 1H), 8.80-8.59 (m, 1H), 7.55-7.21 (m, 3H), 7.06 (d, J=2.4 Hz, 1H), 5.95 (br d, J=7.8 Hz, 1H), 4.17-4.04 (m, 1H), 3.98 (s, 3H), 3.93-3.87 (m, 1H), 3.33-3.24 (m, 2H), 3.05-2.83 (m, 3H), 2.57-2.52 (m, 3H), 2.50-2.45 (m, 2H), 2.25-2.13 (m, 1H), 2.05-1.94 (m, 2H), 1.88-1.60 (m, 6H), 1.55-1.19 (m, 7H).

LCMS: m/z=573.2 (M+H)$^{+}$.

Example 82: Synthesis of 1-(4-(4-((5-chloro-4-(methylamino)-7H-pyrrolo[2,3-d]pyrimidin-2-yl)amino)-3-methoxyphenyl)-4-oxido-1,4-azaphosphinan-1-yl)ethan-1-one (82)

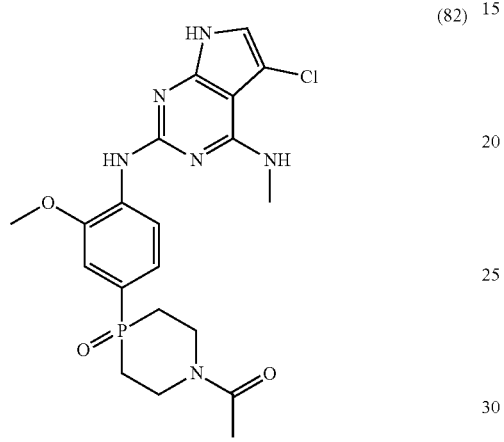

(82)

Compound 82 was prepared in an analogous manner to compound 1 in Example 1 (54.31 mg, 29.4% yield over 3 steps).

$^{1}$HNMR (400 MHz, DMSO-d$_{6}$): 11.48 (s, 1H), 8.78 (m, 1H), 7.54 (s, 1H), 7.39 (m, 1H), 7.36-7.27 (m, 1H), 7.02 (s, 1H), 6.66 (q, J=4.4 Hz, 1H), 4.33-4.13 (m, 1H), 3.98 (s, 3H), 3.95-3.79 (m, 1H), 3.72 (q, J=11.6 Hz, 1H), 3.51-3.36 (m, 1H), 3.01 (d, J=4.8 Hz, 3H), 2.41-2.29 (m, 1H), 2.22-2.13 (m, 1H), 2.11 (s, 3H), 2.00-1.70 (m, 2H).

LCMS: m/z=463.1 (M+H)$^{+}$.

Example 83: Synthesis of (7-((5-chloro-4-(cyclohexylamino)-7H-pyrrolo[2,3-d]pyrimidin-2-yl)amino)-2,3-dihydrobenzofuran-4-yl)(morpholino)methanone (83)

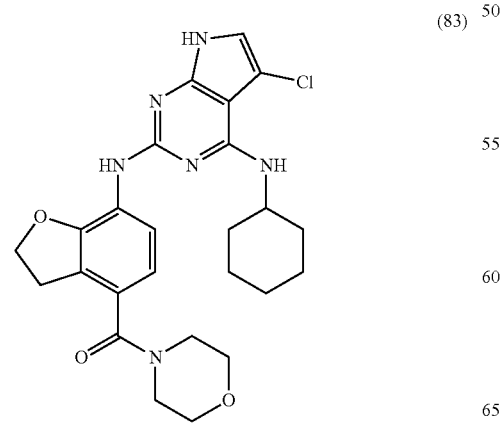

(83)

Compound 83 was prepared in an analogous manner to compound 1 in Example 1 (16.89 mg, 6.9% yield over 3 steps).

$^{1}$HNMR (400 MHz, DMSO-d$_{6}$): 11.45 (s, 1H), 8.17 (d, J=8.4 Hz, 1H), 7.33 (s, 1H), 7.02 (s, 1H), 6.81 (d, J=8.4 Hz, 1H), 5.88 (d, J=8.0 Hz, 1H), 4.67 (t, J=8.8 Hz, 2H), 4.08 (d, J=3.6 Hz, 1H), 3.72-3.41 (m, 9H), 3.25 (t, J=8.8 Hz, 2H), 2.02 (s, 2H), 1.77 (d, J=3.2 Hz, 2H), 1.71-1.60 (m, 1H), 1.42 (t, J=9.2 Hz, 4H), 1.28 (s, 1H).

LCMS: m/z=614.3 (M+H)$^{+}$.

Example 84: Synthesis of 4-(4-((5-chloro-4-(ethylamino)-7H-pyrrolo[2,3-d]pyrimidin-2-yl)amino)-3-methoxyphenyl)-1-cyclopropyl-1,4-azaphosphinane 4-oxide (84)

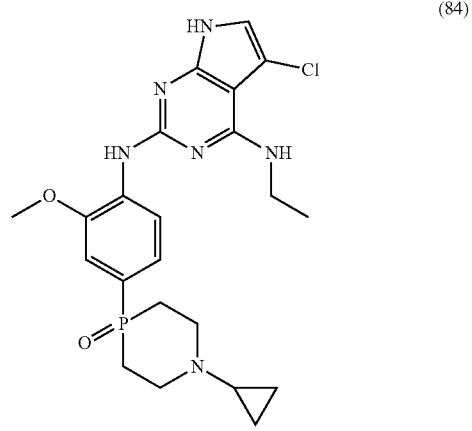 [SMILES: CCNc1nc(Nc2ccc(P3(=O)CCN(C4CC4)CC3)cc2OC)nc2[nH]cc(Cl)c12]

(84)

Compound 84 was prepared in an analogous manner to compound 1 in Example 1 (14.18 mg, 7.5% yield over 3 steps).

$^{1}$HNMR (400 MHz, DMSO-d$_{6}$) δ=11.48 (br s, 1H), 8.73 (dd, J=3.2, 8.2 Hz, 1H), 7.49 (s, 1H), 7.40-7.22 (m, 2H), 7.02 (d, J=2.1 Hz, 1H), 6.56 (t, J=5.8 Hz, 1H), 3.97 (s, 3H), 3.55 (quin, J=6.7 Hz, 2H), 3.06-2.88 (m, 4H), 2.26-2.13 (m, 2H), 1.92-1.72 (m, 3H), 1.24-1.20 (m, 3H), 0.53-0.42 (m, 2H), 0.40-0.30 (m, 2H).

LCMS: m/z=475.0 (M+H)$^{+}$.

Example 85: Synthesis of 4-(4-((5-chloro-4-(methylamino)-7H-pyrrolo[2,3-d]pyrimidin-2-yl)amino)-3-methoxyphenyl)-1-cyclopropyl-1,4-azaphosphinane 4-oxide (85)

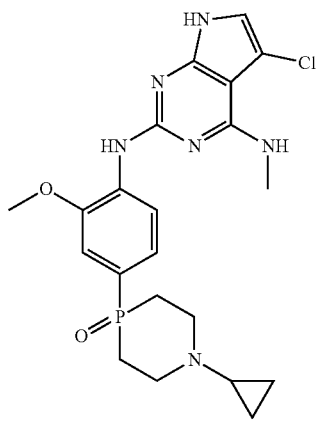

Compound 85 was prepared in an analogous manner to compound 1 in Example 1 (53.01 mg, 28.8% yield over 3 steps).

$^1$HNMR (400 MHz, DMSO-d$_6$) δ=11.66-11.23 (m, 1H), 8.75 (dd, J=3.2, 8.2 Hz, 1H), 7.51 (s, 1H), 7.39-7.24 (m, 2H), 7.01 (s, 1H), 6.64 (q, J=4.5 Hz, 1H), 3.97 (s, 3H), 3.00 (d, J=4.6 Hz, 3H), 2.97-2.92 (m, 3H), 2.43 (br s, 1H), 2.26-2.13 (m, 2H), 1.89-1.76 (m, 3H), 0.55-0.40 (m, 2H), 0.39-0.30 (m, 2H).

LCMS: m/z=461.2 (M+H)$^+$.

Example 86: Synthesis of (7-((5-chloro-4-(methylamino)-7H-pyrrolo[2,3-d]pyrimidin-2-yl)amino)-2,3-dihydrobenzofuran-4-yl)(4-morpholinopiperidin-1-yl)methanone (86)

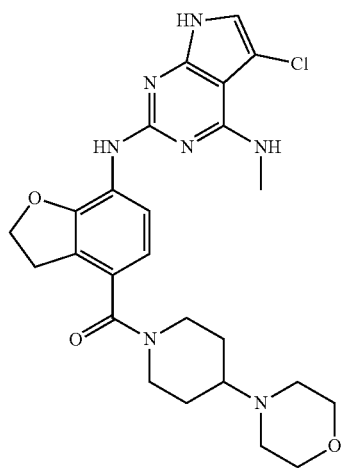

Compound 86 was prepared in an analogous manner to compound 1 in Example 1 (47.35 mg, 23.1% yield over 3 steps).

$^1$HNMR (400 MHz, DMSO-d$_6$): 11.41 (br s, 1H), 8.16 (d, J=8.4 Hz, 1H), 7.21 (s, 1H), 6.95 (s, 1H), 6.76 (d, J=8.3 Hz, 1H), 6.57 (q, J=4.4 Hz, 1H), 4.62 (t, J=8.8 Hz, 2H), 4.36 (br t, J=5.1 Hz, 1H), 3.59-3.52 (m, 4H), 3.34-3.30 (m, 2H), 3.23-3.12 (m, 2H), 2.99-2.94 (m, 3H), 2.91-2.76 (m, 1H), 2.45 (br s, 4H), 2.42-2.35 (m, 1H), 1.89-1.66 (m, 2H), 1.30 (q, J=10.0 Hz, 2H), 1.05 (t, J=7.0 Hz, 1H).

LCMS: m/z=512.3 (M+H)$^+$.

Example 87: Synthesis of 5-chloro-N4-isopropyl-N2-(2-methoxy-4-((4-morpholinopiperidin-1-yl)sulfonyl)phenyl)-7H-pyrrolo[2,3-d]pyrimidine-2,4-diamine (87)

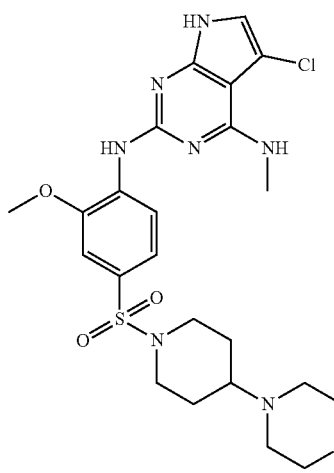

Compound 87 was prepared in an analogous manner to compound 1 in Example 1 (52.69 mg, 23.4% yield over 3 steps).

$^1$HNMR (400 MHz, DMSO-d$_6$): 11.57 (d, J=2.2 Hz, 1H), 8.81 (d, J=8.6 Hz, 1H), 7.63 (s, 1H), 7.33 (dd, J=1.6, 8.6 Hz, 1H), 7.20 (d, J=1.7 Hz, 1H), 7.08 (d, J=2.6 Hz, 1H), 5.98 (d, J=7.9 Hz, 1H), 4.41 (dd, J=6.5, 14.2 Hz, 1H), 3.99 (s, 3H), 3.76-3.44 (m, 6H), 2.46-2.34 (m, 3H), 2.26 (br t, J=11.2 Hz, 2H), 2.20-2.06 (m, 1H), 1.81 (br dd, J=2.0, 3.4 Hz, 2H), 1.55-1.36 (m, 2H), 1.29 (d, J=6.5 Hz, 6H).

LCMS: m/z=564.2 (M+H)$^+$.

Example 88: Synthesis of ((8-((5-chloro-4-(isopropylamino)-7H-pyrrolo[2,3-d]pyrimidin-2-yl)amino)-2,3-dihydrobenzo[b][1,4]dioxin-5-yl)(4-morpholinopiperidin-1-yl)methanone (88)

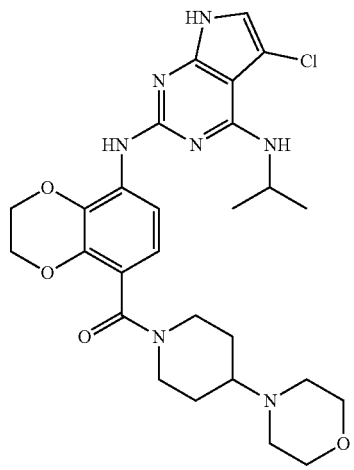

(88)

Compound 88 was prepared in an analogous manner to compound 1 in Example 1 (53.11 mg, 23.9% yield over 3 steps).

$^1$HNMR (400 MHz, DMSO-d$_6$): 11.49 (d, J=2.0 Hz, 1H), 8.11 (d, J=8.4 Hz, 1H), 7.26 (s, 1H), 7.01 (d, J=2.4 Hz, 1H), 6.72 (br dd, J=8.2, 19.7 Hz, 1H), 5.88 (d, J=7.8 Hz, 1H), 4.56-4.21 (m, 6H), 3.69-3.46 (m, 5H), 3.08-2.83 (m, 1H), 2.76-2.64 (m, 1H), 1.97-1.62 (m, 2H), 1.27 (d, J=6.6 Hz, 8H).

LCMS: m/z=556.2 (M+H)$^+$.

Example 89: Synthesis of 1-(4-(4-((5-chloro-4-(isopropylamino)-7H-pyrrolo[2,3-d]pyrimidin-2-yl)amino)-3-methoxyphenyl)-4-oxido-1,4-azaphosphinan-1-yl)ethan-1-one (89)

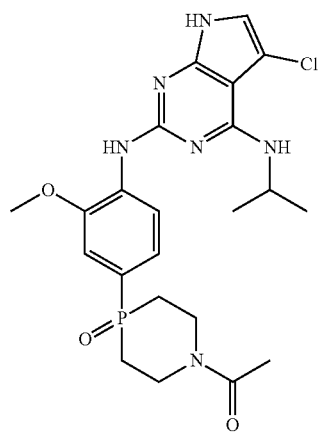

(89)

Compound 89 was prepared in an analogous manner to compound 1 in Example 1 (16.66 mg, 8.5% yield over 3 steps).

$^1$HNMR (400 MHz, DMSO-d$_6$): 11.52 (d, J=2.2 Hz, 1H), 8.72 (dd, J=3.2, 8.3 Hz, 1H), 7.53 (s, 1H), 7.44-7.19 (m, 2H), 7.05 (d, J=2.6 Hz, 1H), 5.94 (d, J=7.9 Hz, 1H), 4.40 (dd, J=6.5, 14.2 Hz, 1H), 4.31-4.10 (m, 1H), 3.97 (s, 3H), 3.93-3.79 (m, 1H), 3.77-3.63 (m, 1H), 3.47-3.37 (m, 1H), 2.40-2.32 (m, 1H), 2.20-2.13 (m, 1H), 2.10 (s, 3H), 1.97-1.69 (m, 2H), 1.28 (d, J=6.6 Hz, 6H).

LCMS: m/z=491.2 (M+H)$^+$.

Example 90: Synthesis of 4-(4-((5-chloro-4-(cyclopropylamino)-7H-pyrrolo[2,3-d]pyrimidin-2-yl)amino)-3-methoxyphenyl)-1-cyclopropyl-1,4-azaphosphinane 4-oxide (90)

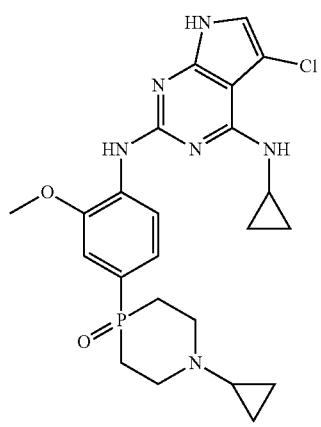

(90)

Compound 90 was prepared in an analogous manner to compound 1 in Example 1 (31.51 mg, 16.2% yield over 3 steps).

$^1$HNMR (400 MHz, DMSO-d$_6$): 11.52 (d, J=2.1 Hz, 1H), 9.33-8.56 (m, 1H), 7.55 (s, 1H), 7.40-7.33 (m, 1H), 7.29 (br d, J=11.6 Hz, 1H), 7.05 (d, J=2.4 Hz, 1H), 6.49 (br s, 1H), 3.97 (s, 3H), 3.11-2.78 (m, 5H), 2.27-2.07 (m, 2H), 2.00-1.69 (m, 3H), 0.89-0.78 (m, 2H), 0.72-0.60 (m, 2H), 0.48 (br s, 2H), 0.36 (br s, 2H).

LCMS: m/z=487.2 (M+H)$^+$.

Example 91: Synthesis of 1-(4-(4-((5-chloro-4-(cyclopropylamino)-7H-pyrrolo[2,3-d]pyrimidin-2-yl)amino)-3-methoxyphenyl)-4-oxido-1,4-azaphosphinan-1-yl)ethan-1-one (91)

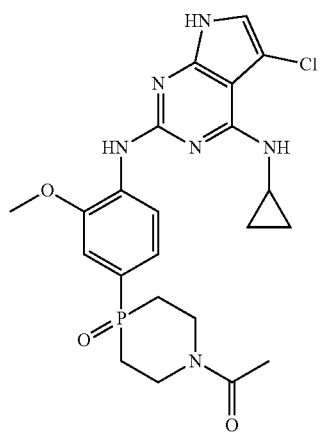

(91)

Compound 91 was prepared in an analogous manner to compound 1 in Example 1 (32.17 mg, 16.5% yield over 3 steps).

¹HNMR (400 MHz, DMSO-d$_6$): 11.51 (d, J=2.3 Hz, 1H), 8.93 (dd, J=3.2, 8.3 Hz, 1H), 7.56 (s, 1H), 7.40 (ddd, J=1.3, 9.1, 10.6 Hz, 1H), 7.34 (dd, J=1.3, 12.0 Hz, 1H), 7.05 (d, J=2.6 Hz, 1H), 6.50 (d, J=2.8 Hz, 1H), 4.32-4.14 (m, 1H), 3.98 (s, 3H), 3.94-3.80 (m, 1H), 3.78-3.62 (m, 1H), 3.40 (br d, J=11.9 Hz, 1H), 2.92 (dt, J=3.2, 6.9 Hz, 1H), 2.38-2.32 (m, 1H), 2.20-2.12 (m, 1H), 2.10 (s, 3H), 1.97-1.74 (m, 2H), 0.90-0.78 (m, 2H), 0.73-0.63 (m, 2H).

LCMS: m/z=489.1 (M+H)⁺.

Example 92: Synthesis of 1-(4-(4-((5-chloro-4-(cyclopropylamino)-7H-pyrrolo[2,3-d]pyrimidin-2-yl)amino)-3-methoxyphenyl)-4-oxido-1,4-azaphosphinan-1-yl)ethan-1-one (92)

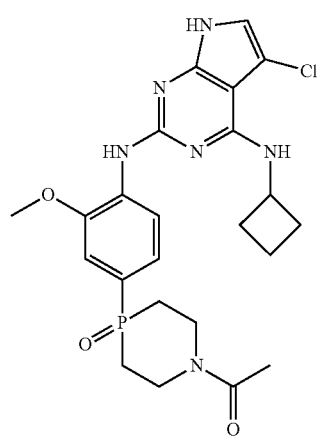

(92)

Compound 92 was prepared in an analogous manner to compound 1 in Example 1 (55.32 mg, 27.5% yield over 3 steps).

¹HNMR (400 MHz, DMSO-d$_6$): δ=11.54 (d, J=2.2 Hz, 1H), 8.74 (dd, J=3.2, 8.3 Hz, 1H), 7.54 (s, 1H), 7.44-7.32 (m, 2H), 7.06 (d, J=2.4 Hz, 1H), 6.40 (d, J=7.6 Hz, 1H), 4.75-4.62 (m, 1H), 4.33-4.16 (m, 1H), 3.98 (s, 3H), 3.94-3.80 (m, 1H), 3.77-3.64 (m, 1H), 3.48-3.38 (m, 1H), 2.39-2.30 (m, 3H), 2.22-2.06 (m, 6H), 1.98-1.68 (m, 4H).

LCMS: m/z=503.2 (M+H)⁺.

Example 93: Synthesis of 4-(4-((5-chloro-4-(cyclohexylamino)-7H-pyrrolo[2,3-d]pyrimidin-2-yl)amino)-3-methoxyphenyl)-1-cyclopropyl-1,4-azaphosphinane 4-oxide (93)

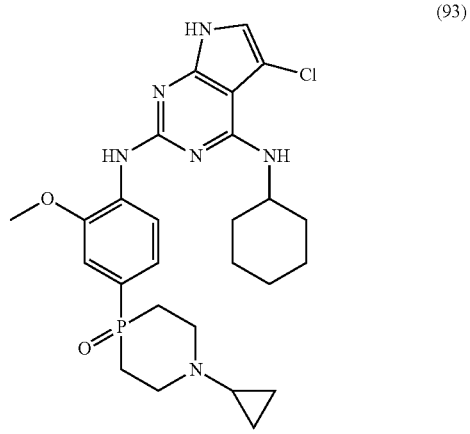 [SMILES: COc1cc(P2(=O)CCN(C3CC3)CC2)ccc1Nc1nc(NC2CCCCC2)c2c(Cl)c[nH]c2n1]

(93)

Compound 93 was prepared in an analogous manner to compound 1 in Example 1 (9.11 mg, 4.3% yield over 3 steps).

¹HNMR (400 MHz, DMSO-d$_6$): 11.49 (d, J=2.1 Hz, 1H), 8.69 (dd, J=3.1, 8.3 Hz, 1H), 7.51 (s, 1H), 7.36-7.25 (m, 2H), 7.04 (d, J=2.4 Hz, 1H), 5.93 (d, J=7.9 Hz, 1H), 4.14-4.03 (m, 1H), 3.96 (s, 3H), 3.09-2.87 (m, 4H), 2.25-2.12 (m, 2H), 2.05-1.96 (m, 2H), 1.88-1.60 (m, 6H), 1.51-1.34 (m, 4H), 1.24 (br d, J=6.8 Hz, 1H), 0.52-0.44 (m, 2H), 0.40-0.31 (m, 2H).

LCMS: m/z=529.2 (M+H)⁺.

Example 94: Synthesis of (S)-5-chloro-N2-(2-methoxy-4-(methylsulfonyl)phenyl)-N4-(tetrahydrofuran-3-yl)-7H-pyrrolo[2,3-d]pyrimidine-2,4-diamine (94)

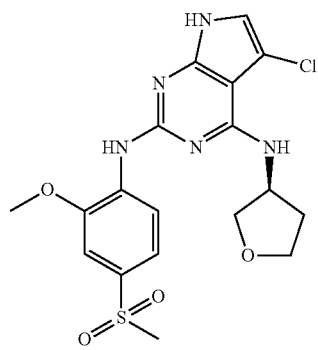

(94)

Compound 94 was prepared in an analogous manner to compound 1 in Example 1 (32.18 mg, 18.4% yield over 3 steps).

1HNMR (400 MHz, DMSO-d$_6$) δ=11.63 (br s, 1H), 8.80 (d, J=8.6 Hz, 1H), 7.69 (s, 1H), 7.52 (dd, J=2.0, 8.6 Hz, 1H), 7.45 (d, J=2.0 Hz, 1H), 7.11 (s, 1H), 6.22 (d, J=6.7 Hz, 1H), 4.79-4.67 (m, 1H), 4.02 (s, 3H), 3.97 (dd, J=5.9, 9.0 Hz, 1H), 3.95-3.86 (m, 1H), 3.78 (dt, J=6.0, 8.3 Hz, 1H), 3.69 (dd, J=4.2, 8.9 Hz, 1H), 3.19 (s, 3H), 2.39-2.27 (m, 1H), 2.06-1.91 (m, 1H).

LCMS: m/z=438.1 (M+H)⁺.

Example 95: Synthesis of (S)-5-chloro-N2-(2-methoxy-4-(methylsulfonyl)phenyl)-N4-(tetrahydrofuran-3-yl)-7H-pyrrolo[2,3-d]pyrimidine-2,4-diamine (95)

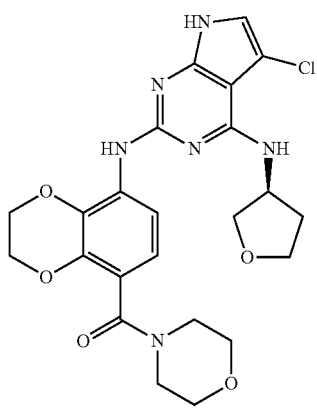

(95)

Compound 95 was prepared in an analogous manner to compound 1 in Example 1 (20.82 mg, 10.4% yield over 3 steps).

¹HNMR (400 MHz, DMSO-d₆): 11.51 (br s, 1H), 8.10 (d, J=8.6 Hz, 1H), 7.32 (s, 1H), 7.02 (d, J=1.5 Hz, 1H), 6.75 (d, J=8.4 Hz, 1H), 6.12 (d, J=6.6 Hz, 1H), 4.75-4.62 (m, 1H), 4.37 (br d, J=2.3 Hz, 2H), 4.31 (br s, 2H), 3.96-3.84 (m, 2H), 3.75 (dt, J=6.1, 8.2 Hz, 1H), 3.65 (dd, J=4.2, 8.9 Hz, 1H), 3.60 (br s, 4H), 3.52 (br s, 2H), 3.28-3.17 (m, 2H), 2.34-2.21 (m, 1H), 2.02-1.89 (m, 1H).

LCMS: m/z=501.2 [M+H]⁺.

Example 96: Synthesis of 4-(4-((5-chloro-4-(isobutylamino)-7H-pyrrolo[2,3-d]pyrimidin-2-yl)amino)-3-methoxyphenyl)-1-cyclopropyl-1,4-azaphosphinane 4-oxide (96)

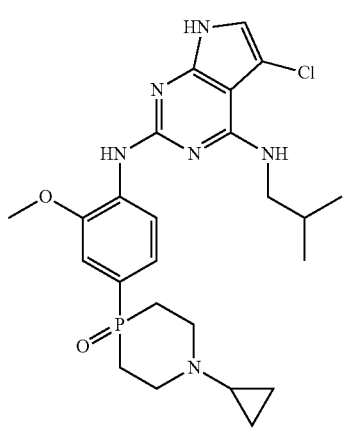

(96)

Compound 96 was prepared in an analogous manner to compound 1 in Example 1 (19.74 mg, 9.8% yield over 3 steps).

¹HNMR (400 MHz, DMSO-d₆): 11.51 (d, J=2.3 Hz, 1H), 8.72 (dd, J=3.1, 8.3 Hz, 1H), 7.50 (s, 1H), 7.37-7.26 (m, 2H), 7.05 (d, J=2.5 Hz, 1H), 6.52 (t, J=5.8 Hz, 1H), 3.97 (s, 3H), 3.39-3.35 (m, 2H), 3.07-2.89 (m, 4H), 2.20 (dt, J=5.1, 9.8 Hz, 2H), 2.06-1.97 (m, 1H), 1.90-1.76 (m, 3H), 0.96 (d, J=6.6 Hz, 6H), 0.53-0.44 (m, 2H), 0.40-0.29 (m, 2H).

LCMS: m/z=504.2 (M+H)⁺.

Example 97: Synthesis of 1-(4-(4-((5-chloro-4-(isobutylamino)-7H-pyrrolo[2,3-d]pyrimidin-2-yl)amino)-3-methoxyphenyl)-4-oxido-1,4-azaphosphinan-1-yl)ethan-1-one (97)

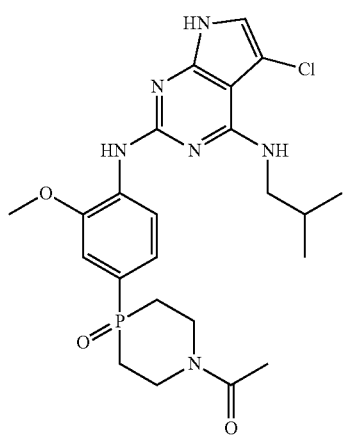

(97)

Compound 97 was prepared in an analogous manner to compound 1 in Example 1 (20.01 mg, 9.9% yield over 3 steps).

¹HNMR (400 MHz, DMSO-d₆): 11.50 (d, J=2.1 Hz, 1H), 8.73 (dd, J=3.2, 8.2 Hz, 1H), 7.52 (s, 1H), 7.41-7.27 (m, 2H), 7.05 (d, J=2.5 Hz, 1H), 6.53 (t, J=5.9 Hz, 1H), 4.32-4.16 (m, 1H), 3.98 (s, 3H), 3.93-3.81 (m, 1H), 3.71 (q, J=12.0 Hz, 1H), 3.44-3.35 (m, 3H), 2.49-2.43 (m, 1H), 2.41-2.30 (m, 1H), 2.22-2.14 (m, 1H), 2.07-1.74 (m, 3H), 0.99-0.90 (m, 8H).

LCMS: m/z=505.2 (M+H)⁺.

Example 98: Synthesis of 1-(4-(4-((5-chloro-4-(isobutylamino)-7H-pyrrolo[2,3-d]pyrimidin-2-yl)amino)-3-methoxyphenyl)-4-oxido-1,4-azaphosphinan-1-yl)ethan-1-one

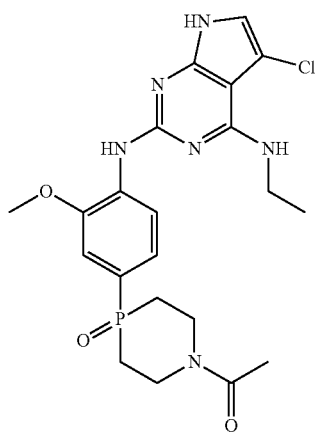

(98)

Compound 98 was prepared in an analogous manner to compound 1 in Example 1 (16.19 mg, 10.0% yield over 3 steps).

¹HNMR (400 MHz, DMSO-d₆): 11.50 (d, J=2.3 Hz, 1H), 8.75 (dd, J=3.3, 8.3 Hz, 1H), 7.52 (s, 1H), 7.43-7.29 (m, 2H), 7.04 (d, J=2.5 Hz, 1H), 6.60 (t, J=5.8 Hz, 1H), 4.33-4.16 (m, 1H), 3.98 (s, 3H), 3.93-3.82 (m, 1H), 3.77-3.65 (m, 1H), 3.60-3.50 (m, 2H), 3.47-3.38 (m, 1H), 2.40-2.29 (m, 1H), 2.20-2.14 (m, 1H), 2.11 (s, 3H), 1.97-1.78 (m, 2H), 1.23 (t, J=7.1 Hz, 3H).

LCMS: m/z=477.1 (M+H)⁺.

Example 99: Synthesis of 4-(4-((5-chloro-4-(propylamino)-7H-pyrrolo[2,3-d]pyrimidin-2-yl)amino)-3-methoxyphenyl)-1-cyclopropyl-1,4-azaphosphinane 4-oxide (99)

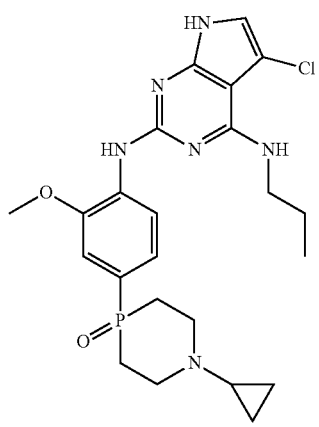

(99)

Compound 99 was prepared in an analogous manner to compound 1 in Example 1 (17.51 mg, 8.9% yield over 3 steps).

¹HNMR (400 MHz, DMSO-d₆): 11.50 (br s, 1H), 8.72 (dd, J=3.1, 8.3 Hz, 1H), 7.50 (s, 1H), 7.37-7.24 (m, 2H), 7.03 (d, J=2.0 Hz, 1H), 6.57 (t, J=5.8 Hz, 1H), 3.97 (s, 3H), 3.52-3.45 (m, 2H), 3.06-2.87 (m, 4H), 2.25-2.13 (m, 2H), 1.89-1.76 (m, 3H), 1.71-1.61 (m, 2H), 0.95 (t, J=7.4 Hz, 3H), 0.48 (dd, J=1.8, 6.3 Hz, 2H), 0.39-0.31 (m, 2H).

LCMS: m/z=489.1 (M+H)⁺.

Example 100: Synthesis of 1-(4-(4-((5-chloro-4-(propylamino)-7H-pyrrolo[2,3-d]pyrimidin-2-yl)amino)-3-methoxyphenyl)-4-oxido-1,4-azaphosphinan-1-yl)ethan-1-one (100)

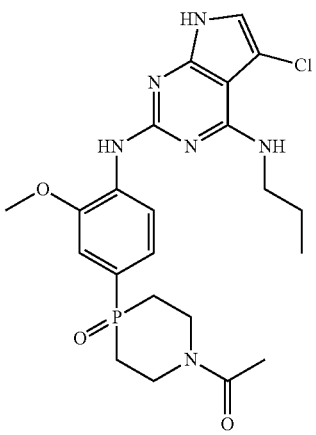

(100)

Compound 100 was prepared in an analogous manner to compound 1 in Example 1 (38.21 mg, 19.5% yield over 3 steps).

¹HNMR (400 MHz, DMSO-d₆): 11.49 (d, J=2.1 Hz, 1H), 8.74 (dd, J=3.3, 8.3 Hz, 1H), 7.52 (s, 1H), 7.41-7.26 (m, 2H), 7.04 (d, J=2.4 Hz, 1H), 6.59 (t, J=5.9 Hz, 1H), 4.31-4.16 (m, 1H), 3.98 (s, 3H), 3.93-3.81 (m, 1H), 3.71 (q, J=11.5 Hz, 1H), 3.54-3.38 (m, 3H), 2.40-2.31 (m, 1H), 2.20-2.08 (m, 4H), 1.98-1.76 (m, 2H), 1.71-1.61 (m, 2H), 0.95 (t, J=7.4 Hz, 3H).

LCMS: m/z=491.1[M+H]⁺.

Example 101: Synthesis of (7-((5-chloro-4-(ethylamino)-7H-pyrrolo[2,3-d]pyrimidin-2-yl)amino)-2,3-dihydrobenzofuran-4-yl)(morpholino)methanone (101)

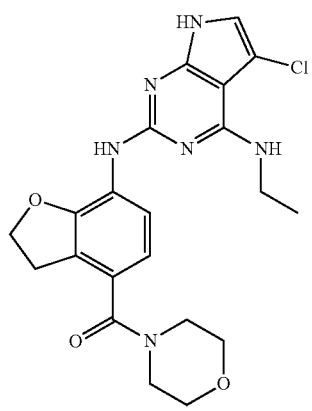

(101)

Compound 101 was prepared in an analogous manner to compound 1 in Example 1 (79.64 mg, 44.9% yield over 3 steps).

¹HNMR (400 MHz, DMSO-d₆): 11.43 (br d, J=1.0 Hz, 1H), 8.18 (d, J=8.3 Hz, 1H), 7.22 (s, 1H), 6.97 (s, 1H), 6.79 (d, J=8.3 Hz, 1H), 6.50 (t, J=5.8 Hz, 1H), 4.63 (t, J=8.8 Hz, 2H), 3.66-3.38 (m, 10H), 3.21 (t, J=8.7 Hz, 2H), 1.20 (t, J=7.1 Hz, 3H).

LCMS: m/z=443.1 (M+H)⁺.

Example 102: Synthesis of (7-((5-chloro-4-(propylamino)-7H-pyrrolo[2,3-d]pyrimidin-2-yl)amino)-2,3-dihydrobenzofuran-4-yl)(4-morpholinopiperidin-1-yl)methanone (102)

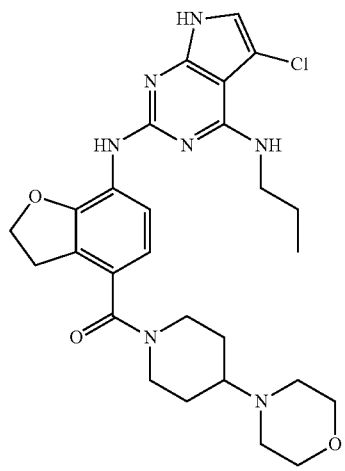

(102)

Compound 102 was prepared in an analogous manner to compound 1 in Example 1 (21.51 mg, 9.9% yield over 3 steps).

¹HNMR (400 MHz, DMSO-d₆): δ=11.40 (d, J=2.0 Hz, 1H), 8.12 (d, J=8.4 Hz, 1H), 7.24 (s, 1H), 6.97 (d, J=2.0 Hz, 1H), 6.75 (d, J=8.4 Hz, 1H), 6.50 (t, J=6.0 Hz, 1H), 4.62 (t, J=8.8 Hz, 2H), 4.49-4.17 (m, 1H), 3.64-3.52 (m, 4H), 3.48-3.41 (m, 2H), 3.18 (t, J=8.8 Hz, 2H), 3.08-2.73 (m, 2H), 2.47 (d, J=3.6 Hz, 5H), 1.90-1.73 (m, 2H), 1.69-1.52 (m, 2H), 1.41-1.17 (m, 2H), 0.92 (t, J=7.6 Hz, 3H).

LCMS: m/z=541.2 (M+H)⁺.

Example 103: Synthesis of (7-((5-chloro-4-(cyclobutylamino)-7H-pyrrolo[2,3-d]pyrimidin-2-yl)amino)-2,3-dihydrobenzofuran-4-yl)(4-morpholinopiperidin-1-yl)methanone (103)

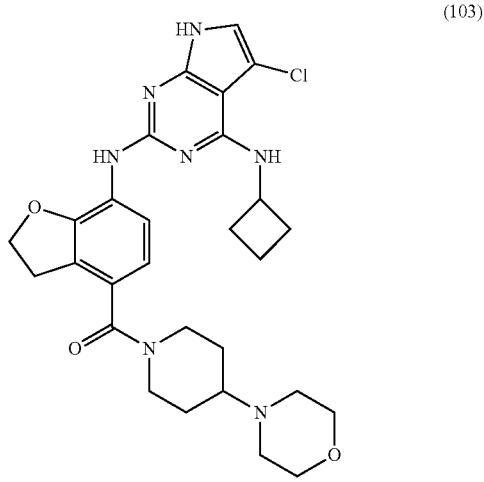 [SMILES: O=C(c1ccc(Nc2nc(NC3CCC3)c3c(Cl)c[nH]c3n2)c2c1CCO2)N1CCC(N2CCOCC2)CC1]

(103)

Compound 103 was prepared in an analogous manner to compound 1 in Example 1 (42.35 mg, 19.2% yield over 3 steps).

¹HNMR (400 MHz, DMSO-d₆): 11.43 (d, J=2.3 Hz, 1H), 8.09 (d, J=8.3 Hz, 1H), 7.29 (s, 1H), 6.98 (d, J=2.4 Hz, 1H), 6.76 (d, J=8.3 Hz, 1H), 6.29 (d, J=7.6 Hz, 1H), 4.80-4.43 (m, 4H), 3.56 (br s, 5H), 3.17 (t, J=8.7 Hz, 2H), 3.03-2.77 (m, 2H), 2.49-2.41 (m, 4H), 2.39-2.26 (m, 3H), 2.17-2.01 (m, 2H), 1.88-1.73 (m, 2H), 1.73-1.63 (m, 2H), 1.39-1.21 (m, 2H).

LCMS: m/z=552.2 (M+H)⁺.

Example 104: Synthesis of 4-(4-((5-chloro-4-(cyclobutylamino)-7H-pyrrolo[2,3-d]pyrimidin-2-yl)amino)-3-methoxyphenyl)-1-cyclopropyl-1,4-azaphosphinane 4-oxide (104)

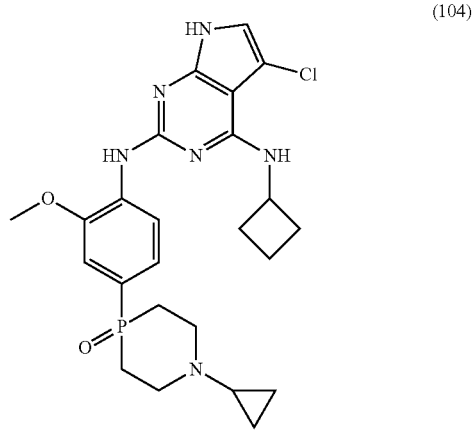 [SMILES: COc1cc(P2(=O)CCN(C3CC3)CC2)ccc1Nc1nc(NC2CCC2)c2c(Cl)c[nH]c2n1]

(104)

Compound 104 was prepared in an analogous manner to compound 1 in Example 1 (17.06 mg, 8.5% yield over 3 steps).

¹HNMR (400 MHz, DMSO-d₆) δ=11.54 (d, J=2.2 Hz, 1H), 8.72 (br dd, J=2.0, 7.8 Hz, 1H), 7.52 (s, 1H), 7.39-7.26 (m, 2H), 7.05 (d, J=2.6 Hz, 1H), 6.39 (d, J=7.7 Hz, 1H), 4.78-4.56 (m, 1H), 3.97 (s, 3H), 3.13-2.80 (m, 4H), 2.52 (br d, J=1.8 Hz, 2H), 2.41-2.29 (m, 2H), 2.28-2.04 (m, 4H), 1.93-1.78 (m, 2H), 1.77-1.63 (m, 2H), 0.61-0.21 (m, 3H).
LCMS: m/z=501.2 (M+H)⁺.

Example 105: Synthesis of (7-((5-chloro-4-(ethyl-amino)-7H-pyrrolo[2,3-d]pyrimidin-2-yl)amino)-2,3-dihydrobenzofuran-4-yl)(4-morpholinopiperidin-1-yl)methanone (86)

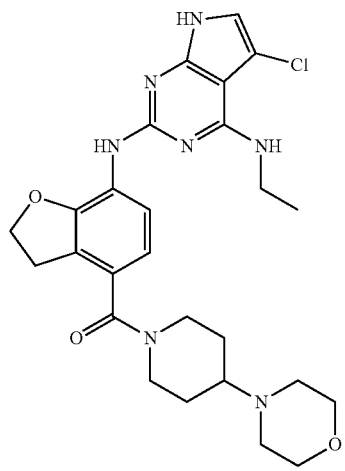

(105)

Compound 105 was prepared in an analogous manner to compound 1 in Example 1 (68.52 mg, 32.6% yield over 3 steps).

¹HNMR (400 MHz, DMSO-d₆): 12.63-11.97 (m, 1H), 8.69 (dd, J=3.1, 8.3 Hz, 1H), 7.90 (s, 1H), 7.63 (s, 1H), 7.48-7.25 (m, 2H), 5.85 (d, J=7.8 Hz, 1H), 4.61-4.50 (m, 2H), 4.47-4.31 (m, 3H), 4.04-3.91 (m, 3H), 3.59 (quin, J=6.5 Hz, 1H), 2.77-2.67 (m, 2H), 2.62-2.58 (m, 2H), 2.31-2.20 (m, 2H), 1.95-1.79 (m, 2H), 1.29 (d, J=6.5 Hz, 6H).
LCMS: m/z=526.2 (M+H)⁺.

Example 106: Inhibition of LRRK2 and LRRK2(G2019S) with Inventive Compounds

Assay kits from Promega™ Corporation were used according to instructions and adapted as outlined herein. Test compounds were generally prepared with 1:3 serial dilutions for 12 concentrations (from 50 μM to 0.01 nM) ATP competition experiments. The kinase reaction was performed with kinase reaction buffer (40 mM Tris base pH 7.4, 20 mM MgCl₂, 0.5 mM dithiothreitol), 0.1 mg/ml bovine serum albumin, distilled H₂O). The reaction mixtures contained Pure ATP solution (10 μM), specific substrate (0.2 μg), and (human LRRK2 kinase (25 ng)) or (human LRRK2 (G2019S) kinase (16 ng)), in a total assay volume of 5 μl after the manufacturer's protocol. In brief, the kinase reactions were started by addition of ATP to the kinase reaction mixture. The resulting mixture was incubated for 60 minutes at 25° C., and then stopped by adding 5 μl of ADP-Glo™ reagent. After incubation at room temperature in the dark for 40 minutes, 10 μl of kinase detection reagent was added per well, and the mixture was incubated for 10 minutes. Luminescence was measured using a Synergy™NEO2 plate reader (BioTek®) with an integration time of 1 second per well. Positive and negative controls were performed in 0.5% DMSO in the presence and absence of LRRK2 kinases. Curve fitting and data presentations were performed using GraphPad Prism version 5.0 (GraphPad Software, Inc.). The LRKK2 and LRRK2(G2019S) assay with inventive compounds 1-64 are summarized in the table below (Table 1), wherein:

A=0-10 nM; B=10-100 nM; C=100-1000 nM; and D=>1000 nM

TABLE 1

| Compound | LRRK2 | LRRK2(G2019S) |
|---|---|---|
| 1 | A | A |
| 2 | A | B |
| 3 | A | A |
| 4 | A | B |
| 5 | A | A |
| 6 | D | B |
| 7 | C | C |
| 8 | B | B |
| 9 | A | A |
| 10 | A | A |
| 11 | A | A |
| 12 | A | A |
| 13 | A | A |
| 14 | A | A |
| 15 | A | B |
| 16 | B | B |
| 17 | A | A |
| 18 | C | C |
| 19 | C | C |
| 20 | B | B |
| 21 | A | B |
| 22 | A | B |
| 23 | A | B |
| 24 | B | B |
| 25 | A | A |
| 26 | A | A |
| 27 | A | A |
| 28 | C | C |
| 29 | B | C |
| 30 | A | A |
| 31 | C | C |
| 32 | C | C |
| 45 | C | D |
| 46 | C | C |
| 47 | C | C |
| 48 | C | C |
| 49 | B | C |
| 50 | A | B |
| 51 | C | C |
| 52 | B | C |
| 53 | C | C |
| 54 | A | B |
| 55 | C | D |
| 56 | B | C |
| 57 | C | D |
| 58 | C | D |
| 59 | C | D |
| 60 | B | C |
| 61 | A | D |
| 62 | A | B |
| 63 | B | B |
| 64 | B | C |
| 65 | A | B |
| 66 | C | D |
| 67 | C | C |
| 68 | B | A |
| 69 | A | A |
| 70 | A | A |
| 71 | B | C |
| 72 | B | C |
| 73 | B | B |
| 74 | B | B |
| 75 | A | A |

TABLE 1-continued

| Compound | LRRK2 | LRRK2(G2019S) |
|---|---|---|
| 76 | A | A |
| 77 | A | A |
| 78 | B | B |
| 79 | B | B |
| 80 | C | B |
| 81 | B | B |
| 82 | A | A |
| 83 | C | B |
| 84 | B | B |
| 85 | B | A |
| 86 | A | A |
| 87 | C | B |
| 88 | B | A |
| 89 | B | A |
| 90 | B | A |
| 91 | A | A |
| 92 | B | A |
| 93 | C | B |
| 94 | A | A |
| 95 | A | A |
| 96 | C | B |
| 97 | B | A |
| 98 | A | A |
| 99 | B | A |
| 100 | B | A |
| 101 | A | A |
| 102 | B | A |
| 103 | B | A |
| 104 | B | A |
| 105 | A | A |

Example 107: LRRK2 Immunoblot

Cell lysates were extracted from the NIH-3T3 cell pellet using lysis buffer (40 mM Tris-HCl pH 8.0, 120 mM NaCl, 0.10% Nonidet™-P40) supplemented with protease inhibitors. Proteins in whole-cell lysates were separated by SDS-PAGE and transferred to an Amersham™ nitrocellulose membrane (Amersham, UK). Nitrocellulose membranes were blocked with 5% skim milk in phosphate-buffered saline containing Tween 20 and incubated with primary antibodies overnight at 4° C. The blots were then incubated with the appropriate horseradish peroxidase (HRP)-conjugated secondary antibodies and proteins were visualized by enhanced chemiluminescence, according to the manufacturer's protocol (Amersham™ Western blotting). Secondary antibodies, anti-rabbit IgG-HRP were purchased from Cell Signaling technology. Immunoblot film were scanned on a LAS500 scanner, and images were managed with Adobe Photoshop These results, illustrated FIG. 1, show that inventive compounds 2, 19, and 77 inhibited the phosphorylation of Ser935 in wild-type LRKK2 with potency similar to known LRRK2 inhibitor LRRK2-IN-1.

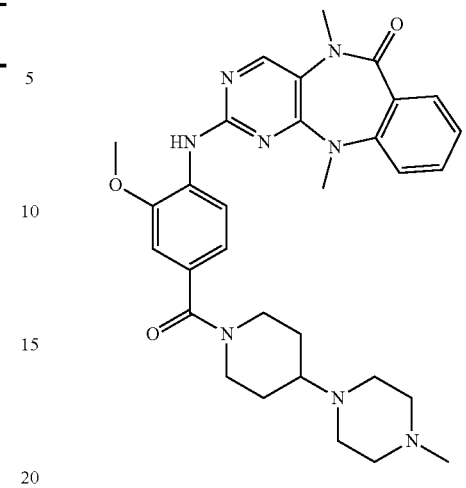

(LRRK2-IN-1)

Example 108: Kinase Profiling

The kinase selectivity of inventive compounds 12, 75, and 77 was evaluated by KINOMEscan®. KINOMEscan® (ScanMAX™) analysis was performed against a near comprehensive panel of 468 kinases. The results are shown in Table 2. The control percentage (% control) for inventive compounds at 1 μM in DMSO was determined by Equation 1:

% control=(inventive compound−positive control)/(negative control−positive control)×100%,  Equation 1 wherein the positive control is a compound with a % control value of 0% relative light units (RLU), and the negative control (i.e., DMSO) has % control value of 100% RLU. The enzyme selectivity in the present invention is defined as follows: inventive compounds are considered active for an enzyme when the observed % control is less than 35% (<35%).

TABLE 2

| Kinase | Compound 12 | Compound 75 | Compound 77 |
|---|---|---|---|
| AAK1 | 100 | 13 | 99 |
| ABL1(E255K)-phosphorylated | 92 | 100 | 100 |
| ABL1(F317I)-nonphosphorylated | 100 | 100 | 100 |
| ABL1(F317I)-phosphorylated | 54 | 83 | 51 |
| ABL1(F317L)-nonphosphorylated | 100 | 100 | 100 |
| ABL1(F317L)-phosphorylated | 70 | 47 | 54 |
| ABL1(H396P)-nonphosphorylated | 100 | 99 | 100 |
| ABL1(H396P)-phosphorylated | 73 | 82 | 75 |
| ABL1(M351T)-phosphorylated | 64 | 59 | 70 |
| ABL1(Q252H)-nonphosphorylated | 100 | 100 | 100 |
| ABL1(Q252H)-phosphorylated | 79 | 57 | 62 |
| ABL1(T315I)-nonphosphorylated | 94 | 100 | 99 |
| ABL1(T315I)-phosphorylated | 100 | 60 | 77 |
| ABL1(Y253F)-phosphorylated | 51 | 53 | 53 |
| ABL1-nonphosphorylated | 80 | 94 | 92 |
| ABL1-phosphorylated | 72 | 80 | 80 |
| ABL2 | 78 | 100 | 100 |
| ACVR1 | 100 | 100 | 100 |
| ACVR1B | 100 | 100 | 100 |
| ACVR2A | 100 | 100 | 100 |
| ACVR2B | 79 | 95 | 73 |
| ACVRL1 | 100 | 100 | 100 |
| ADCK3 | 100 | 100 | 100 |
| ADCK4 | 100 | 100 | 81 |
| AKT1 | 100 | 100 | 100 |
| AKT2 | 100 | 100 | 100 |

TABLE 2-continued

| Kinase | Compound 12 | Compound 75 | Compound 77 |
|---|---|---|---|
| AKT3 | 100 | 100 | 100 |
| ALK | 3.4 | 1.9 | 2 |
| ALK(C1156Y) | 2.7 | 1.2 | 1.3 |
| ALK(L1196M) | 11 | 27 | 7.1 |
| AMPK-alpha1 | 100 | 89 | 93 |
| AMPK-alpha2 | 82 | 87 | 90 |
| ANKK1 | 73 | 41 | 65 |
| ARKS | 100 | 23 | 96 |
| ASK2 | 53 | 39 | 51 |
| AURKA | 93 | 45 | 85 |
| AURKB | 73 | 57 | 74 |
| AURKC | 100 | 56 | 100 |
| AXL | 100 | 63 | 93 |
| BIKE | 96 | 40 | 91 |
| BLK | 100 | 100 | 100 |
| BMPR1A | 96 | 85 | 96 |
| BMPR1B | 76 | 67 | 80 |
| BMPR2 | 97 | 92 | 85 |
| BMX | 97 | 97 | 99 |
| BRAF | 93 | 100 | 97 |
| BRAF(V600E) | 91 | 100 | 88 |
| BRK | 100 | 99 | 94 |
| BRSK1 | 100 | 100 | 96 |
| BRSK2 | 87 | 83 | 96 |
| BTK | 79 | 98 | 100 |
| BUB1 | 60 | 49 | 61 |
| CAMK1 | 100 | 75 | 67 |
| CAMK1B | 95 | 44 | 54 |
| CAMK1D | 96 | 47 | 39 |
| CAMK1G | 96 | 73 | 65 |
| CAMK2A | 100 | 70 | 88 |
| CAMK2B | 100 | 94 | 92 |
| CAMK2D | 96 | 89 | 89 |
| CAMK2G | 100 | 100 | 97 |
| CAMK4 | 100 | 100 | 100 |
| CAMKK1 | 100 | 95 | 83 |
| CAMKK2 | 68 | 42 | 25 |
| CASK | 90 | 99 | 95 |
| CDC2L1 | 100 | 100 | 100 |
| CDC2L2 | 100 | 100 | 100 |
| CDC2L5 | 54 | 57 | 55 |
| CDK11 | 100 | 98 | 100 |
| CDK2 | 100 | 100 | 100 |
| CDK3 | 86 | 98 | 95 |
| CDK4 | 68 | 80 | 71 |
| CDK4-cyclinD1 | 74 | 81 | 87 |
| CDK4-cyclinD3 | 100 | 100 | 100 |
| CDK5 | 100 | 100 | 100 |
| CDK7 | 98 | 21 | 86 |
| CDK8 | 100 | 100 | 91 |
| CDK9 | 100 | 100 | 100 |
| CDKL1 | 85 | 95 | 87 |
| CDKL2 | 100 | 100 | 100 |
| CDKL3 | 100 | 100 | 100 |
| CDKL5 | 83 | 83 | 91 |
| CHEK1 | 100 | 67 | 100 |
| CHEK2 | 1.8 | 0.95 | 0.7 |
| CIT | 85 | 35 | 93 |
| CLK1 | 6.1 | 3.4 | 7.1 |
| CLK2 | 55 | 21 | 28 |
| CLK3 | 77 | 58 | 93 |
| CLK4 | 0.75 | 0.7 | 1.2 |
| CSF1R | 100 | 98 | 100 |
| CSF1R-autoinhibited | 100 | 99 | 100 |
| CSK | 100 | 100 | 100 |
| CSNK1A1 | 48 | 32 | 27 |
| CSNK1A1L | 56 | 70 | 36 |
| CSNK1D | 9.5 | 15 | 8.9 |
| CSNK1E | 18 | 30 | 15 |
| CSNK1G1 | 100 | 28 | 100 |
| CSNK1G2 | 63 | 2.9 | 96 |
| CSNK1G3 | 96 | 18 | 89 |
| CSNK2A1 | 63 | 24 | 59 |
| CSNK2A2 | 97 | 49 | 80 |
| CTK | 100 | 100 | 99 |
| DAPK1 | 43 | 14 | 8.3 |
| DAPK2 | 29 | 28 | 10 |
| DAPK3 | 35 | 16 | 9.9 |
| DCAMKL1 | 94 | 74 | 74 |
| DCAMKL2 | 96 | 99 | 100 |
| DCAMKL3 | 100 | 100 | 100 |
| DDR1 | 100 | 100 | 100 |
| DDR2 | 84 | 93 | 84 |
| DLK | 95 | 100 | 100 |
| DMPK | 97 | 100 | 100 |
| DMPK2 | 100 | 100 | 94 |
| DRAK1 | 100 | 2.8 | 95 |
| DRAK2 | 74 | 3.9 | 39 |
| DYRK1A | 14 | 8.9 | 4.7 |
| DYRK1B | 6.1 | 0 | 13 |
| DYRK2 | 13 | 14 | 47 |
| EGFR | 89 | 80 | 84 |
| EGFR(E746-A750del) | 75 | 94 | 87 |
| EGFR(G719C) | 97 | 100 | 99 |
| EGFR(G719S) | 99 | 100 | 100 |
| EGFR(L747-E749del, A750P) | 100 | 100 | 92 |
| EGFR(L747-S752del, P753S) | 95 | 87 | 99 |
| EGFR(L747-T751del,Sins) | 100 | 100 | 100 |
| EGFR(L858R) | 100 | 100 | 76 |
| EGFR(L858R,T790M) | 66 | 45 | 42 |
| EGFR(L861Q) | 100 | 100 | 100 |
| EGFR(S752-I759del) | 100 | 94 | 100 |
| EGFR(T790M) | 75 | 63 | 55 |
| EIF2AK1 | 100 | 62 | 81 |
| EPHA1 | 100 | 100 | 100 |
| EPHA2 | 100 | 96 | 100 |
| EPHA3 | 100 | 100 | 100 |
| EPHA4 | 86 | 92 | 79 |
| EPHA5 | 100 | 100 | 100 |
| EPHA6 | 100 | 100 | 100 |
| EPHA7 | 100 | 100 | 100 |
| EPHA8 | 100 | 100 | 100 |
| EPHB1 | 88 | 100 | 100 |
| EPHB2 | 100 | 100 | 100 |
| EPHB3 | 100 | 100 | 100 |
| EPHB4 | 100 | 100 | 100 |
| EPHB6 | 51 | 51 | 49 |
| ERBB2 | 80 | 85 | 99 |
| ERBB3 | 38 | 38 | 35 |
| ERBB4 | 99 | 90 | 88 |
| ERK1 | 100 | 100 | 100 |
| ERK2 | 100 | 100 | 100 |
| ERK3 | 100 | 91 | 99 |
| ERK4 | 100 | 100 | 100 |
| ERK5 | 53 | 51 | 78 |
| ERK8 | 100 | 100 | 100 |
| ERN1 | 67 | 73 | 60 |
| FAK | 19 | 39 | 33 |
| FER | 44 | 56 | 20 |
| FES | 100 | 81 | 80 |
| FGFR1 | 89 | 94 | 100 |
| FGFR2 | 100 | 97 | 100 |
| FGFR3 | 100 | 98 | 100 |
| FGFR3(G697C) | 100 | 100 | 100 |
| FGFR4 | 90 | 100 | 98 |
| FGR | 100 | 100 | 100 |
| FLT1 | 100 | 73 | 100 |
| FLT3 | 100 | 40 | 86 |
| FLT3(D835H) | 100 | 37 | 84 |
| FLT3(D835V) | 72 | 1.8 | 9.7 |
| FLT3(D835Y) | 96 | 14 | 47 |
| FLT3(ITD) | 100 | 33 | 81 |
| FLT3(ITD,D835V) | 61 | 2 | 19 |
| FLT3(ITD,F691L) | 66 | 2.8 | 40 |
| FLT3(K663Q) | 100 | 72 | 99 |
| FLT3(N841I) | 85 | 65 | 99 |
| FLT3(R834Q) | 92 | 73 | 82 |
| FLT3-autoinhibited | 87 | 83 | 94 |
| FLT4 | 100 | 100 | 100 |
| FRK | 100 | 100 | 100 |
| FYN | 100 | 100 | 95 |
| GAK | 3.8 | 0.55 | 0.9 |
| GCN2(Kin.Dom.2,S808G) | 88 | 31 | 78 |
| GRK1 | 79 | 88 | 88 |

TABLE 2-continued

| Kinase | Compound 12 | Compound 75 | Compound 77 |
|---|---|---|---|
| GRK2 | 100 | 100 | 98 |
| GRK3 | 100 | 78 | 82 |
| GRK4 | 100 | 41 | 95 |
| GRK7 | 100 | 100 | 99 |
| GSK3A | 91 | 87 | 90 |
| GSK3B | 96 | 97 | 100 |
| HASPIN | 29 | 25 | 35 |
| HCK | 98 | 100 | 100 |
| HIPK1 | 48 | 23 | 32 |
| HIPK2 | 100 | 66 | 95 |
| HIPK3 | 72 | 59 | 64 |
| HIPK4 | 100 | 97 | 99 |
| HPK1 | 78 | 47 | 97 |
| HUNK | 12 | 18 | 14 |
| ICK | 77 | 89 | 85 |
| IGF1R | 100 | 89 | 100 |
| IKK-alpha | 76 | 65 | 81 |
| IKK-beta | 100 | 96 | 95 |
| IKK-epsilon | 98 | 47 | 89 |
| INSR | 50 | 24 | 18 |
| INSRR | 85 | 88 | 62 |
| IRAK1 | 92 | 51 | 88 |
| IRAK3 | 100 | 93 | 94 |
| IRAK4 | 95 | 82 | 98 |
| ITK | 92 | 100 | 97 |
| JAK1(JH1domain-catalytic) | 100 | 100 | 100 |
| JAK1(JH2domain-pseudokinase) | 73 | 64 | 34 |
| JAK2(JH1domain-catalytic) | 78 | 24 | 58 |
| JAK3(JH1domain-catalytic) | 77 | 25 | 86 |
| JNK1 | 11 | 0.1 | 0.65 |
| JNK2 | 26 | 0 | 7.5 |
| JNK3 | 16 | 0.25 | 0.9 |
| KIT | 100 | 65 | 99 |
| KIT(A829P) | 76 | 50 | 78 |
| KIT(D816H) | 100 | 99 | 93 |
| KIT(D816V) | 100 | 98 | 100 |
| KIT(L576P) | 97 | 36 | 100 |
| KIT(V559D) | 80 | 39 | 90 |
| KIT(V559D,T670I) | 89 | 62 | 100 |
| KIT(V559D,V654A) | 100 | 94 | 96 |
| KIT-autoinhibited | 95 | 68 | 93 |
| LATS1 | 100 | 100 | 100 |
| LATS2 | 100 | 90 | 93 |
| LCK | 91 | 100 | 100 |
| LIMK1 | 100 | 100 | 100 |
| LIMK2 | 100 | 99 | 84 |
| LKB1 | 100 | 100 | 100 |
| LOK | 94 | 96 | 90 |
| LRRK2 | 0.8 | 1.4 | 0.4 |
| LRRK2(G2019S) | 1.5 | 0.3 | 2.1 |
| LTK | 22 | 19 | 21 |
| LYN | 100 | 100 | 100 |
| LZK | 63 | 57 | 62 |
| MAK | 100 | 100 | 100 |
| MAP3K1 | 79 | 82 | 73 |
| MAP3K15 | 75 | 39 | 46 |
| MAP3K2 | 80 | 15 | 86 |
| MAP3K3 | 100 | 43 | 100 |
| MAP3K4 | 100 | 100 | 100 |
| MAP4K2 | 61 | 6.2 | 39 |
| MAP4K3 | 98 | 81 | 100 |
| MAP4K4 | 95 | 54 | 100 |
| MAP4K5 | 100 | 91 | 100 |
| MAPKAPK2 | 72 | 31 | 100 |
| MAPKAPK5 | 67 | 43 | 46 |
| MARK1 | 100 | 100 | 96 |
| MARK2 | 100 | 100 | 100 |
| MARK3 | 100 | 100 | 100 |
| MARK4 | 98 | 96 | 97 |
| MAST1 | 100 | 93 | 97 |
| MEK1 | 99 | 98 | 96 |
| MEK2 | 78 | 76 | 78 |
| MEK3 | 26 | 2.4 | 9.4 |
| MEK4 | 26 | 0.05 | 4.7 |
| MEK5 | 86 | 47 | 61 |
| MEK6 | 96 | 10 | 56 |
| MELK | 100 | 30 | 85 |
| MERTK | 96 | 85 | 98 |
| MET | 100 | 100 | 100 |
| MET(M1250T) | 100 | 100 | 100 |
| MET(Y1235D) | 100 | 100 | 100 |
| MINK | 75 | 18 | 63 |
| MKK7 | 100 | 96 | 100 |
| MKNK1 | 100 | 100 | 100 |
| MKNK2 | 57 | 10 | 31 |
| MLCK | 100 | 35 | 98 |
| MLK1 | 100 | 91 | 98 |
| MLK2 | 99 | 93 | 99 |
| MLK3 | 93 | 51 | 80 |
| MRCKA | 100 | 100 | 92 |
| MRCKB | 100 | 100 | 100 |
| MST1 | 81 | 100 | 100 |
| MST1R | 100 | 100 | 100 |
| MST2 | 100 | 45 | 100 |
| MST3 | 97 | 98 | 88 |
| MST4 | 80 | 51 | 76 |
| MTOR | 67 | 79 | 84 |
| MUSK | 98 | 21 | 72 |
| MYLK | 8.8 | 18 | 0.05 |
| MYLK2 | 100 | 86 | 100 |
| MYLK4 | 100 | 100 | 64 |
| MYO3A | 100 | 98 | 62 |
| MYO3B | 95 | 100 | 100 |
| NDR1 | 83 | 90 | 83 |
| NDR2 | 100 | 100 | 100 |
| NEK1 | 100 | 88 | 98 |
| NEK10 | 63 | 66 | 39 |
| NEK11 | 96 | 100 | 100 |
| NEK2 | 100 | 100 | 100 |
| NEK3 | 51 | 54 | 52 |
| NEK4 | 100 | 100 | 100 |
| NEK5 | 100 | 97 | 98 |
| NEK6 | 100 | 100 | 100 |
| NEK7 | 100 | 99 | 100 |
| NEK9 | 100 | 100 | 100 |
| NIK | 9.2 | 0 | 16 |
| NIM1 | 82 | 73 | 88 |
| NLK | 100 | 100 | 100 |
| OSR1 | 31 | 24 | 10 |
| p38-alpha | 100 | 100 | 100 |
| p38-beta | 100 | 100 | 100 |
| p38-delta | 100 | 100 | 100 |
| p38-gamma | 100 | 91 | 98 |
| PAK1 | 100 | 100 | 100 |
| PAK2 | 100 | 100 | 100 |
| PAK3 | 100 | 97 | 91 |
| PAK4 | 100 | 100 | 100 |
| PAK6 | 100 | 100 | 95 |
| PAK7 | 100 | 97 | 100 |
| PCTK1 | 64 | 60 | 84 |
| PCTK2 | 100 | 100 | 100 |
| PCTK3 | 100 | 100 | 100 |
| PDGFRA | 77 | 67 | 69 |
| PDGFRB | 89 | 56 | 100 |
| PDPK1 | 95 | 98 | 100 |
| PFCDPK1(P.falciparum) | 97 | 99 | 90 |
| PFPK5(P.falciparum) | 64 | 65 | 75 |
| PFTAIRE2 | 100 | 100 | 100 |
| PFTK1 | 75 | 91 | 100 |
| PHKG1 | 25 | 14 | 8.4 |
| PHKG2 | 11 | 5.3 | 1.9 |
| PIK3C2B | 100 | 100 | 96 |
| PIK3C2G | 100 | 100 | 93 |
| PIK3CA | 97 | 93 | 100 |
| PIK3CA(C420R) | 100 | 100 | 100 |
| PIK3CA(E542K) | 65 | 78 | 67 |
| PIK3CA(E545A) | 100 | 100 | 100 |
| PIK3CA(E545K) | 89 | 100 | 94 |
| PIK3CA(H1047L) | 56 | 86 | 61 |
| PIK3CA(H1047Y) | 64 | 68 | 73 |
| PIK3CA(I800L) | 74 | 87 | 69 |
| PIK3CA(M1043I) | 98 | 99 | 96 |
| PIK3CA(Q546K) | 50 | 65 | 46 |
| PIK3CB | 80 | 89 | 71 |

TABLE 2-continued

| Kinase | Compound 12 | Compound 75 | Compound 77 |
| --- | --- | --- | --- |
| PIK3CD | 96 | 96 | 92 |
| PIK3CG | 95 | 100 | 100 |
| PIK4CB | 100 | 100 | 100 |
| PIKFYVE | 64 | 72 | 70 |
| PIM1 | 100 | 99 | 100 |
| PIM2 | 99 | 100 | 100 |
| PIM3 | 100 | 100 | 100 |
| PIP5K1A | 100 | 34 | 100 |
| PIP5K1C | 57 | 55 | 70 |
| PIP5K2B | 100 | 97 | 100 |
| PIP5K2C | 28 | 0 | 39 |
| PKAC-alpha | 100 | 100 | 100 |
| PKAC-beta | 100 | 100 | 100 |
| PKMYT1 | 100 | 100 | 100 |
| PKN1 | 100 | 98 | 99 |
| PKN2 | 99 | 91 | 100 |
| PKNB(M.tuberculosis) | 93 | 68 | 100 |
| PLK1 | 82 | 78 | 86 |
| PLK2 | 80 | 82 | 75 |
| PLK3 | 100 | 100 | 96 |
| PLK4 | 22 | 9.6 | 15 |
| PRKCD | 94 | 89 | 95 |
| PRKCE | 62 | 73 | 87 |
| PRKCH | 97 | 91 | 100 |
| PRKCI | 54 | 65 | 55 |
| PRKCQ | 100 | 100 | 95 |
| PRKD1 | 8.8 | 7.3 | 7 |
| PRKD2 | 37 | 2.2 | 14 |
| PRKD3 | 28 | 4 | 13 |
| PRKG1 | 100 | 100 | 100 |
| PRKG2 | 100 | 100 | 100 |
| PRKR | 100 | 100 | 100 |
| PRKX | 87 | 92 | 96 |
| PRP4 | 100 | 100 | 100 |
| PYK2 | 35 | 40 | 27 |
| QSK | 100 | 100 | 100 |
| RAF1 | 100 | 100 | 100 |
| RET | 100 | 100 | 100 |
| RET(M918T) | 100 | 90 | 94 |
| RET(V804L) | 89 | 42 | 100 |
| RET(V804M) | 96 | 33 | 97 |
| RIOK1 | 100 | 48 | 98 |
| RIOK2 | 94 | 53 | 78 |
| RIOK3 | 89 | 28 | 88 |
| RIPK1 | 92 | 89 | 88 |
| RIPK2 | 100 | 100 | 100 |
| RIPK4 | 76 | 89 | 98 |
| RIPK5 | 23 | 9.9 | 20 |
| ROCK1 | 100 | 35 | 95 |
| ROCK2 | 86 | 35 | 96 |
| ROS1 | 85 | 86 | 54 |
| RPS6KA4(Kin.Dom.1-N-terminal) | 100 | 89 | 100 |
| RPS6KA4(Kin.Dom.2-C-terminal) | 13 | 3.9 | 0.7 |
| RPS6KA5(Kin.Dom.1-N-terminal) | 100 | 100 | 94 |
| RPS6KA5(Kin.Dom.2-C-terminal) | 69 | 21 | 20 |
| RSK1(Kin.Dom.1-N-terminal) | 100 | 100 | 100 |
| RSK1(Kin.Dom.2-C-terminal) | 100 | 99 | 64 |
| RSK2(Kin.Dom.1-N-terminal) | 88 | 71 | 70 |
| RSK2(Kin.Dom.2-C-terminal) | 28 | 31 | 34 |
| RSK3(Kin.Dom.1-N-terminal) | 100 | 100 | 100 |
| RSK3(Kin.Dom.2-C-terminal) | 70 | 57 | 20 |
| RSK4(Kin.Dom.1-N-terminal) | 96 | 86 | 92 |
| RSK4(Kin.Dom.2-C-terminal) | 99 | 100 | 77 |
| S6K1 | 100 | 63 | 98 |
| SBK1 | 77 | 64 | 68 |
| SGK | 89 | 7.2 | 68 |
| SgK110 | 92 | 100 | 98 |
| SGK2 | 95 | 37 | 87 |
| SGK3 | 76 | 32 | 78 |
| SIK | 100 | 100 | 100 |
| SIK2 | 100 | 100 | 100 |
| SLK | 100 | 100 | 100 |
| SNARK | 75 | 19 | 70 |
| SNRK | 91 | 87 | 50 |
| SRC | 100 | 100 | 100 |
| SRMS | 66 | 70 | 64 |
| SRPK1 | 96 | 53 | 96 |
| SRPK2 | 100 | 95 | 84 |
| SRPK3 | 99 | 40 | 88 |
| STK16 | 100 | 71 | 93 |
| STK33 | 10 | 7.2 | 6.9 |
| STK35 | 100 | 100 | 100 |
| STK36 | 100 | 100 | 100 |
| STK39 | 4.8 | 5.4 | 0.5 |
| SYK | 55 | 35 | 43 |
| TAK1 | 100 | 29 | 84 |
| TAOK1 | 81 | 81 | 82 |
| TAOK2 | 73 | 77 | 76 |
| TAOK3 | 85 | 83 | 84 |
| TBK1 | 95 | 34 | 85 |
| TEC | 93 | 100 | 97 |
| TESK1 | 100 | 100 | 100 |
| TGFBR1 | 86 | 68 | 72 |
| TGFBR2 | 100 | 100 | 100 |
| TIE1 | 100 | 100 | 100 |
| TIE2 | 94 | 94 | 100 |
| TLK1 | 89 | 86 | 96 |
| TLK2 | 100 | 100 | 100 |
| TNIK | 92 | 39 | 72 |
| TNK1 | 100 | 100 | 96 |
| TNK2 | 100 | 100 | 81 |
| TNNI3K | 100 | 100 | 100 |
| TRKA | 100 | 70 | 100 |
| TRKB | 100 | 100 | 100 |
| TRKC | 100 | 100 | 100 |
| TRPM6 | 79 | 85 | 88 |
| TSSK1B | 72 | 49 | 33 |
| TSSK3 | 100 | 100 | 100 |
| TTK | 1 | 0.6 | 0.5 |
| TXK | 100 | 87 | 98 |
| TYK2(JH1domain-catalytic) | 90 | 46 | 66 |
| TYK2(JH2domain-pseudokinase) | 88 | 100 | 82 |
| TYRO3 | 100 | 100 | 100 |
| ULK1 | 97 | 50 | 95 |
| ULK2 | 96 | 79 | 91 |
| ULK3 | 65 | 7.6 | 65 |
| VEGFR2 | 91 | 54 | 91 |
| VPS34 | 62 | 69 | 71 |
| VRK2 | 94 | 88 | 89 |
| WEE1 | 78 | 95 | 93 |
| WEE2 | 100 | 100 | 100 |
| WNK1 | 100 | 100 | 91 |
| WNK2 | 62 | 69 | 71 |
| WNK3 | 100 | 93 | 98 |
| WNK4 | 61 | 66 | 66 |
| YANK1 | 100 | 100 | 98 |
| YANK2 | 96 | 100 | 100 |
| YANK3 | 100 | 100 | 100 |
| YES | 100 | 100 | 100 |
| YSK1 | 100 | 100 | 100 |
| YSK4 | 59 | 0.25 | 4.2 |
| ZAK | 100 | 100 | 100 |
| ZAP70 | 65 | 22 | 37 |

All patent publications and non-patent publications are indicative of the level of skill of those skilled in the art to which this invention pertains. All these publications are herein incorporated by reference to the same extent as if each individual publication were specifically and individually indicated as being incorporated by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A compound having a structure of formula (I):

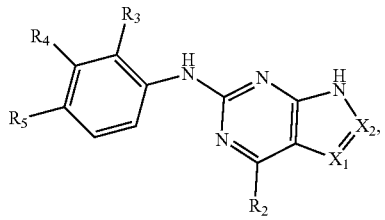

wherein $X_1$ is N or $CR_1$, wherein $R_1$ is H, halogen, CN, or $CF_3$;
$X_2$ is CH or N, provided that only one of $X_1$ and $X_2$ is N;
$R_2$ is

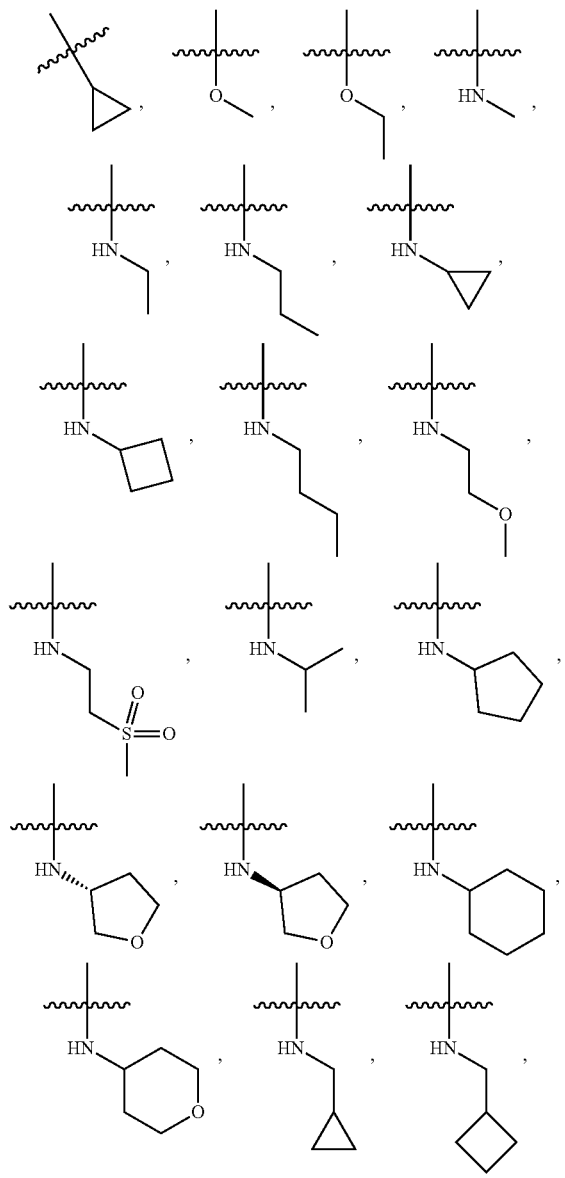

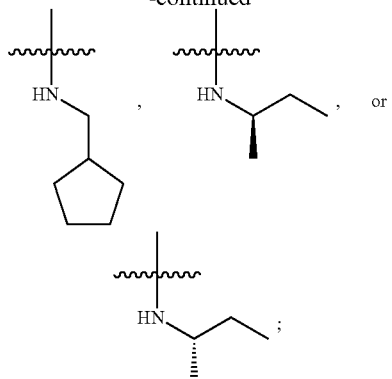

$R_3$ and $R_4$, together with the atoms to which they are attached, form a 1,4-dioxenyl group, 1,3-dioxenyl group, or a 2,3-dihydrofuranyl group; and
$R_5$ is $C(O)R_6$, $S(O)_2R_6$ or

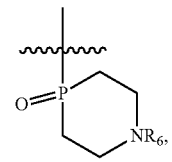

wherein
$R_6$ is methyl,

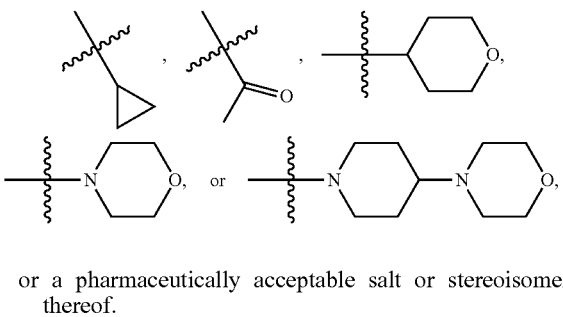

or a pharmaceutically acceptable salt or stereoisomer thereof.

2. The compound of claim 1, wherein $X_1$ is $CR_1$, $R_1$ is H or Cl, and $X_2$ is CH, and wherein the compound has a structure represented by formula (Ia):

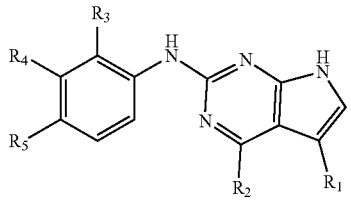

or a pharmaceutically acceptable salt or stereoisomer thereof.

3. The compound of claim 2, wherein $X_1$ is $CR_1$, $R_1$ is Cl, $X_2$ is CH, $R_3$ and $R_4$, together with the atom to which they are attached, form a
1,4-dioxenyl group; and $R_5$ is $C(O)R_6$ or $S(O)_2R_6$, wherein $R_6$ is methyl,

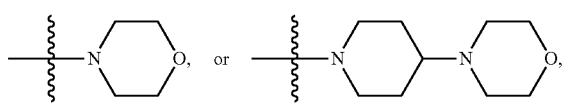
and wherein the compound has a structure represented by formula (Ia-1):
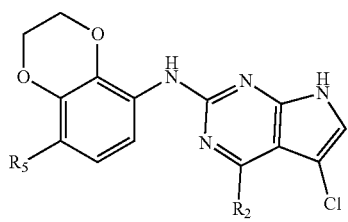
(Ia-1)
or a pharmaceutically acceptable salt or stereoisomer thereof.
4. The compound of claim 3, which represented by formula (Ia-1a) or (Ia-1b):
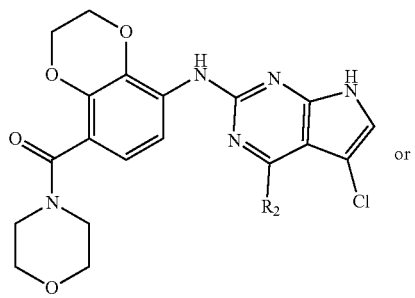
(Ia-1a)
or
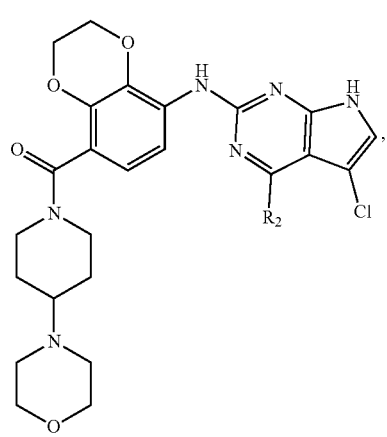
(Ia-1b)
or a pharmaceutically acceptable salt or stereoisomer thereof.
5. The compound of claim 4, which is selected from the group consisting of:
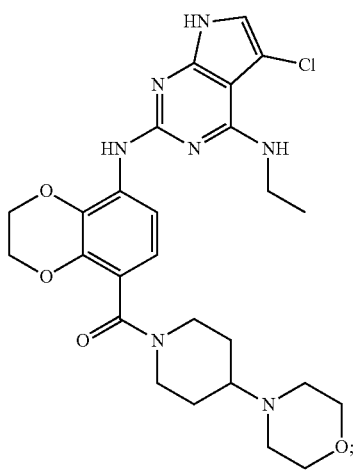
(1)
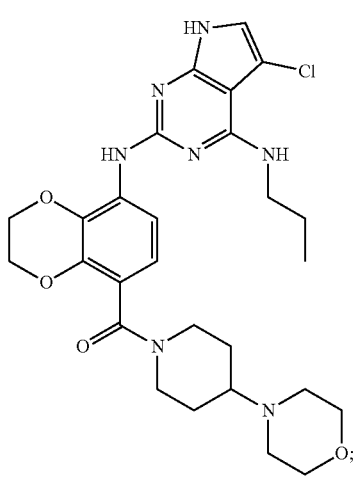
(2)
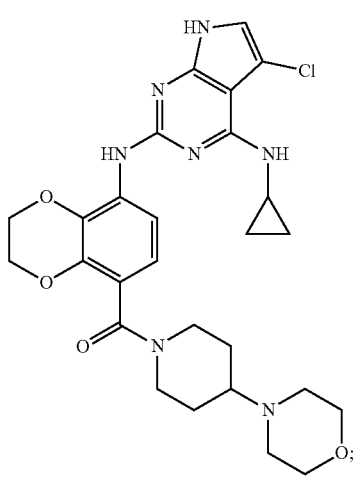
(3)

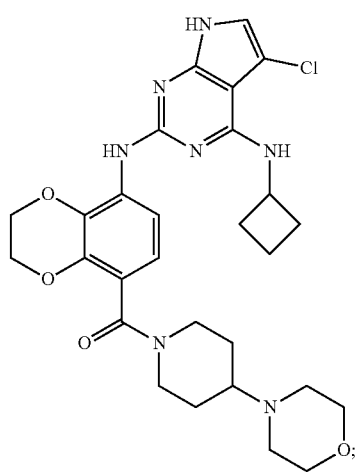
(4)
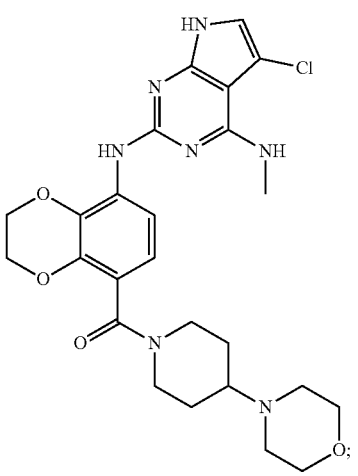
(10)
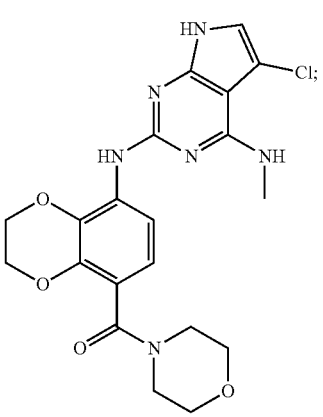
(5)
(14)
(9)
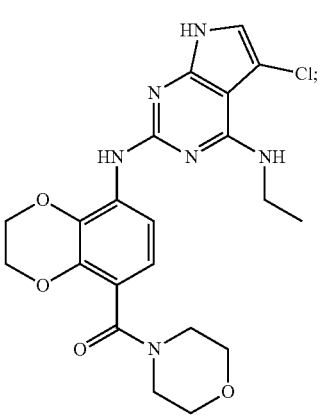
(17)

141
-continued
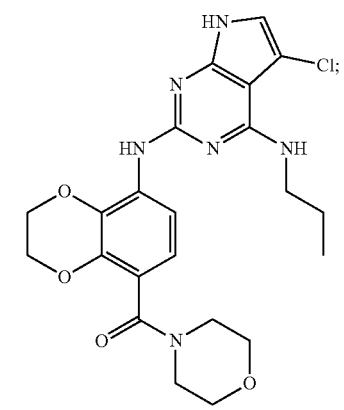
(20)
(27)
(30)
(33)
142
-continued
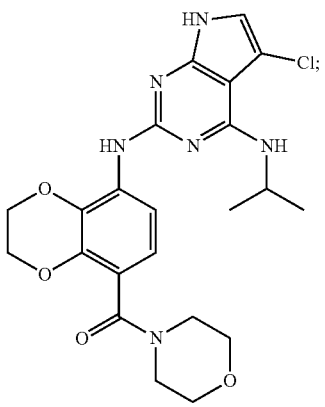
(35)
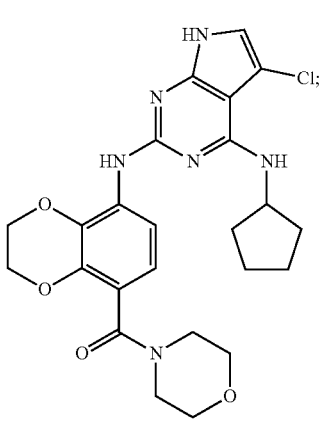
(36)
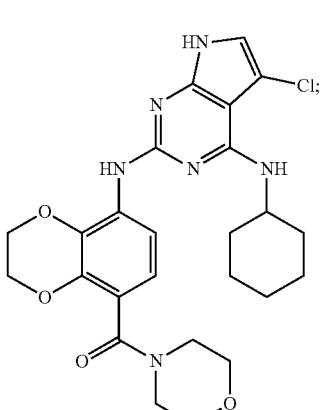
(37)
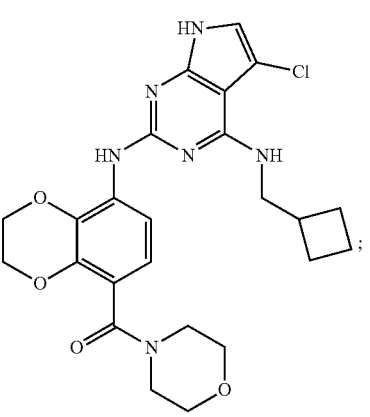
(44)

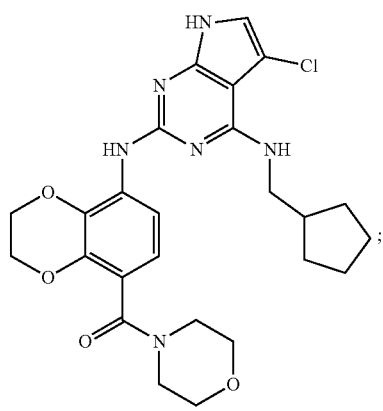
(46)
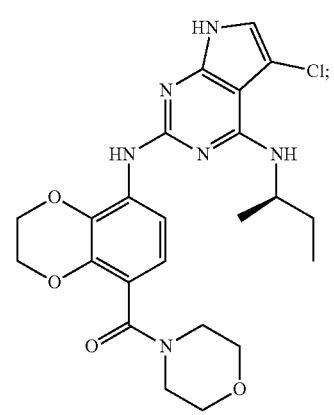
(50)
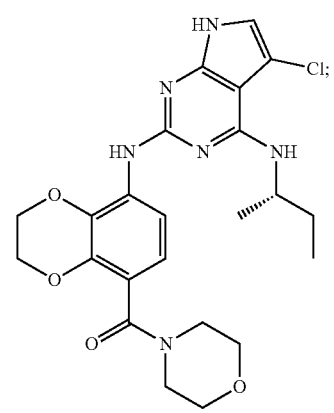
(54)
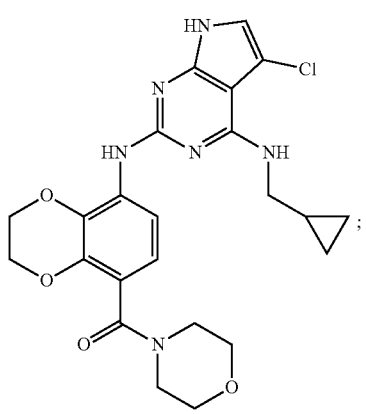
(65)
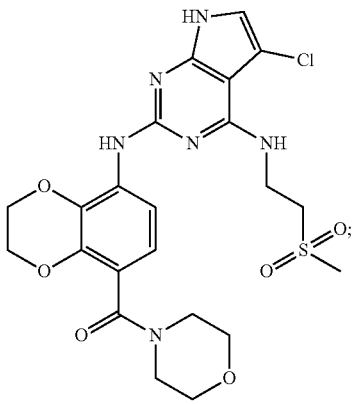
(70)
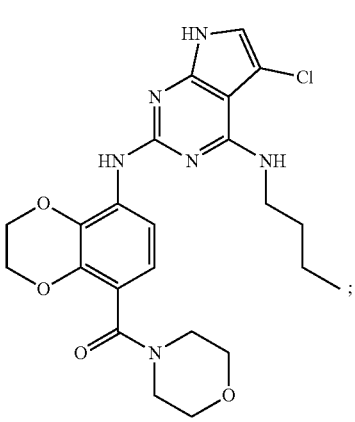
(74)
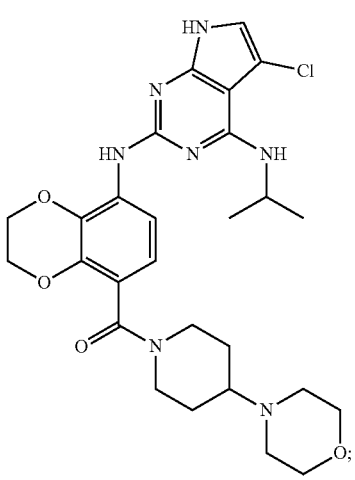
(88)

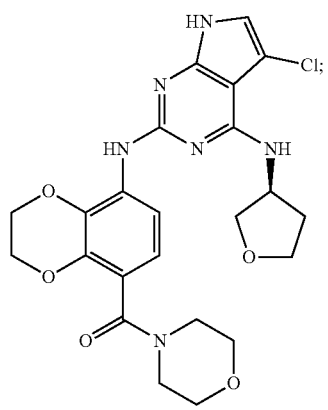
(95)
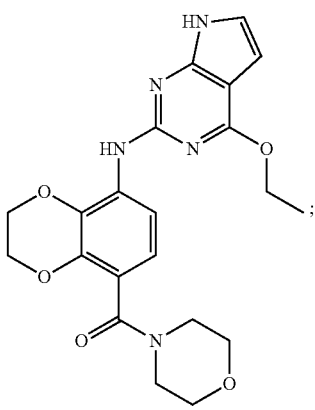
(109)
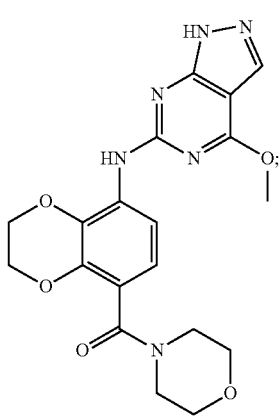
(106)
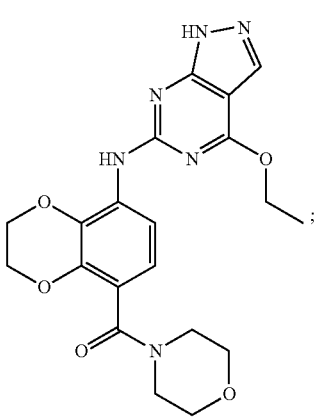
(110)
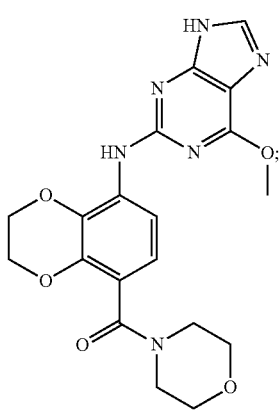
(107)
(111)
(108)
(112)

-continued
(113)
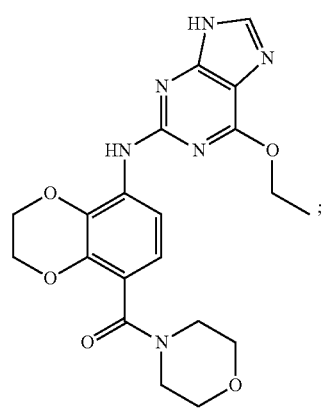
(114)
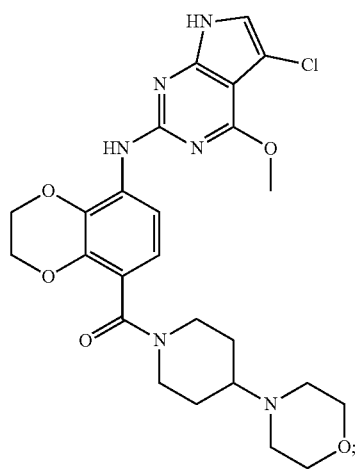
(115)
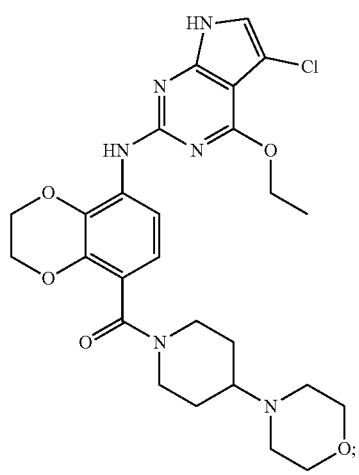
-continued
(116)
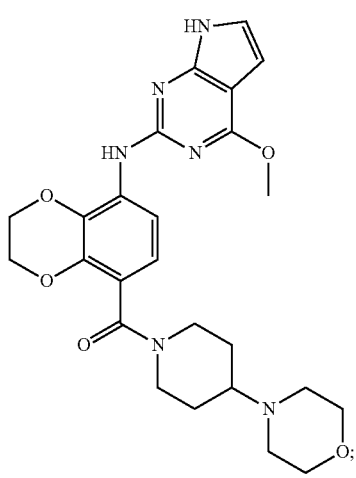
(117)
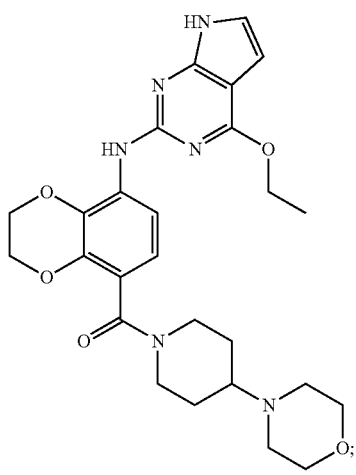
(118)
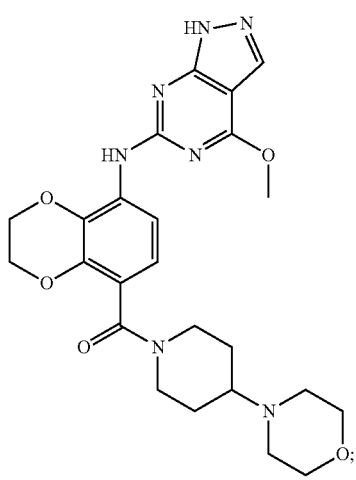

-continued (119)
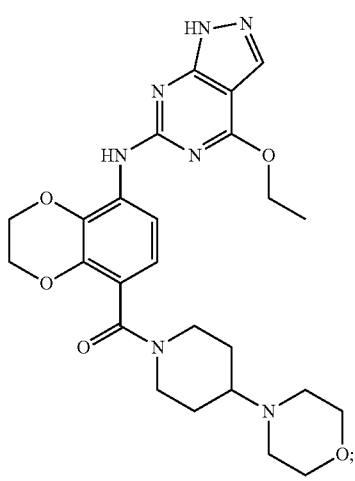

(120)
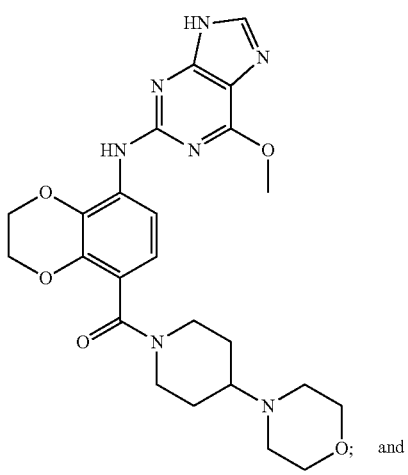
and (121)
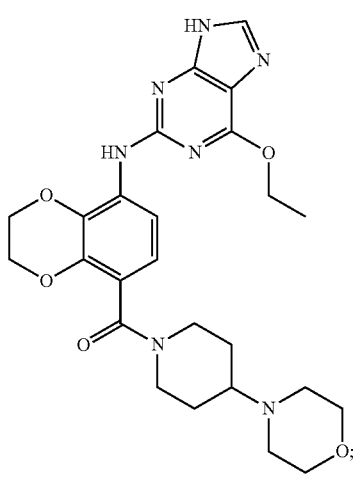

or a pharmaceutically acceptable salt or stereoisomer thereof.

6. The compound of claim 2, wherein $R_1$ is Cl, and $R_3$ and $R_4$, together with the atom to which they are attached, form a 1,3-dioxenyl group; and wherein the compound has a structure represented by formula (Ia-2):

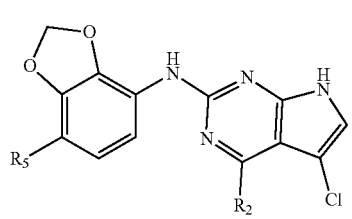
(Ia-2)

or a pharmaceutically acceptable salt or stereoisomer thereof.

7. The compound of claim 6, which is selected from the group consisting of:

(75)
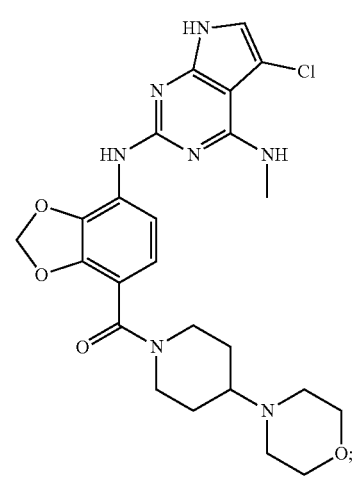

(122)
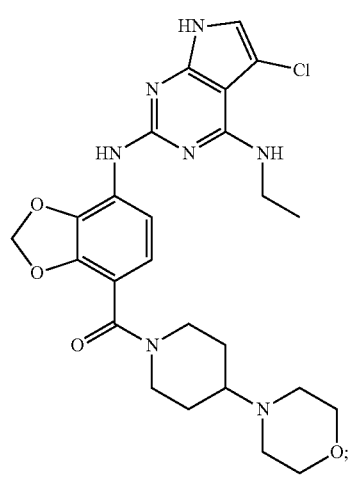

(123)

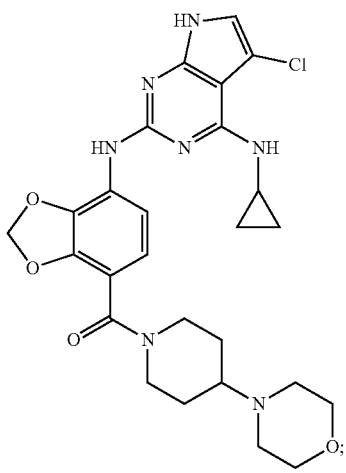

(124)

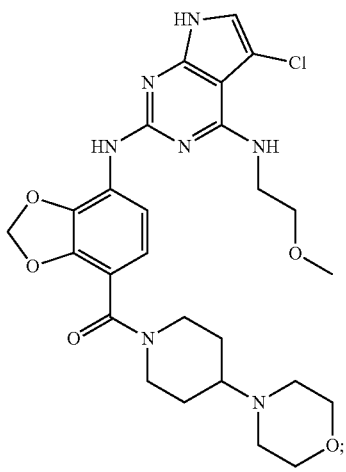

(125)

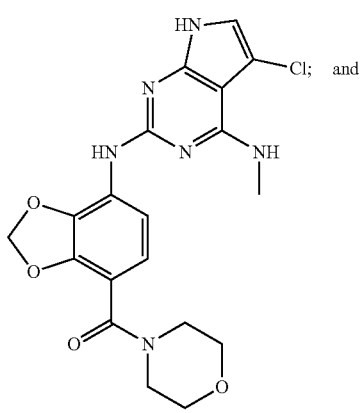

(126)

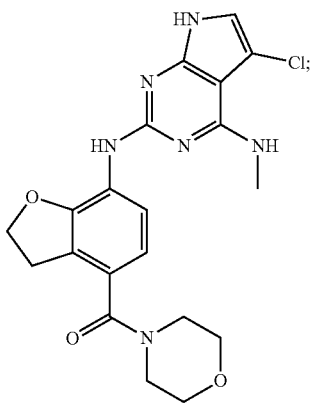

or a pharmaceutically acceptable salt or stereoisomer thereof.

8. The compound of claim 2, wherein R1 is Cl and $R_3$ and $R_4$, together with the atoms to which they are attached, form a 2,3-dihydrofuranyl group; and wherein the compound has a structure represented by formula (Ia-3):

(Ia-3)

or a pharmaceutically acceptable salt or stereoisomer thereof.

9. The compound of claim 8, which is selected from the group consisting of:

(76)

-continued
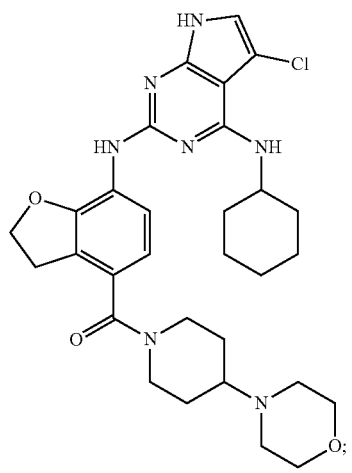
(80)
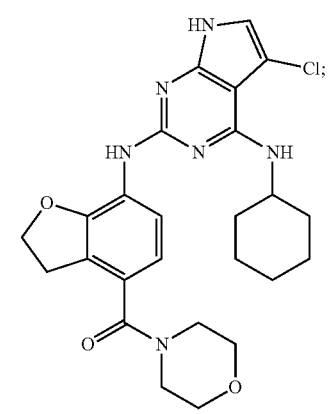
(83)
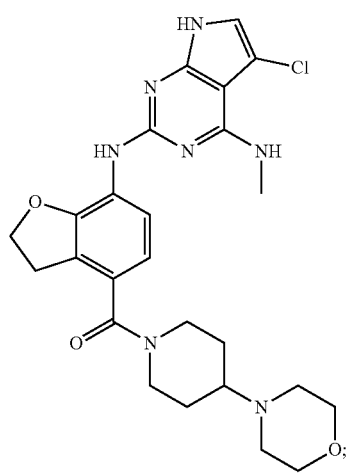
(86)
-continued
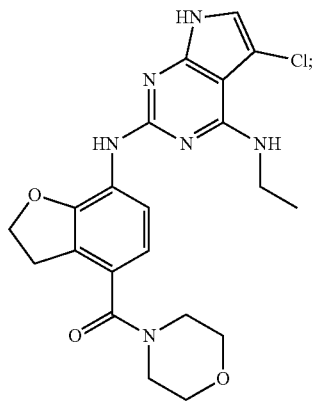
(101)
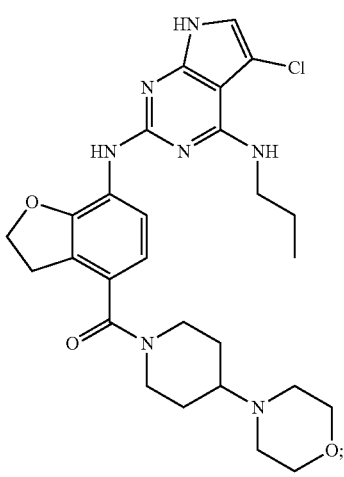
(102)
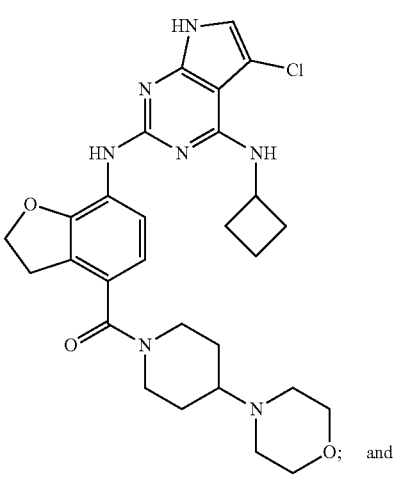
(103)
and

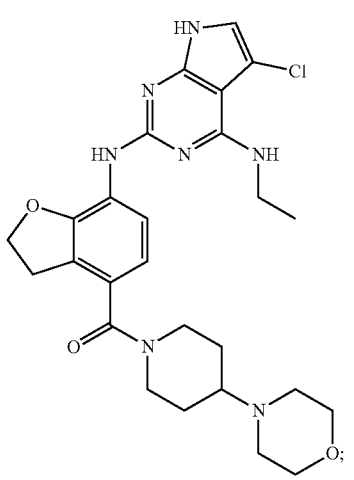

or a pharmaceutically acceptable salt or stereoisomer thereof.

10. A pharmaceutical composition comprising a therapeutically effective amount of the compound or a pharmaceutically acceptable salt or stereoisomer thereof of claim 1, and a pharmaceutically acceptable carrier.

11. The pharmaceutical composition of claim 10, which is in a solid or liquid dosage form.

* * * * *